United States Patent
Zhang

(10) Patent No.: US 10,039,081 B2
(45) Date of Patent: Jul. 31, 2018

(54) TERMINAL, NETWORK DEVICE, PAGING METHOD, AND AREA INFORMATION UPDATE METHOD

(71) Applicant: Huawei Technologies Co., Ltd., Shenzhen (CN)

(72) Inventor: Xiangdong Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/416,878

(22) Filed: Jan. 26, 2017

(65) Prior Publication Data

US 2017/0142686 A1 May 18, 2017

Related U.S. Application Data

(63) Continuation of application No. PCT/CN2014/083812, filed on Aug. 6, 2014.

(51) Int. Cl.
*H04B 7/00* (2006.01)
*H04W 68/02* (2009.01)
(Continued)

(52) U.S. Cl.
CPC ......... *H04W 68/025* (2013.01); *H04L 67/303* (2013.01); *H04W 8/005* (2013.01); *H04W 64/003* (2013.01); *H04W 88/04* (2013.01)

(58) Field of Classification Search
CPC . H04W 68/025; H04W 8/005; H04W 64/003; H04W 88/04; H04L 67/303
See application file for complete search history.

(56) References Cited

U.S. PATENT DOCUMENTS 6,041,124 A * 3/2000 Sugita ................... H04B 1/707
   370/203
8,971,270 B2 * 3/2015 Bachmann .............. H04W 4/00
   370/329

(Continued)

FOREIGN PATENT DOCUMENTS

| CN | 101155397 A | 4/2008 |
| CN | 102811497 A | 12/2012 |
| CN | 103888931 A | 6/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.2.0, Jun. 2014, 365 pages.

(Continued)

*Primary Examiner* — Dominic Rego
(74) *Attorney, Agent, or Firm* — Slater Matsil, LLP

(57) ABSTRACT

The present invention relates to the field of wireless communications technologies, and in particular, to a terminal, a network device, a paging method, and an area information update method, so as to: in a terminal relay scenario, page a terminal to which another terminal provides a relay service, and update area information of the terminal to which the another terminal provides the relay service. A first terminal provided in embodiments of the present invention includes: a receiving module, configured to receive a paging message, where the paging message carries a terminal identity of a second terminal; and a processing module, configured to: when determining that the second terminal is a terminal to which the first terminal provides a relay service, page the second terminal according to the terminal identity of the second terminal.

20 Claims, 15 Drawing Sheets

(51) Int. Cl.
  *H04W 88/04* (2009.01)
  *H04L 29/08* (2006.01)
  *H04W 8/00* (2009.01)
  *H04W 64/00* (2009.01)

(56) References Cited

U.S. PATENT DOCUMENTS

| | | | |
|---|---|---|---|
| 9,615,354 B2* | 4/2017 | Hooli | H04W 72/04 |
| 2002/0080736 A1* | 6/2002 | Furukawa | H04L 45/00 |
| | | | 370/328 |
| 2004/0063451 A1* | 4/2004 | Bonta | H04W 88/04 |
| | | | 455/519 |
| 2006/0281457 A1* | 12/2006 | Huotari | H04W 12/06 |
| | | | 455/435.1 |
| 2007/0249347 A1* | 10/2007 | Saifullah | H04W 36/38 |
| | | | 455/436 |
| 2008/0014969 A1* | 1/2008 | Laroia | H04W 68/00 |
| | | | 455/458 |
| 2008/0057982 A1* | 3/2008 | Willey | H04W 68/025 |
| | | | 455/458 |
| 2009/0017801 A1* | 1/2009 | Laroia | H04W 76/021 |
| | | | 455/414.1 |
| 2009/0017844 A1 | 1/2009 | Li et al. | |
| 2009/0131084 A1* | 5/2009 | Comstock | H04B 7/2606 |
| | | | 455/458 |
| 2009/0219844 A1 | 9/2009 | Soliman | |
| 2010/0151865 A1* | 6/2010 | Camp, Jr. | H04W 72/046 |
| | | | 455/445 |
| 2011/0013551 A1* | 1/2011 | Shiroko | H04L 12/185 |
| | | | 370/312 |
| 2011/0070900 A1* | 3/2011 | Shi | H04W 68/00 |
| | | | 455/458 |
| 2011/0130100 A1* | 6/2011 | Chen | H04W 24/00 |
| | | | 455/67.11 |
| 2011/0134827 A1* | 6/2011 | Hooli | H04W 72/04 |
| | | | 370/315 |
| 2011/0171975 A1* | 7/2011 | Yin | H04W 8/02 |
| | | | 455/456.2 |
| 2011/0207181 A1* | 8/2011 | Birch | C12N 9/90 |
| | | | 435/94 |
| 2012/0039246 A1* | 2/2012 | Zhang | H04W 68/02 |
| | | | 370/315 |
| 2012/0231801 A1 | 9/2012 | Nakatsugawa | |
| 2013/0184013 A1* | 7/2013 | Chao | H04W 68/025 |
| | | | 455/458 |
| 2014/0055555 A1* | 2/2014 | Imai | H04L 63/0428 |
| | | | 348/14.09 |
| 2014/0165173 A1* | 6/2014 | Hjelm | H04W 12/04 |
| | | | 726/7 |
| 2014/0286338 A1* | 9/2014 | Kurita | H04L 49/70 |
| | | | 370/392 |
| 2015/0358841 A1* | 12/2015 | Wang | H04W 24/08 |
| | | | 455/458 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 12)," 3GPP TS 36.413 V12.2.0, Jun. 2014, 285 pages.

* cited by examiner

TERMINAL, NETWORK DEVICE, PAGING METHOD, AND AREA INFORMATION UPDATE METHOD

CROSS-REFERENCE TO RELATED APPLICATIONS

This application is a continuation of International Application No. PCT/CN2014/083812, filed on Aug. 6, 2014, the disclosure of which is hereby incorporated by reference in its entirety.

TECHNICAL FIELD

This application relates to the field of wireless communications technologies, and in particular, to a terminal, a network device, a paging method, and an area information update method.

BACKGROUND

The Internet of Things refers to a network in which information about the physical world is obtained by deploying devices having particular sense, computation, execution, and communication capabilities, and information transmission, collaboration, and processing are implemented by using a network, so as to implement interconnection between a human and a thing and between one thing and another thing. An Internet of Things technology may be applied to fields such as a smart grid, intelligent agriculture, intelligent transportation, and environment detection.

A machine-to-machine (M2M) communications technology is used to bear an Internet of Things application on a mobile communications network. A device that performs M2M communication is referred to as a machine type communication (MTC) device. Some Internet of Things applications, for example, a smart meter, have relatively strict requirements on costs and power consumption of the MTC device.

At present, a low-cost MTC research project conducted by a standards organization—the $3^{rd}$ Generation Partnership Project is devoted to reducing costs and power consumption of MTC terminals, and enhancing coverage of a network with respect to MTC terminals in some special environments (for example, a basement).

A feasible solution is to relay by using a terminal. As shown in FIG. 1, a terminal A implements relay between a terminal 1 and a base station and between a terminal 2 and the base station, a terminal B implements relay between a terminal 3 and the base station and between a terminal 4 and the base station, and the terminal B and a terminal C implement relay between a terminal 5 and the base station. Herein, the terminal A, the terminal B, and the terminal C are terminals that provide a relay service, and the terminal 1, the terminal 2, the terminal 3, the terminal 4, and the terminal 5 are terminals to which another terminal provides the relay service. The relaying by using a terminal can effectively reduce power consumption of a terminal and enhance coverage of a network with respect to a terminal in a special environment, and does not increase network complexity as a method in which a dedicated relay device or small cell is used does.

For ease of description, in this application, a terminal that provides the relay service is referred to as a "first terminal", and a terminal to which another terminal provides the relay service is referred to as a "second terminal".

In the foregoing terminal relay scenario, there is not a solution for paging the second terminal yet, nor a solution for updating area information of the second terminal.

SUMMARY

Embodiments of the present invention provide a terminal, a network device, and a paging method, so as to page, in a terminal relay scenario, a second terminal to which a first terminal provides a relay service. The embodiments of the present invention provide a terminal, a network device, and an area information update method, so as to update, in the terminal relay scenario, area information of the second terminal to which the first terminal provides the relay service.

According to a first aspect, an embodiment of the present invention provides a first terminal, where the first terminal includes: a receiving module, configured to receive a paging message, where the paging message carries a terminal identity of a second terminal; and a processing module, configured to: when determining that the second terminal is a terminal to which the first terminal provides a relay service, page the second terminal according to the terminal identity of the second terminal.

With reference to the first aspect, in a first possible implementation manner, the processing module is specifically configured to: if the paging message includes indication information indicating that the second terminal is a terminal to which the first terminal provides the relay service, determine that the second terminal is a terminal to which the first terminal provides the relay service.

With reference to the first aspect, in a second possible implementation manner, the processing module is specifically configured to: if determining that a terminal identity list, stored in the first terminal, of terminals to which the first terminal provides the relay service includes the terminal identity of the second terminal, determine that the second terminal is a terminal to which the first terminal provides the relay service.

With reference to the second possible implementation manner of the first aspect, in a third possible implementation manner, the processing module is further configured to: delete, from the terminal identity list, a terminal identity of a terminal to which the first terminal no longer provides the relay service; and/or add, to the terminal identity list, a terminal identity of a terminal that becomes a terminal to which the first terminal provides the relay service.

With reference to the first aspect, in a fourth possible implementation manner, the processing module is further configured to: if determining that the paging message includes indication information indicating that the paging message further pages the first terminal, determine that the paging message further pages the first terminal.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the processing module is further configured to determine a paging moment of the second terminal in one of the following manners: determining the paging moment of the second terminal according to paging moment information of the second terminal that is received by the receiving module from the second terminal; determining the paging moment of the second terminal according to a paging parameter that is received by the receiving module from the second terminal and that is used to determine the paging moment of the second terminal; determining the paging moment of the second terminal according to paging moment information of the second terminal obtained from the paging message; or determining the paging moment of the second terminal according to a paging parameter that is obtained from the paging message and that is used to determine the paging moment of the second terminal. The processing module is specifically configured to: page the second terminal according to the determined paging moment of the second terminal.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the processing module is further configured to: before the receiving module receives the paging message, determine the paging moment of the second terminal. The receiving module is specifically configured to: receive the paging message at the paging moment of the second terminal determined by the processing module; and/or receive the paging message at a paging moment of the first terminal.

With reference to the first aspect, the first possible implementation manner of the first aspect, the second possible implementation manner of the first aspect, the third possible implementation manner of the first aspect, the fifth possible implementation manner of the first aspect, or the sixth possible implementation manner of the first aspect, in a seventh possible implementation manner, the paging message carries first indication information, and the first indication information is used to indicate that the paging message pages a terminal to which another terminal provides the relay service; and/or the paging message carries second indication information, and the second indication information is used to indicate whether the paging message pages the first terminal.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner, the paging message includes a terminal identity of the first terminal.

According to a second aspect, an embodiment of the present invention provides a network device, including: a processing module, configured to determine that the network device needs to page a second terminal; and a sending module, configured to: send a first paging message for paging the second terminal, where the first paging message carries a terminal identity of the second terminal and a terminal identity of a first terminal that provides a relay service to the second terminal; or send a second paging message for paging the first terminal, where the second paging message carries a terminal identity of the first terminal and a terminal identity of the second terminal that needs to be paged by using the first terminal and to which the first terminal provides a relay service; or send a third paging message for paging the second terminal, where the third paging message carries a terminal identity of the second terminal and first indication information, and the first indication information is used to indicate that the second terminal is a terminal to which another terminal provides a relay service.

With reference to the second aspect, in a first possible implementation manner, the processing module is further configured to: if the sending module sends the first paging message, determine that the first paging message further carries at least one of the following information: a paging parameter used to determine a paging moment of the second terminal; a paging parameter used to determine a paging moment of the first terminal; area information of the second terminal; or area information of the first terminal.

With reference to the second aspect, in a second possible implementation manner, the processing module is further configured to: if the sending module sends the second paging message, determine that the second paging message further carries at least one of the following information: a paging parameter used to determine a paging moment of the first terminal; a paging parameter used to determine a paging moment of the second terminal; area information of the first terminal; or area information of the second terminal.

With reference to the second aspect, in a third possible implementation manner, the processing module is further configured to: if the sending module sends the third paging message, determine that the third paging message further carries at least one of the following information: a paging parameter used to determine a paging moment of the second terminal; or area information of the second terminal.

With reference to the second aspect, in a fourth possible implementation manner, the processing module is further configured to: if the sending module sends the first paging message, determine that the first paging message further carries second indication information, where the second indication information is used to indicate that the second terminal is a terminal to which another terminal provides the relay service; and/or if the sending module sends the second paging message, determine that the second paging message further carries third indication information, where the third indication information is used to indicate that the second terminal is a terminal to which another terminal provides the relay service.

According to a third aspect, an embodiment of the present invention provides a network device, including a receiving module and a processing module, where the receiving module is configured to receive a first paging message for paging a second terminal, where the first paging message carries a terminal identity of the second terminal and a terminal identity of a first terminal that provides a relay service to the second terminal; and the processing module is configured to page the second terminal by using the first terminal; or the receiving module is configured to receive a second paging message for paging a first terminal, where the second paging message carries a terminal identity of the first terminal and a terminal identity of a second terminal that needs to be paged by using the first terminal and to which the first terminal provides a relay service; and the processing module is configured to page the second terminal by using the first terminal; or the receiving module is configured to receive a third paging message for paging a second terminal, where the third paging message carries a terminal identity of the second terminal and first indication information, and the first indication information is used to indicate that the second terminal is a terminal to which another terminal provides a relay service; and the processing module is configured to determine a first terminal that provides the relay service to the second terminal, and page the second terminal by using the determined first terminal.

With reference to the third aspect, in a first possible implementation manner, if the receiving module receives the first paging message, the processing module is specifically configured to: send a fourth paging message for paging the first terminal, where the fourth paging message carries the terminal identity of the first terminal and the terminal identity of the second terminal that needs to be paged by using the first terminal.

With reference to the first possible implementation manner of the third aspect, in a second possible implementation manner, the processing module is further configured to: after the receiving module receives the first paging message and before the processing module sends the fourth paging message, obtain a paging parameter used to determine a paging moment of the first terminal, and/or obtain, from the first paging message, a paging parameter used to determine a paging moment of the second terminal; and determine, according to the obtained paging parameter, a paging moment for sending the fourth paging message. The processing module is specifically configured to: send the fourth paging message at the determined paging moment for sending the fourth paging message.

With reference to the first possible implementation manner of the third aspect, in a third possible implementation manner, the processing module is further configured to: after the receiving module receives the first paging message and before the processing module sends the fourth paging message, obtain area information of the first terminal, and/or obtain area information of the second terminal from the first paging message; and determine, according to the obtained area information, an area for sending the fourth paging message. The processing module is specifically configured to: send the fourth paging message in the determined area for sending the fourth paging message.

With reference to the first possible implementation manner of the third aspect, in a fourth possible implementation manner, the fourth paging message further carries first indication information, and the first indication information is used to indicate that the second terminal is a terminal to which another terminal provides the relay service.

With reference to the third aspect, in a fifth possible implementation manner, if the receiving module receives the first paging message, the processing module is specifically configured to: send a fifth paging message for paging the second terminal, where the fifth paging message carries the terminal identity of the second terminal and the terminal identity of the first terminal that needs to be used to page the second terminal.

With reference to the fifth possible implementation manner of the third aspect, in a sixth possible implementation manner, the processing module is further configured to: after the receiving module receives the first paging message and before the processing module sends the fifth paging message, obtain a paging parameter used to determine a paging moment of the first terminal, and/or obtain, from the first paging message, a paging parameter used to determine a paging moment of the second terminal; and determine, according to the obtained paging parameter, a paging moment for sending the fifth paging message. The processing module is specifically configured to: send the fifth paging message at the determined paging moment for sending the fifth paging message.

With reference to the fifth possible implementation manner of the third aspect, in a seventh possible implementation manner, the processing module is further configured to: after the receiving module receives the first paging message and before the processing module sends the fifth paging message, obtain area information of the first terminal, and/or obtain area information of the second terminal from the first paging message; and determine, according to the obtained area information, an area for sending the fifth paging message. The processing module is specifically configured to send the fifth paging message in the determined area for sending the fifth paging message.

With reference to the fifth possible implementation manner of the third aspect, in an eighth possible implementation manner, the fifth paging message further carries second indication information, and the second indication information is used to indicate that the second terminal is a terminal to which another terminal provides the relay service.

With reference to the third aspect, in a ninth possible implementation manner, if the receiving module receives the second paging message, the processing module is specifically configured to: send a sixth paging message for paging the first terminal, where the sixth paging message carries the terminal identity of the first terminal and the terminal identity of the second terminal that needs to be paged by using the first terminal.

With reference to the ninth possible implementation manner of the third aspect, in a tenth possible implementation manner, the processing module is further configured to: after the receiving module receives the second paging message and before the processing module sends the sixth paging message, obtain a paging parameter used to determine a paging moment of the second terminal, and/or obtain, from the second paging message, a paging parameter used to determine a paging moment of the first terminal; and determine, according to the obtained paging parameter, a paging moment for sending the sixth paging message. The processing module is specifically configured to: send the sixth paging message at the determined paging moment for sending the sixth paging message.

With reference to the ninth possible implementation manner of the third aspect, in an eleventh possible implementation manner, the processing module is further configured to: after the receiving module receives the second paging message and before the processing module sends the sixth paging message, obtain area information of the second terminal, and/or obtain area information of the first terminal from the second paging message; and determine, according to the obtained area information, an area for sending the sixth paging message. The processing module is specifically configured to: send the sixth paging message in the determined area for sending the sixth paging message.

With reference to the ninth possible implementation manner of the third aspect, in a twelfth possible implementation manner, the sixth paging message further carries third indication information, and the third indication information is used to indicate that the second terminal is a terminal to which another terminal provides the relay service.

With reference to the third aspect, in a thirteenth possible implementation manner, if the receiving module receives the second paging message, the processing module is specifically configured to: send a seventh paging message for paging the second terminal, where the seventh paging message carries the terminal identity of the second terminal and the terminal identity of the first terminal that needs to be used to page the second terminal.

With reference to the thirteenth possible implementation manner of the third aspect, in a fourteenth possible implementation manner, the processing module is further configured to: after the receiving module receives the second paging message and before the processing module sends the seventh paging message, obtain a paging parameter used to determine a paging moment of the second terminal, and/or obtain, from the second paging message, a paging parameter used to determine a paging moment of the first terminal; and determine, according to the obtained paging parameter, a paging moment for sending the seventh paging message. The processing module is specifically configured to: send the seventh paging message at the determined paging moment for sending the seventh paging message.

With reference to the thirteenth possible implementation manner of the third aspect, in a fifteenth possible implementation manner, the processing module is further configured to: after the receiving module receives the second paging message and before the processing module sends the seventh paging message, obtain area information of the second terminal, and/or obtain area information of the first terminal from the second paging message; and determine, according to the obtained area information, an area for sending the seventh paging message. The processing module is specifically configured to: send the seventh paging message in the determined area for sending the seventh paging message.

With reference to the thirteenth possible implementation manner of the third aspect, in a sixteenth possible implementation manner, the seventh paging message further carries fourth indication information, and the fourth indication information is used to indicate that the second terminal is a terminal to which another terminal provides the relay service.

With reference to the third aspect, in a seventeenth possible implementation manner, if the receiving module receives the third paging message, the processing module is specifically configured to: determine, according to a stored terminal identity of a terminal that provides the relay service to the second terminal, the first terminal that provides the relay service to the second terminal; or use each terminal in a coverage area of the second network device as the first terminal that provides the relay service to the second terminal.

With reference to the third aspect, in an eighteenth possible implementation manner, if the receiving module receives the third paging message, the processing module is specifically configured to: send an eighth paging message for paging the second terminal, where the eighth paging message carries the terminal identity of the second terminal and the terminal identity of the first terminal that needs to be used to page the second terminal.

With reference to the eighteenth possible implementation manner of the third aspect, in a nineteenth possible implementation manner, the processing module is further configured to: after the receiving module receives the third paging message and before the processing module sends the eighth paging message, obtain, from the third paging message, a paging parameter used to determine a paging moment of the second terminal, and determine, according to the obtained paging parameter, a paging moment for sending the eighth paging message. The processing module is specifically configured to: send the eighth paging message at the determined paging moment for sending the eighth paging message.

With reference to the eighteenth possible implementation manner of the third aspect, in a twentieth possible implementation manner, the processing module is further configured to: after the receiving module receives the third paging message and before the processing module sends the eighth paging message, obtain area information of the second terminal from the third paging message; and determine, according to the obtained area information, an area for sending the eighth paging message. The processing module is specifically configured to: send the eighth paging message in the determined area for sending the eighth paging message.

With reference to the eighteenth possible implementation manner of the third aspect, in a twenty-first possible implementation manner, the eighth paging message further carries fifth indication information, and the fifth indication information is used to indicate that the second terminal is a terminal to which another terminal provides the relay service.

With reference to the third aspect, in a twenty-second possible implementation manner, if the receiving module receives the third paging message, the processing module is specifically configured to: send a ninth paging message for paging the first terminal, where the ninth paging message carries the terminal identity of the first terminal and the terminal identity of the second terminal that needs to be paged by using the first terminal.

With reference to the twenty-second possible implementation manner of the third aspect, in a twenty-third possible implementation manner, the processing module is further configured to: after the receiving module receives the third paging message and before the processing module sends the ninth paging message, obtain, from the third paging message, a paging parameter used to determine a paging moment of the second terminal, and determine, according to the obtained paging parameter, a paging moment for sending the ninth paging message. The processing module is specifically configured to: send the ninth paging message at the determined paging moment for sending the ninth paging message.

With reference to the twenty-second possible implementation manner of the third aspect, in a twenty-fourth possible implementation manner, the processing module is further configured to: after the receiving module receives the third paging message and before the processing module sends the ninth paging message, obtain area information of the second terminal from the third paging message; and determine, according to the obtained area information, an area for sending the ninth paging message. The processing module is specifically configured to: send the ninth paging message in the determined area for sending the ninth paging message.

With reference to the twenty-second possible implementation manner of the third aspect, in a twenty-fifth possible implementation manner, the ninth paging message carries sixth indication information, and the sixth indication information is used to indicate that the second terminal is a terminal to which another terminal provides the relay service.

According to a fourth aspect, an embodiment of the present invention provides a second terminal, including: a transceiver module, configured to receive a paging message sent by a first terminal; and a processing module, configured to: after determining that a terminal identity in the paging message received by the transceiver module is a terminal identity of the second terminal, determine that the paging message pages the second terminal.

With reference to the fourth aspect, in a first possible implementation manner, the transceiver module is further configured to: before receiving the paging message, send at least one of the following information to the first terminal:
    a paging parameter used to determine a paging moment of the second terminal; or
    area information of the second terminal.

With reference to the fourth aspect, in a second possible implementation manner, the transceiver module is further configured to:

before receiving the paging message, send the terminal identity of the second terminal to the first terminal.

According to a fifth aspect, an embodiment of the present invention provides a first terminal, including:

a transceiver module, configured to send an area information update request for updating area information of a second terminal, and receive accept information of the area information update request, where the second terminal is a terminal to which the first terminal provides a relay service; and a processing module, configured to: after the transceiver module receives the accept message, update the area information of the second terminal.

With reference to the fifth aspect, in a first possible implementation manner, the processing module is specifically configured to:

update the area information of the second terminal according to the accept message.

With reference to the first possible implementation manner of the fifth aspect, in a second possible implementation manner, the processing module is specifically configured to:

obtain updated area information of the second terminal from the accept message, and send the obtained updated area information of the second terminal to the second terminal.

With reference to the second possible implementation manner of the fifth aspect, in a third possible implementation manner, the processing module is further configured to:

after obtaining the updated area information of the second terminal from the accept message, store the updated area information of the second terminal obtained from the accept message.

With reference to the first possible implementation manner of the fifth aspect, in a fourth possible implementation manner, the processing module is specifically configured to:

send the received accept message to the second terminal by using the transceiver module.

With reference to the fourth possible implementation manner of the fifth aspect, in a fifth possible implementation manner, the transceiver module is further configured to:

receive updated area information of the second terminal sent by the second terminal; and store the updated area information of the second terminal received from the second terminal.

With reference to the fifth aspect, in a sixth possible implementation manner, the processing module is specifically configured to:

send a part or all of area information of the first terminal to the second terminal by using the transceiver module.

With reference to the sixth possible implementation manner of the fifth aspect, in a seventh possible implementation manner, the processing module is specifically configured to:

when determining that an area indicated by area information in the accept message overlaps an area in which the first terminal is located, send a part or all of the area information of the first terminal to the second terminal by using the transceiver module.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, or the seventh possible implementation manner of the fifth aspect, in an eighth possible implementation manner, the transceiver module is specifically configured to: when at least one of the following conditions is met, send an area information update request message for updating the area information of the second terminal:

the second terminal becomes a terminal to which the first terminal provides the relay service;

the area information of the second terminal does not overlap the area information of the first terminal;

the area information of the first terminal changes; or the transceiver module receives an area information update request message that is sent by the second terminal and that is used to update the area information of the second terminal.

With reference to the eighth possible implementation manner of the fifth aspect, in a ninth possible implementation manner, the transceiver module is further configured to:

before sending, because the area information of the second terminal does not overlap the area information of the first terminal, an area information update request message for updating the area information of the second terminal, obtain the area information of the second terminal from the second terminal.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, or the ninth possible implementation manner of the fifth aspect, in a tenth possible implementation manner, the area information update request message carries first indication information, and the first indication information is used to indicate that the second terminal is a terminal to which another terminal provides the relay service; and/or the accept message carries second indication information, and the second indication information is used to indicate that the second terminal is a terminal to which another terminal provides the relay service.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, or the tenth possible implementation manner of the fifth aspect, in an eleventh possible implementation manner, the area information update request message and/or the accept message carries a terminal identity of the first terminal.

According to a sixth aspect, an embodiment of the present invention provides a first terminal, including:

a transceiver module, configured to obtain area information of the first terminal; and a processing module, configured to update, according to the area information of the first terminal obtained by the transceiver module, area information of a second terminal to which the first terminal provides a relay service.

With reference to the sixth aspect, in a first possible implementation manner, the transceiver module is specifically configured to:

send a first area information update request message for updating the area information of the first terminal; and use area information in an accept message of the first area information update request message as the area information of the first terminal.

With reference to the sixth aspect, in a second possible implementation manner, the processing module is specifically configured to:

when at least one of the following conditions is met, update the area information of the second terminal according to the area information of the first terminal obtained by the transceiver module:

is detected that the second terminal becomes a terminal to which the first terminal provides the relay service;

it is determined that the area information of the second terminal does not overlap the area information of the first terminal;

the area information of the first terminal changes; or the transceiver module receives a second area information update request message that is sent by the second terminal and that is used to update the area information of the second terminal.

With reference to the sixth aspect, the first possible implementation manner of the sixth aspect, or the second possible implementation manner of the sixth aspect, in a third possible implementation manner, the processing module is specifically configured to:

send a part or all of the area information of the first terminal to the second terminal.

According to a seventh aspect, an embodiment of the present invention provides a second terminal, including:

a transceiver module, configured to obtain updated area information of the second terminal from a first terminal; and a processing module, configured to update area information of the second terminal according to the obtained updated area information of the second terminal, where the first terminal provides a relay service to the second terminal.

With reference to the seventh aspect, in a first possible implementation manner, the transceiver module is specifically configured to:

receive an area information update accept message sent by the first terminal; and obtain the updated area information of the second terminal from the received area information update accept message.

With reference to the first possible implementation manner of the seventh aspect, in a second possible implementation manner, the transceiver module is further configured to:

after obtaining the updated area information of the second terminal from the received area information update accept message, send the obtained updated area information of the second terminal to the first terminal.

With reference to the first possible implementation manner of the seventh aspect, in a third possible implementation manner, the transceiver module is further configured to:

before receiving the area information update accept message sent by the first terminal, send, by using the first terminal, an area information update request message for updating the area information, where the area information update accept message received by the transceiver module responds to the area information update request message sent by the transceiver module.

With reference to the seventh aspect, in a fourth possible implementation manner, the transceiver module is specifically configured to:

receive the updated area information of the second terminal sent by the first terminal.

With reference to the fourth possible implementation manner of the seventh aspect, in a fifth possible implementation manner, the updated area information of the second terminal received by the transceiver module from the first terminal includes:

all or a part of area information of the first terminal; or the updated area information of the second terminal obtained by the first terminal from a network.

With reference to the fourth possible implementation manner of the seventh aspect, in a sixth possible implementation manner, the transceiver module is further configured to: before receiving the updated area information of the second terminal sent by the first terminal, send, by using the first terminal, an area information update request message for updating the area information, where the updated area information of the second terminal received by the transceiver module is sent by the first terminal after the first terminal receives the area information update request message sent by the transceiver module.

With reference to the third possible implementation manner or the sixth possible implementation manner of the seventh aspect, in a seventh possible implementation manner, the transceiver module is further configured to: before sending the area information update request message by using the first terminal, obtain area information of the first terminal; and the transceiver module is specifically configured to: when it is determined that an area in which the second terminal is located does not overlap an area indicated by the obtained area information of the first terminal, send the area information update request message by using the first terminal.

With reference to the seventh possible implementation manner of the seventh aspect, in an eighth possible implementation manner of the seventh aspect, the transceiver module is specifically configured to:

when the second terminal becomes a terminal to which the first terminal provides the relay service, obtain the area information of the first terminal.

With reference to the third possible implementation manner or the sixth possible implementation manner of the seventh aspect, in a ninth possible implementation manner, the transceiver module is specifically configured to:

when the second terminal becomes a terminal to which the first terminal provides the relay service, send the area information update request message by using the first terminal.

With reference to the third possible implementation manner, the sixth possible implementation manner, the seventh possible implementation manner, the eighth possible implementation manner, or the ninth possible implementation manner of the seventh aspect, in a tenth possible implementation manner, the area information update request message carries first indication information, and the first indication information is used to indicate that the second terminal is a terminal to which another terminal provides the relay service; and/or the area information update accept message carries second indication information, and the second indication information is used to indicate that the second terminal is a terminal to which another terminal provides the relay service.

With reference to the third possible implementation manner, the sixth possible implementation manner, the seventh possible implementation manner, the eighth possible implementation manner, the ninth possible implementation manner, or the tenth possible implementation manner of the seventh aspect, in an eleventh possible implementation manner, the area information update request message and/or the information update accept message carries a terminal identity of the first terminal.

According to an eighth aspect, an embodiment of the present invention provides a paging method, including:

receiving, by a first terminal, a paging message, where the paging message carries a terminal identity of a second terminal; and when determining that the second terminal is a terminal to which the first terminal provides a relay service, paging, by the first terminal, the second terminal according to the terminal identity of the second terminal.

With reference to the eighth aspect, in a first possible implementation manner, the determining, by the first terminal, that the second terminal is a terminal to which the first terminal provides a relay service includes:

if the paging message includes indication information indicating that the second terminal is a terminal to which the first terminal provides the relay service, determining, by the first terminal, that the second terminal is a terminal to which the first terminal provides the relay service.

With reference to the eighth aspect, in a second possible implementation manner, the determining, by the first terminal, that the second terminal is a terminal to which the first terminal provides a relay service includes:

if determining that a stored terminal identity list of terminals to which the first terminal provides the relay service includes the terminal identity of the second terminal, determining, by the first terminal, that the second terminal is a terminal to which the first terminal provides the relay service.

With reference to the second possible implementation manner of the eighth aspect, the method further includes:

deleting, by the first terminal from the terminal identity list, a terminal identity of a terminal to which the first terminal no longer provides the relay service; and/or adding, by the first terminal to the terminal identity list, a terminal identity of a terminal that becomes a terminal to which the first terminal provides the relay service.

With reference to the eighth aspect, in a fourth possible implementation manner, after the receiving, by a first terminal, a paging message, the method further includes:

if the first terminal determines that the paging message includes indication information indicating that the paging message further pages the first terminal, determining, by the first terminal, that the paging message further pages the first terminal.

With reference to the eighth aspect, the first possible implementation manner of the eighth aspect, the second possible implementation manner of the eighth aspect, the third possible implementation manner of the eighth aspect, or the fourth possible implementation manner of the eighth aspect, in a fifth possible implementation manner, before the paging, by the first terminal, the second terminal, the method further includes:

determining, by the first terminal, a paging moment of the second terminal in one of the following manners:

determining, by the first terminal, the paging moment of the second terminal according to paging moment information of the second terminal that is received from the second terminal;

determining, by the first terminal, the paging moment of the second terminal according to a paging parameter that is received from the second terminal and that is used to determine the paging moment of the second terminal;

determining, by the first terminal, the paging moment of the second terminal according to paging moment information of the second terminal obtained from the paging message; or determining, by the first terminal, the paging moment of the second terminal according to a paging parameter that is obtained from the paging message and that is used to determine the paging moment of the second terminal; and the paging, by the first terminal, the second terminal includes:

paging, by the first terminal, the second terminal according to the determined paging moment of the second terminal.

With reference to the eighth aspect, the first possible implementation manner of the eighth aspect, the second possible implementation manner of the eighth aspect, the third possible implementation manner of the eighth aspect, the fourth possible implementation manner of the eighth aspect, or the fifth possible implementation manner of the eighth aspect, in a sixth possible implementation manner, before the receiving, by a first terminal, a paging message, the method further includes:

determining, by the first terminal, the paging moment of the second terminal; and the receiving, by a first terminal, a paging message includes:

receiving, by the first terminal, the paging message at the paging moment of the second terminal; and/or receiving, by the first terminal, the paging message at a paging moment of the first terminal.

With reference to the eighth aspect, the first possible implementation manner of the eighth aspect, the second possible implementation manner of the eighth aspect, the third possible implementation manner of the eighth aspect, the fifth possible implementation manner of the eighth aspect, or the sixth possible implementation manner of the eighth aspect, in a seventh possible implementation manner, the paging message carries first indication information, and the first indication information is used to indicate that the paging message pages a terminal to which another terminal provides the relay service; and/or the paging message carries second indication information, and the second indication information is used to indicate whether the paging message pages the first terminal.

With reference to the eighth aspect, the first possible implementation manner of the eighth aspect, the second possible implementation manner of the eighth aspect, the third possible implementation manner of the eighth aspect, the fourth possible implementation manner of the eighth aspect, the fifth possible implementation manner of the eighth aspect, the sixth possible implementation manner of the eighth aspect, or the seventh possible implementation manner of the eighth aspect, in an eighth possible implementation manner, the paging message includes a terminal identity of the first terminal.

According to a ninth aspect, an embodiment of the present invention provides a paging method, including:

determining, by a first network device, that a second terminal needs to be paged; and sending, by the first network device, a first paging message for paging the second terminal, where the first paging message carries a terminal identity of the second terminal and a terminal identity of a first terminal that provides a relay service to the second terminal; or sending, by the first network device, a second paging message for paging the first terminal, where the second paging message carries a terminal identity of the first terminal and a terminal identity of the second terminal that needs to be paged by using the first terminal and to which the first terminal provides a relay service; or sending, by the first network device, a third paging message for paging the second terminal, where the third paging message carries a terminal identity of the second terminal and first indication information, and the first indication information is used to indicate that the second terminal is a terminal to which another terminal provides a relay service.

With reference to the ninth aspect, in a first possible implementation manner, if the first network device sends the first paging message, the first paging message further carries at least one of the following information:

a paging parameter used to determine a paging moment of the second terminal; or a paging parameter used to determine a paging moment of the first terminal;

area information of the second terminal; or area information of the first terminal.

With reference to the ninth aspect, in a second possible implementation manner, if the first network device sends the second paging message, the second paging message further carries at least one of the following information:

a paging parameter used to determine a paging moment of the first terminal;

a paging parameter used to determine a paging moment of the second terminal;

area information of the first terminal; or area information of the second terminal.

With reference to the ninth aspect, in a third possible implementation manner, if the first network device sends the third paging message, the third paging message further carries at least one of the following information:

a paging parameter used to determine a paging moment of the second terminal; or area information of the second terminal.

With reference to the ninth aspect, in a fourth possible implementation manner, if the first network device sends the first paging message, the first paging message further carries second indication information, where the second indication information is used to indicate that the second terminal is a terminal to which another terminal provides the relay service; and/or if the first network device sends the second paging message, the second paging message further carries third indication information, where the third indication information is used to indicate that the second terminal is a terminal to which another terminal provides the relay service.

According to a tenth aspect, an embodiment of the present invention provides a paging method, including:

receiving, by a second network device, a first paging message for paging a second terminal, where the first paging message carries a terminal identity of the second terminal and a terminal identity of a first terminal that provides a relay service to the second terminal; and paging, by the second network device, the second terminal by using the first terminal; or receiving, by a second network device, a second paging message for paging a first terminal, where the second paging message carries a terminal identity of the first terminal and a terminal identity of a second terminal that needs to be paged by using the first terminal and to which the first terminal provides a relay service; and paging, by the second network device, the second terminal by using the first terminal; or receiving, by a second network device, a third paging message for paging a second terminal, where the third paging message carries a terminal identity of the second terminal and first indication information, and the first indication information is used to indicate that the second terminal is a terminal to which another terminal provides a relay service; and determining, by the second network device, a first terminal that provides the relay service to the second terminal, and paging the second terminal by using the determined first terminal.

With reference to the tenth aspect, in a first possible implementation manner, if the second network device receives the first paging message, the paging, by the second network device, the second terminal by using the first terminal includes:

sending, by the second network device, a fourth paging message for paging the first terminal, where the fourth paging message carries the terminal identity of the first terminal and the terminal identity of the second terminal that needs to be paged by using the first terminal.

With reference to the first possible implementation manner of the tenth aspect, in a second possible implementation manner, after the receiving, by a second network device, a first paging message and before the sending, by the second network device, a fourth paging message, the method further includes:

obtaining, by the second network device, a paging parameter used to determine a paging moment of the first terminal, and/or obtaining, from the first paging message, a paging parameter used to determine a paging moment of the second terminal; and determining, by the second network device according to the obtained paging parameter, a paging moment for sending the fourth paging message; and the sending, by the second network device, a fourth paging message includes:

sending, by the second network device, the fourth paging message at the determined paging moment for sending the fourth paging message.

With reference to the first possible implementation manner of the tenth aspect, in a third possible implementation manner, after the receiving, by a second network device, a first paging message and before the sending, by the second network device, a fourth paging message, the method further includes:

obtaining, by the second network device, area information of the first terminal, and/or obtaining area information of the second terminal from the first paging message; and determining, by the second network device according to the obtained area information, an area for sending the fourth paging message; and the sending, by the second network device, a fourth paging message includes: sending, by the second network device, the fourth paging message in the determined area for sending the fourth paging message.

With reference to the first possible implementation manner of the tenth aspect, in a fourth possible implementation manner, the fourth paging message further carries first indication information, and the first indication information is used to indicate that the second terminal is a terminal to which another terminal provides the relay service.

With reference to the tenth aspect, in a fifth possible implementation manner, if the second network device receives the first paging message, the paging, by the second network device, the second terminal by using the first terminal includes:

sending, by the second network device, a fifth paging message for paging the second terminal, where the fifth paging message carries the terminal identity of the second terminal and the terminal identity of the first terminal that needs to be used to page the second terminal.

With reference to the fifth possible implementation manner of the tenth aspect, in a sixth possible implementation manner, after the receiving, by a second network device, a first paging message and before the sending, by the second network device, a fifth paging message, the method further includes:

obtaining, by the second network device, a paging parameter used to determine a paging moment of the first terminal, and/or obtaining, from the first paging message, a paging parameter used to determine a paging moment of the second terminal; and determining, by the second network device according to the obtained paging parameter, a paging moment for sending the fifth paging message; and the sending, by the second network device, a fifth paging message includes:

sending, by the second network device, the fifth paging message at the determined paging moment for sending the fifth paging message.

With reference to the fifth possible implementation manner of the tenth aspect, in a seventh possible implementation manner, after the receiving, by a second network device, a first paging message and before the sending, by the second network device, a fifth paging message, the method further includes:

obtaining, by the second network device, area information of the first terminal, and/or obtaining area information of the second terminal from the first paging message; and determining, by the second network device according to the obtained area information, an area for sending the fifth paging message; and the sending, by the second network device, a fifth paging message includes:

sending, by the second network device, the fifth paging message in the determined area for sending the fifth paging message.

With reference to the fifth possible implementation manner of the tenth aspect, in an eighth possible implementation manner, the fifth paging message further carries second indication information, and the second indication information is used to indicate that the second terminal is a terminal to which another terminal provides the relay service.

With reference to the tenth aspect, in a ninth possible implementation manner, if the second network device receives the second paging message, the paging, by the second network device, the second terminal by using the first terminal includes:

sending, by the second network device, a sixth paging message for paging the first terminal, where the sixth paging message carries the terminal identity of the first terminal and the terminal identity of the second terminal that needs to be paged by using the first terminal.

With reference to the ninth possible implementation manner of the tenth aspect, in a tenth possible implementation manner, after the receiving, by a second network device, a second paging message and before the sending, by the second network device, a sixth paging message, the method further includes:

obtaining, by the second network device, a paging parameter used to determine a paging moment of the second terminal, and/or obtaining, from the second paging message, a paging parameter used to determine a paging moment of the first terminal; and determining, by the second network device according to the obtained paging parameter, a paging moment for sending the sixth paging message; and the sending, by the second network device, a sixth paging message includes:

sending, by the second network device, the sixth paging message at the determined paging moment for sending the sixth paging message.

With reference to the ninth possible implementation manner of the tenth aspect, in an eleventh possible implementation manner, after the receiving, by a second network device, a second paging message and before the sending, by the second network device, a sixth paging message, the method further includes:

obtaining, by the second network device, area information of the second terminal, and/or obtaining area information of the first terminal from the second paging message; and determining, by the second network device according to the obtained area information, an area for sending the sixth paging message; and the sending, by the second network device, a sixth paging message includes:

sending, by the second network device, the sixth paging message in the determined area for sending the sixth paging message.

With reference to the ninth possible implementation manner of the tenth aspect, in a twelfth possible implementation manner, the sixth paging message further carries third indication information, and the third indication information is used to indicate that the second terminal is a terminal to which another terminal provides the relay service.

With reference to the tenth aspect, in a thirteenth possible implementation manner, if the second network device receives the second paging message, the paging, by the second network device, the second terminal by using the first terminal includes:

sending, by the second network device, a seventh paging message for paging the second terminal, where the seventh paging message carries the terminal identity of the second terminal and the terminal identity of the first terminal that needs to be used to page the second terminal.

With reference to the thirteenth possible implementation manner of the tenth aspect, in a fourteenth possible implementation manner, after the receiving, by a second network device, a second paging message and before the sending, by the second network device, a seventh paging message, the method further includes:

obtaining, by the second network device, a paging parameter used to determine a paging moment of the second terminal, and/or obtaining, from the second paging message, a paging parameter used to determine a paging moment of the first terminal; and determining, by the second network device according to the obtained paging parameter, a paging moment for sending the seventh paging message; and the sending, by the second network device, a seventh paging message includes:

sending, by the second network device, the seventh paging message at the determined paging moment for sending the seventh paging message.

With reference to the thirteenth possible implementation manner of the tenth aspect, in a fifteenth possible implementation manner, after the receiving, by a second network device, a second paging message and before the sending, by the second network device, a seventh paging message, the method further includes:

obtaining, by the second network device, area information of the second terminal, and/or obtaining area information of the first terminal from the second paging message; and determining, by the second network device according to the obtained area information, an area for sending the seventh paging message; and the sending, by the second network device, a seventh paging message includes: sending, by the second network device, the seventh paging message in the determined area for sending the seventh paging message.

With reference to the thirteenth possible implementation manner of the tenth aspect, in a sixteenth possible implementation manner, the seventh paging message further carries fourth indication information, and the fourth indication information is used to indicate that the second terminal is a terminal to which another terminal provides the relay service.

With reference to the tenth aspect, in a seventeenth possible implementation manner, if the second network device receives the third paging message, the determining, by the second network device, a first terminal that provides the relay service to the second terminal includes:

determining, by the second network device according to a stored terminal identity of a terminal that provides the relay service to the second terminal, the first terminal that provides the relay service to the second terminal; or using, by the second network device, each terminal in a coverage area of the second network device as the first terminal that provides the relay service to the second terminal.

With reference to the tenth aspect, in an eighteenth possible implementation manner, if the second network device receives the third paging message, the paging, by the second network device, the second terminal by using the determined first terminal includes:

sending, by the second network device, an eighth paging message for paging the second terminal, where the eighth paging message carries the terminal identity of the second terminal and the terminal identity of the first terminal that needs to be used to page the second terminal.

With reference to the eighteenth possible implementation manner of the tenth aspect, in a nineteenth possible implementation manner, after the receiving, by a second network device, a third paging message and before the sending, by the second network device, an eighth paging message, the method further includes:

obtaining, by the second network device from the third paging message, a paging parameter used to determine a paging moment of the second terminal, and determining, according to the obtained paging parameter, a paging moment for sending the eighth paging message; and the sending, by the second network device, an eighth paging message includes: sending, by the second network device, the eighth paging message at the determined paging moment for sending the eighth paging message.

With reference to the eighteenth possible implementation manner of the tenth aspect, in a twentieth possible implementation manner, after the receiving, by a second network device, a third paging message and before the sending, by the second network device, an eighth paging message, the method further includes:

obtaining, by the second network device, area information of the second terminal from the third paging message; and determining, according to the obtained area information, an area for sending the eighth paging message; and the sending, by the second network device, an eighth paging message includes:

sending, by the second network device, the eighth paging message in the determined area for sending the eighth paging message.

With reference to the eighteenth possible implementation manner of the tenth aspect, in a twenty-first possible implementation manner, the eighth paging message further carries fifth indication information, and the fifth indication information is used to indicate that the second terminal is a terminal to which another terminal provides the relay service.

With reference to the tenth aspect, in a twenty-second possible implementation manner, if the second network device receives the third paging message, the paging, by the second network device, the second terminal by using the determined first terminal includes:

sending, by the second network device, a ninth paging message for paging the first terminal, where the ninth paging message carries the terminal identity of the first terminal and the terminal identity of the second terminal that needs to be paged by using the first terminal.

With reference to the twenty-second possible implementation manner of the tenth aspect, after the receiving, by a second network device, a third paging message and before the sending, by the second network device, a ninth paging message, the method further includes:

obtaining, by the second network device from the third paging message, a paging parameter used to determine a paging moment of the second terminal, and determining, according to the obtained paging parameter, a paging moment for sending the ninth paging message; and the sending, by the second network device, a ninth paging message includes:

sending, by the second network device, the ninth paging message at the determined paging moment for sending the ninth paging message.

With reference to the twenty-second possible implementation manner of the tenth aspect, in a twenty-fourth possible implementation manner, after the receiving, by a second network device, a third paging message and before the sending, by the second network device, a ninth paging message, the method further includes:

obtaining, by the second network device, area information of the second terminal from the third paging message; and determining, according to the obtained area information, an area for sending the ninth paging message; and the sending, by the second network device, a ninth paging message includes:

sending, by the second network device, the ninth paging message in the determined area for sending the ninth paging message.

With reference to the twenty-second possible implementation manner of the tenth aspect, in a twenty-fifth implementation manner, the ninth paging message carries sixth indication information, and the sixth indication information is used to indicate that the second terminal is a terminal to which another terminal provides the relay service.

According to an eleventh aspect, an embodiment of the present invention provides a paging method, including:

receiving, by a second terminal, a paging message sent by a first terminal; and after determining that a terminal identity in the received paging message is an identity of the second terminal, determining, by the second terminal, that the paging message pages the second terminal.

With reference to the eleventh aspect, in a first possible implementation manner, before the receiving, by a second terminal, a paging message, the method further includes:

sending, by the second terminal, at least one of the following information to the first terminal:

a paging parameter used to determine a paging moment of the second terminal; or area information of the second terminal.

With reference to the eleventh aspect, in a second possible implementation manner, before the receiving, by a second terminal, a paging message, the method further includes:

sending, by the second terminal, the terminal identity of the second terminal to the first terminal.

According to a twelfth aspect, an embodiment of the present invention provides an area information update method, including:

sending, by a first terminal, an area information update request for updating area information of a second terminal, where the second terminal is a terminal to which the first terminal provides a relay service; and after receiving an accept message of the area information update request, updating, by the first terminal, the area information of the second terminal.

With reference to the twelfth aspect, in a first possible implementation manner, the updating, by the first terminal, the area information of the second terminal includes:

updating, by the first terminal, the area information of the second terminal according to the accept message.

With reference to the first possible implementation manner of the twelfth aspect, in a second possible implementation manner, the updating, by the first terminal, the area information of the second terminal according to the accept message includes:

obtaining, by the first terminal, updated area information of the second terminal from the accept message, and sending the obtained updated area information of the second terminal to the second terminal.

With reference to the second possible implementation manner of the twelfth aspect, in a third possible implementation manner, after the obtaining, by the first terminal, updated area information of the second terminal from the accept message, the method further includes:

storing, by the first terminal, the updated area information of the second terminal obtained from the accept message.

With reference to the first possible implementation manner of the twelfth aspect, in a fourth possible implementation manner, the updating, by the first terminal, the area information of the second terminal according to the accept message includes:

sending, by the first terminal, the received accept message to the second terminal.

With reference to the fourth possible implementation manner of the twelfth aspect, in a fifth possible implementation manner, after the updating, by the first terminal, the area information of the second terminal, the method further includes:

receiving, by the first terminal, updated area information of the second terminal sent by the second terminal; and storing, by the first terminal, the updated area information of the second terminal received from the second terminal.

With reference to the twelfth aspect, in a sixth possible implementation manner, the updating, by the first terminal, the area information of the second terminal includes:

sending, by the first terminal, a part or all of area information of the first terminal to the second terminal.

With reference to the sixth possible implementation manner of the twelfth aspect, in a seventh possible implementation manner, the sending, by the first terminal, a part or all of area information of the first terminal to the second terminal includes:

when determining that an area indicated by area information in the accept message overlaps an area in which the first terminal is located, sending, by the first terminal, a part or all of the area information of the first terminal to the second terminal.

With reference to the twelfth aspect, the first possible implementation manner of the twelfth aspect, the second possible implementation manner of the twelfth aspect, the third possible implementation manner of the twelfth aspect, the fourth possible implementation manner of the twelfth aspect, the fifth possible implementation manner of the twelfth aspect, the sixth possible implementation manner of the twelfth aspect, or the seventh possible implementation manner of the twelfth aspect, in an eighth possible implementation manner, when at least one of the following conditions is met, the first terminal sends an area information update request message for updating the area information of the second terminal:

the first terminal detects that the second terminal becomes a terminal to which the first terminal provides the relay service;

the first terminal determines that the area information of the second terminal does not overlap the area information of the first terminal;

the area information of the first terminal changes; or the first terminal receives an area information update request message that is sent by the second terminal and that is used to update the area information of the second terminal.

With reference to the eighth possible implementation manner of the twelfth aspect, in a ninth possible implementation manner, before sending, by the first terminal because the area information of the second terminal does not overlap the area information of the first terminal, an area information update request message for updating the area information of the second terminal, the method further includes:

obtaining, by the first terminal, the area information of the second terminal from the second terminal.

With reference to the twelfth aspect, the first possible implementation manner of the twelfth aspect, the second possible implementation manner of the twelfth aspect, the third possible implementation manner of the twelfth aspect, the fourth possible implementation manner of the twelfth aspect, the fifth possible implementation manner of the twelfth aspect, the sixth possible implementation manner of the twelfth aspect, the seventh possible implementation manner of the twelfth aspect, the eighth possible implementation manner of the twelfth aspect, or the ninth possible implementation manner of the twelfth aspect, in a tenth possible implementation manner, the area information update request message carries first indication information, and the first indication information is used to indicate that the second terminal is a terminal to which another terminal provides the relay service; and/or the accept message carries second indication information, and the second indication information is used to indicate that the second terminal is a terminal to which another terminal provides the relay service.

With reference to the twelfth aspect, the first possible implementation manner of the twelfth aspect, the second possible implementation manner of the twelfth aspect, the third possible implementation manner of the twelfth aspect, the fourth possible implementation manner of the twelfth aspect, the fifth possible implementation manner of the twelfth aspect, the sixth possible implementation manner of the twelfth aspect, the seventh possible implementation manner of the twelfth aspect, the eighth possible implementation manner of the twelfth aspect, the ninth possible implementation manner of the twelfth aspect, or the tenth possible implementation manner of the twelfth aspect, in an eleventh possible implementation manner, the area information update request message and/or the accept message carries a terminal identity of the first terminal.

According to a thirteenth aspect, an embodiment of the present invention provides an area information update method, including:

obtaining, by a first terminal, area information of the first terminal; and updating, by the first terminal according to the obtained area information of the first terminal, area information of a second terminal to which the first terminal provides a relay service.

With reference to the thirteenth aspect, in a first possible implementation manner, the obtaining, by a first terminal, area information of the first terminal includes:

sending, by the first terminal, a first area information update request message for updating the area information of the first terminal; and using, by the first terminal, area information in an accept message of the first area information update request message as the area information of the first terminal.

With reference to the thirteenth aspect, in a second possible implementation manner, the updating, by the first terminal according to the obtained area information of the first terminal, area information of a second terminal includes: when at least one of the following conditions is met, updating, by the first terminal, the area information of the second terminal according to the obtained area information of the first terminal:

the first terminal detects that the second terminal becomes a terminal to which the first terminal provides the relay service;

the first terminal determines that the area information of the second terminal does not overlap the area information of the first terminal;

the area information of the first terminal changes; or the first terminal receives a second area information update request message that is sent by the second terminal and that is used to update the area information of the second terminal.

With reference to the thirteenth aspect, the first possible implementation manner of the thirteenth aspect, or the second possible implementation manner of the thirteenth aspect, in a third possible implementation manner, the updating, by the first terminal according to the obtained area information of the first terminal, area information of a second terminal includes:

sending, by the first terminal, a part or all of the area information of the first terminal to the second terminal.

According to a fourteenth aspect, an embodiment of the present invention provides an area information update method, including:

obtaining, by a second terminal, updated area information of the second terminal from a first terminal; and updating, by the second terminal, area information of the second terminal according to the obtained updated area information of the second terminal, where the first terminal provides a relay service to the second terminal.

With reference to the fourteenth aspect, in a first possible implementation manner, the obtaining, by a second terminal, updated area information of the second terminal from a first terminal includes:

receiving, by the second terminal, an area information update accept message sent by the first terminal; and obtaining, by the second terminal, the updated area information of the second terminal from the received area information update accept message.

With reference to the first possible implementation manner of the fourteenth aspect, in a second possible implementation manner, after the obtaining, by the second terminal, the updated area information of the second terminal from the received area information update accept message, the method further includes:

sending, by the second terminal, the obtained updated area information of the second terminal to the first terminal.

With reference to the first possible implementation manner of the fourteenth aspect, in a third possible implementation manner, before the receiving, by the second terminal, an area information update accept message sent by the first terminal, the method further includes:

sending, by the second terminal by using the first terminal, an area information update request message for updating the area information; and the area information update accept message received by the second terminal responds to the area information update request message sent by the second terminal.

With reference to the fourteenth aspect, in a fourth possible implementation manner, the obtaining, by a second terminal, updated area information of the second terminal from a first terminal includes:

receiving, by the second terminal, the updated area information of the second terminal sent by the first terminal.

With reference to the fourth possible implementation manner of the fourteenth aspect, in a fifth possible implementation manner, the updated area information of the second terminal received by the second terminal from the first terminal includes:

all or a part of area information of the first terminal; or the updated area information of the second terminal obtained by the first terminal from a network.

With reference to the fourth possible implementation manner of the fourteenth aspect, in a sixth possible implementation manner, before the receiving, by the second terminal, the updated area information of the second terminal sent by the first terminal, the method further includes:

sending, by the second terminal by using the first terminal, an area information update request message for updating the area information; and the updated area information of the second terminal received by the second terminal is sent by the first terminal after the first terminal receives the area information update request message sent by the second terminal.

With reference to the third possible implementation manner or the sixth possible implementation manner of the fourteenth aspect, in a seventh possible implementation manner, before the sending, by the second terminal, an area information update request message by using the first terminal, the method further includes: obtaining, by the second terminal, area information of the first terminal; and the sending, by the second terminal, an area information update request message by using the first terminal includes:

when determining that an area in which the second terminal is located does not overlap an area indicated by the obtained area information of the first terminal, sending, by the second terminal, the area information update request message by using the first terminal.

With reference to the seventh possible implementation manner of the fourteenth aspect, in an eighth possible implementation manner of the fourteenth aspect, the obtaining, by the second terminal, area information of the first terminal includes:

when becoming a terminal to which the first terminal provides the relay service, obtaining, by the second terminal, the area information of the first terminal.

With reference to the third possible implementation manner or the sixth possible implementation manner of the fourteenth aspect, in a ninth possible implementation manner, the sending, by the second terminal, an area information update request message by using the first terminal includes:

when becoming a terminal to which the first terminal provides the relay service, sending, by the second terminal, the area information update request message by using the first terminal.

With reference to the third possible implementation manner, the sixth possible implementation manner, the seventh possible implementation manner, the eighth possible implementation manner, or the ninth possible implementation manner of the fourteenth aspect, in a tenth possible implementation manner, the area information update request message carries first indication information, and the first indication information is used to indicate that the second terminal is a terminal to which another terminal provides the relay service; and/or the area information update accept message carries second indication information, and the second indication information is used to indicate that the second terminal is a terminal to which another terminal provides the relay service.

With reference to the third possible implementation manner, the sixth possible implementation manner, the seventh possible implementation manner, the eighth possible implementation manner, the ninth possible implementation manner, or the tenth possible implementation manner of the fourteenth aspect, in an eleventh possible implementation manner, the area information update request message and/or the area information update accept message carries a terminal identity of the first terminal.

In conclusion, for a terminal relay scenario, by means of the embodiments of the present invention, a second terminal can be paged by using a first terminal; and by means of the embodiments of the present invention, area information of the second terminal can be updated by using the first terminal.

DETAILED DESCRIPTION OF ILLUSTRATIVE EMBODIMENTS

Figure 2A:
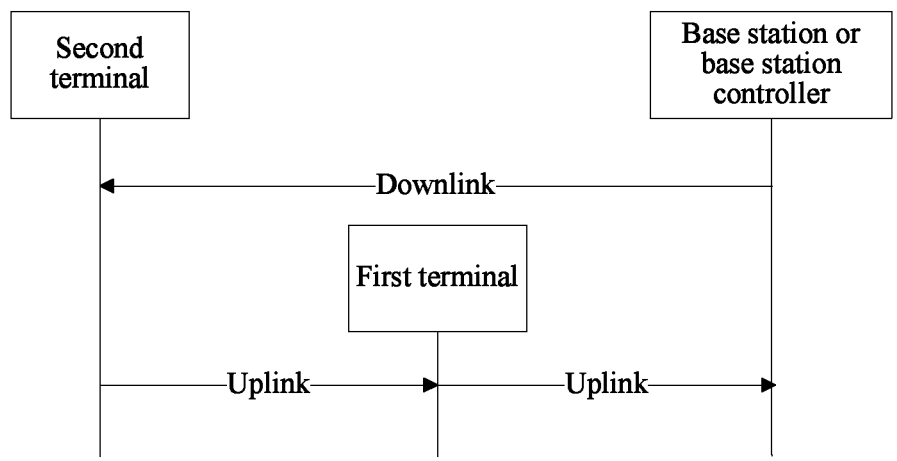
FIG. 2A is a schematic diagram of a manner 1 in which a second terminal communicates by using a first terminal according to an embodiment of the present invention.
Figure 2B:
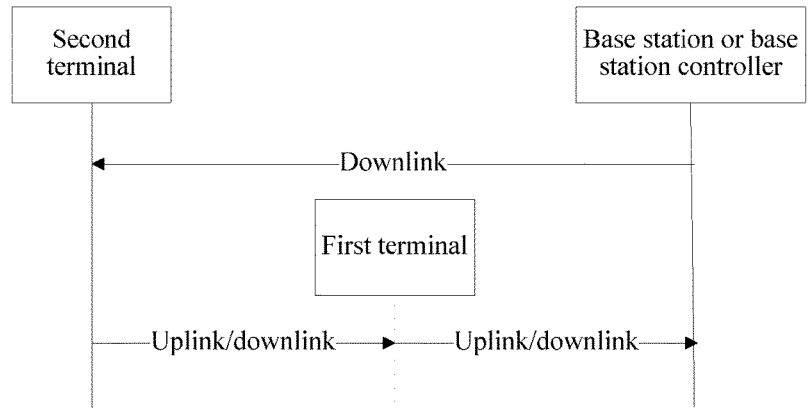
FIG. 2B is a schematic diagram of a manner 2 in which a second terminal communicates by using a first terminal according to an embodiment of the present invention.
Figure 2C:
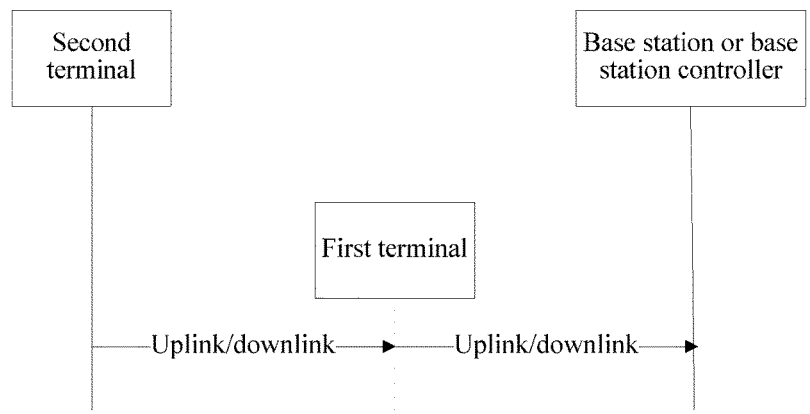
FIG. 2C is a schematic diagram of a manner 3 in which a second terminal communicates by using a first terminal according to an embodiment of the present invention.

Embodiments of the present invention provide three manners in which a first terminal provides a relay service to a second terminal:

a manner 1: The second terminal directly receives a downlink signal from a base station or a base station controller, and an uplink signal sent by the second terminal to a second network device is forwarded by using the first terminal, as shown in FIG. 2A;

a manner 2: The second terminal directly receives necessary control information, for example, system information, from a base station or a base station controller, and other messages and data are all relayed by using the first terminal, as shown in FIG. 2B; and a manner 3: All messages and data of the second terminal are relayed by using the first terminal, as shown in FIG. 2C.

In one aspect, for the manner 3 and a scenario in which a paging message is forwarded by the first terminal to the second terminal in the manner 2, the embodiments of the present invention provide a paging method and apparatus, applied to paging the second terminal by using the first terminal in a process of paging the second terminal.

In another aspect, in the process of paging the second terminal, to obtain a limited location area of the second terminal, so that the second terminal can be found timely and effectively when the second terminal is paged, area information of an area in which the second terminal is located further needs to be updated. Therefore, the embodiments of the present invention provide an area information update method and apparatus, applied to updating the area information of the second terminal by using the first terminal in a process of updating the area information of the second terminal.

The embodiments of the present invention are applicable to a wireless communications system in which one or more terminals provide the relay service to another one or more terminals. The system includes but not limited to: a Global System for Mobile communications (Global System of Mobile communication, GSM), a Code Division Multiple Access (Code Division Multiple Access, CDMA) IS-95, a Code Division Multiple Access (Code Division Multiple Access, CDMA)2000, a Time Division-Synchronous Code Division Multiple Access (Time Division-Synchronous Code Division Multiple Access, TD-SCDMA), a Wideband Code Division Multiple Access (Wideband Code Division Multiple Access, WCDMA), a Time Division Duplexing-Long Term Evolution (Time Division Duplexing-Long Term Evolution, TDD LTE), a Frequency Division Duplexing-Long Term Evolution (Frequency Division Duplexing-Long Term Evolution, FDD LTE), a Long Term Evolution-Advanced (Long Term Evolution-Advanced, LTE-A), a personal handy-phone system (Personal Handy-phone System, PHS), and the like.

In the embodiments of the present invention, a first network device may be a core network device, and a second network device may be a base station.

For example, for systems such as TDD LTE, FDD LTE, and LTE-A, the first network device may be a mobility management entity (Mobility Management Entity, MME), and the second network device may be an evolved NodeB (evolved NodeB, eNodeB).

Alternatively, the first network device is a core network device, and the second network device is a base station controller.

For example, for systems such as the WCDMA and the TD-SCDMA, the first network device may be a mobile switching center (Mobile Switch Center, MSC), and the second network device may be a radio network controller (Radio Network Controller, RNC).

For another example, for the GSM system, the first network device may be a mobile switching center (Mobile Switch Center, MSC), and the second network device may be a base station controller (Base Station Controller, BSC).

As described above, for ease of description, in the embodiments of the present invention, a terminal that provides the relay service to another terminal is referred to as a "first terminal", a terminal to which another terminal provides the relay service is referred to as a "second terminal", and the following possibilities are not excluded:

A terminal A is a terminal to which a terminal B provides the relay service, and the terminal A also provides the relay service to a terminal C. In this case, the terminal A is referred to as a "second terminal" to the terminal B, and the terminal A is referred to as a "first terminal" to the terminal C. Because the terminal B provides the relay service to the terminal C by using the terminal A, the terminal B is also referred to as a "first terminal" to the terminal C. The terminal C is referred to as a "second terminal" to both the terminal B and the terminal A.

The following describes the embodiments of the present invention in detail with reference to accompanying drawings.

For clarity, the embodiments of the present invention are first briefly described.

In Embodiment 1 to Embodiment 18, the paging method and apparatus provided in the embodiments of the present invention are described from different perspectives. In Embodiment 19 to Embodiment 30, the area information update method and apparatus provided in the embodiments of the present invention are described from different perspectives. Brief descriptions of the embodiments are listed in the following Table 1.

TABLE 1

| Brief descriptions of the embodiments of the present invention | |
|---|---|
| Embodiment | Brief description |
| Embodiment 1 | A paging process in the embodiments of the present invention is described from the perspective of mutual cooperation between a first terminal, a second terminal, a second network device, and a first network device |
| Embodiment 2 | First network device |
| Embodiment 3 | First network device |
| Embodiment 4 | Second network device |

TABLE 1-continued

Brief descriptions of the embodiments of the present invention

| Embodiment | Brief description |
| --- | --- |
| Embodiment 5 | Second network device |
| Embodiment 6 | First terminal |
| Embodiment 7 | First terminal |
| Embodiment 8 | Second terminal |
| Embodiment 9 | Second terminal |
| Embodiment 10 | Paging method |
| Embodiment 11 | Paging method |
| Embodiment 12 | Paging method |
| Embodiment 13 | Paging method |
| Embodiment 14 | Paging process in a first specific implementation manner |
| Embodiment 15 | Paging process in a second specific implementation manner |
| Embodiment 16 | Paging process in a third specific implementation manner |
| Embodiment 17 | Paging process in a fourth specific implementation manner |
| Embodiment 18 | Paging process in a fifth specific implementation manner |
| Embodiment 19 | An area information update process in the embodiments of the present invention is described from the perspective of mutual cooperation between a first terminal, a second terminal, and a network |
| Embodiment 20 | First terminal |
| Embodiment 21 | First terminal |
| Embodiment 22 | Second terminal |
| Embodiment 23 | Second terminal |
| Embodiment 24 | Area information update method |
| Embodiment 25 | Area information update method |
| Embodiment 26 | Area information update process in a first specific implementation manner |
| Embodiment 27 | Area information update process in a second specific implementation manner |
| Embodiment 28 | Area information update process in a third specific implementation manner |
| Embodiment 29 | Area information update process in a fourth specific implementation manner |
| Embodiment 30 | Area information update process in a fifth specific implementation manner |

Figure 1:
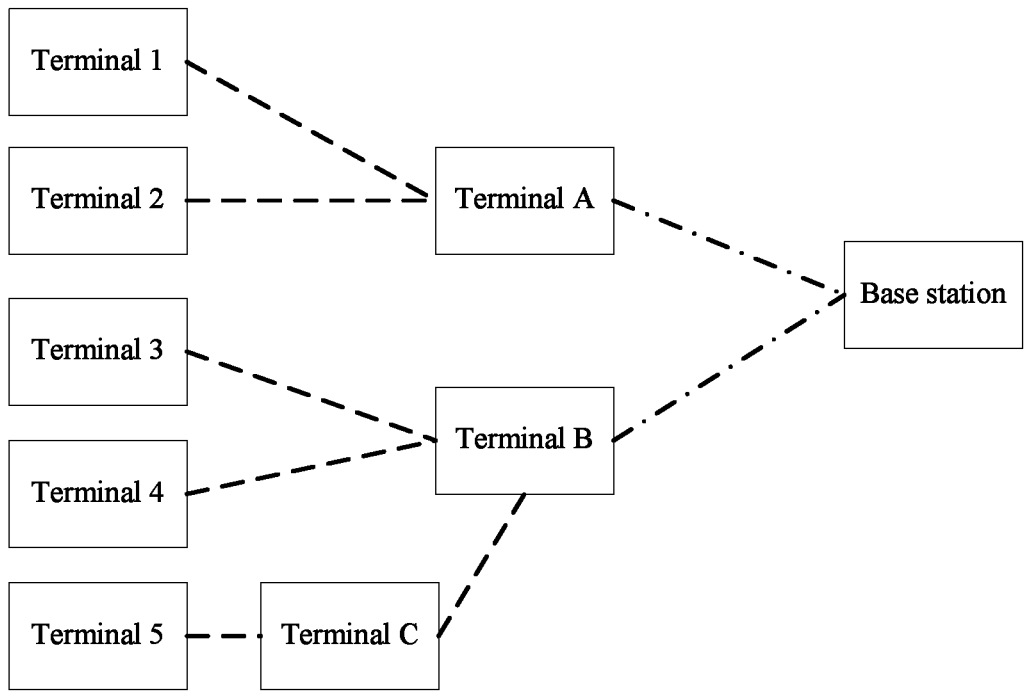
FIG. 1 is a schematic diagram of a terminal relay scenario.

In Embodiment 1 to Embodiment 18, a paging message may be considered as a device discovery message, and the first network device, the second network device, or the first terminal discovers or finds the second terminal by using the paging message. In Embodiment 1 to Embodiment 18, a paging message sent by the second network device to the first terminal may be sent by the second network device to the first terminal directly, or may be sent by the second network device to the first terminal by using another terminal. For example, in FIG. 1, a base station serves as a second network device, and sends, to a terminal C by using a terminal B, a paging message for paging a terminal 5, where multiple terminals, that is, the terminal B and the terminal C, provide the relay service to the terminal 5 by using multiple hops.

Embodiment 1

In Embodiment 1, a paging process in the embodiments of the present invention is described from the perspective of mutual cooperation between a first terminal, a second terminal, a second network device, and a first network device.

Figure 3:
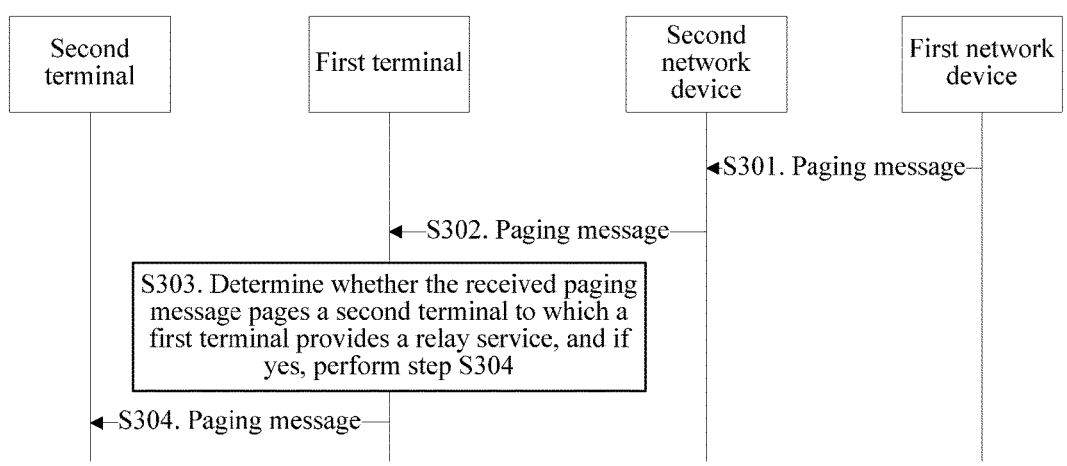
FIG. 3 is a flowchart of a paging process according to Embodiment 1 of the present invention.

Referring to FIG. 3, the paging process in Embodiment 1 includes the following steps:

S301: A first network device sends a paging message to a second network device.

S302: After receiving the paging message sent by the first network device, the second network device sends the paging message to a first terminal.

S303: After receiving the paging message sent by the second network device, the first terminal determines whether the received paging message pages a second terminal to which the first terminal provides a relay service, and if yes, performs step S304.

S304: The first terminal pages the second terminal.

Optionally, in step S301, there may be three manners for the first network device to send the paging message to the second network device:

Paging Manner 1 for the First Network Device

The first network device sends a first paging message for paging the second terminal. The first paging message carries a terminal identity of the second terminal and a terminal identity of the first terminal that provides the relay service to the second terminal.

Paging Manner 2 for the First Network Device

The first network device sends a second paging message for paging the first terminal. The second paging message carries a terminal identity of the first terminal and a terminal identity of the second terminal that needs to be paged by using the first terminal and to which the first terminal provides the relay service.

Paging Manner 3 for the First Network Device

The first network device sends a third paging message for paging the second terminal, where the third paging message carries a terminal identity of the second terminal and first indication information used to indicate that the second terminal is a terminal to which another terminal provides the relay service.

When the first network device sends a paging message for paging a terminal, optionally, the following message format 1 may be used, where a terminal identity of the to-be-paged terminal is carried in an information element (Information Element, IE) UE Paging Identity (a UE paging identity).

Message format 1:
Message Type (a message type)
UE Identity Index value (an identity index value of UE)
UE Paging Identity (a paging identity of the UE)
UE Other Identity Index value (an identity index value of another piece of UE)
UE Other Paging Identity (a paging identity of a relay)
Relay indication (a relay indication)
Paging DRX (a parameter of discontinuous reception during paging)
List of TAIs (a tracking area identity list)
>TAI List Item (a tracking area identity list item)
>>TAI (a tracking area identity)

In the message format 1, a specific message format of an S1 interface in an LTE is used as an example, and Paging DRX and List of TAIs are both optional paging parameters. Relay indication is optional indication information used to indicate that the second terminal is a terminal to which another terminal provides the relay service.

If the message format 1 is used, for different paging manners for the first network device, UE Paging Identity and UE Other Identity have different meanings. A specific description is as follows.

Paging Manner 1 for the First Network Device

For the paging manner 1 for the first network device, UE Paging Identity is the terminal identity of the second terminal, UE Other Paging Identity is the terminal identity of the first terminal that provides the relay service to the second terminal, UE Identity Index value is used to calculate a paging moment of the second terminal, and UE Other Identity Index value is used to calculate a paging moment of the first terminal.

If there are multiple first terminals that provide the relay service to the second terminal, an optional manner is carrying identities of the multiple first terminals by using a list, for example,
UE Other Paging Identity List
>UE Other Paging Identity Alternatively, if the second terminal is a terminal to which multiple first terminals provide the relay service by using multiple hops, an optional manner is carrying identities of the multiple first terminals at the multiple hops by using a list, for example,
UE Other Paging Identity List
>UE Other Paging Identity Paging Manner 2 for the First Network Device For the paging manner 2 for the first network device, UE Paging Identity is the terminal identity of the first terminal, UE Other Paging Identity is the terminal identity of the second terminal that needs to be paged by using the first terminal and to which the first terminal provides the relay service, UE Identity Index value is used to calculate a paging moment of the first terminal, and UE Other Identity Index value is used to calculate a paging moment of the second terminal.

If there are multiple second terminals to which the first terminal provides the relay service, identities of the multiple second terminals may also be carried by using a list, for example,
UE Other Paging Identity List
>UE Other Paging Identity Alternatively, if multiple first terminals provide the relay service to the second terminal by using multiple hops, an optional manner is carrying identities of the multiple first terminals at the multiple hops by using a list, for example,
UE Paging Identity List
>UE Paging Identity Optionally, it may be preset that, in UE Paging Identity List, UE Paging Identity that ranks the first is used to identity a first-hop first terminal that receives the paging message sent by the second network device, UE Paging Identity that ranks the second is used to identity a second-hop first terminal that receives the paging message from the first-hop first terminal, and so on.

Paging Manner 3 for the First Network Device

For the paging manner 3 for the first network device, UE Paging Identity is the terminal identity of the second terminal, and the terminal identity of the first terminal that provides the relay service to the second terminal may be carried or may be not carried, that is, UE Other Paging Identity is optional. In this manner, indication information Relay indication used to indicate that the second terminal is a terminal to which another terminal provides the relay service needs to be carried.

It should be noted that, the message format 1 is merely exemplary. During a specific implementation, which IE in the message identifies a first terminal and which IE in the message identifies a second terminal may be preset in a protocol, as long as the first network device and the second network device observe a same agreement and can perform consistent determining.

For the paging manner 1 for the first network device and the paging manner 2 for the first network device, optionally, the paging message sent by the first network device (for the paging manner 1 for the first network device, the paging message is the first paging message, and for the paging manner 2 for the first network device, the paging message is the second paging message) may carry one or more the following information:
a paging parameter used to determine the paging moment of the second terminal;
a paging parameter used to determine the paging moment of the first terminal;
area information of the second terminal; or area information of the first terminal.

Optionally, for the paging manner 3 for the first network device, a third network message may further carry at least one of the following information:
a paging parameter used to determine the paging moment of the second terminal; or
area information of the second terminal.

If the message format 1 is used, the paging parameter may be carried by using Paging DRX, and the area information may be carried by using the following parameter:
List of TAIs
>TAI List Item
>>TAI For a method for determining a paging moment according to Paging DRX, refer to a description in the section 7.1 Discontinuous Reception for paging (Discontinuous Reception for paging) in the Technical Specification (Technical Specification, TS) 36.304 of the $3^{rd}$ Generation Partnership Project ($3^{rd}$ Generation Partnership Project).

For the paging manner 1 for the first network device and the paging manner 2 for the first network device, optionally, the paging message sent by the first network device (for the paging manner 1 for the first network device, the paging message is the first paging message, and for the paging manner 2 for the first network device, the paging message is the second paging message) may carry indication information used to indicate that the second terminal is a terminal to which another terminal provides the relay service, for example, Relay indication in the message format 1.

Regardless of the paging manner 1 for the first network device, the paging manner 2 for the first network device, or the paging manner 3 for the first network device, optionally, Relay indication may be a Boolean (BOOLEAN) quantity. Optionally, when a value is "TRUE", it indicates that the second terminal is a terminal to which another terminal provides the relay service.

In conclusion, in Embodiment 1, a manner for the first network device to send paging includes but not limited to the following three: paging the second terminal, where the paging message carries the terminal identity of the first terminal that provides the relay service to the second terminal; paging the first terminal, where the paging message carries the terminal identity of the second terminal that needs to be paged by using the first terminal and to which the first terminal provides the relay service; and paging the second terminal, where the paging message carries the indication information used to indicate that the second terminal is a terminal to which another terminal provides the relay service.

For the paging manner 1 for the first network device and the paging manner 2 for the first network device, the paging message sent by the first network device may further carry the paging parameter used to determine the paging moment of the second terminal and/or the first terminal, and the area information of the first terminal and/or the second terminal, and besides, may further carry the indication information used to indicate that the second terminal is a terminal to which another terminal provides the relay service.

For the paging manner 3 for the first network device, the paging message sent by the first network device may further carry the paging parameter used to determine the paging moment of the second terminal, and/or the area information of the second terminal.

The following describes a processing procedure executed by the second network device after the second network device receives the paging message sent by the first network device in Embodiment 1.

After receiving the paging message sent by the first network device, the second network device pages the second terminal by using the first terminal. A manner for paging the second terminal includes but not limited to the following three:

Paging Manner 1 for the Second Network Device

The second network device sends a paging message for paging the second terminal, where the message carries the terminal identity of the second terminal and the terminal identity of the first terminal that provides the relay service to the second terminal.

Paging Manner 2 for the Second Network Device

The second network device sends a paging message for paging the first terminal, where the message carries the terminal identity of the first terminal and the terminal identity of the second terminal that needs to be paged by using the first terminal and to which the first terminal provides the relay service.

Paging Manner 3 for the Second Network Device

The second network device sends a paging message for paging the second terminal, where the message carries the terminal identity of the second terminal and indication information used to indicate that the second terminal is a terminal to which another terminal provides the relay service.

Optionally, for the paging manner 1 for the second network device and the paging manner 2 for the second network device, the paging message sent by the second network device may also carry the indication information used to indicate that the second terminal is a terminal to which another terminal provides the relay service.

For the three different manners for the first network device to send a paging message to the second network device, the second network device performs slightly different processing after receiving the paging message. Details are as follows.

For the Paging Manner 1 for the First Network Device

The second network device receives the paging message for paging the second terminal that is sent by the first network device, where the message carries the terminal identity of the second terminal and the terminal identity of the first terminal that provides the relay service to the second terminal. The second network device pages the second terminal by using the first terminal.

For the Paging Manner 2 for the First Network Device

The second network device receives the paging message for paging the first terminal that is sent by the first network device, where the message carries the terminal identity of the first terminal and the terminal identity of the second terminal that needs to be paged by using the first terminal and to which the first terminal provides the relay service. The second network device pages the second terminal by using the first terminal.

For the Paging Manner 3 for the First Network Device

The second network device receives the third paging message for paging the second terminal, where the third paging message carries the terminal identity of the second terminal and the indication information used to indicate that the second terminal is a terminal to which another terminal provides the relay service. The second network device determines the first terminal that provides the relay service to the second terminal, and pages the second terminal by using the determined first terminal.

For the paging manner 1 for the first network device and the paging manner 2 for the first network device, the paging message sent by the first network device carries at least one of the following information:

the paging parameter used to determine the paging moment of the second terminal;

the paging parameter used to determine the paging moment of the first terminal;

the area information of the second terminal; or the area information of the first terminal.

The second network device obtains the information from the received first network device, and sends the paging message according to the obtained information.

For example, the paging message sent by the first network device carries the paging parameter used to determine the paging moment of the second terminal, and the second network device may determine, according to the obtained paging parameter used to determine the paging moment of the second terminal, a paging moment for the second network device to send the paging message. An optional manner is: The second network device determines the paging moment of the second terminal according to the obtained paging parameter used to determine the paging moment of the second terminal, and sends the paging message at the determined paging moment of the second terminal. In this case, the first terminal receives, at the paging moment of the second terminal, the paging message sent by the second network device.

For another example, the paging message sent by the first network device carries the paging parameter used to determine the paging moment of the first terminal, and the second network device may determine, according to the obtained paging parameter used to determine the paging moment of the first terminal, a paging moment for the second network device to send the paging message. An optional manner is: The second network device determines the paging moment of the first terminal according to the obtained paging parameter used to determine the paging moment of the first terminal, and sends the paging message at the determined paging moment of the first terminal. In this case, the first terminal receives, at the paging moment of the first terminal, the paging message sent by the second network device.

For another example, the paging message sent by the first network device carries the paging parameter used to determine the paging moment of the second terminal and the paging parameter used to determine the paging moment of the first terminal, and the second network device may determine, according to the two obtained paging parameters, a paging moment for the second network device to send the paging message. An optional manner is: The second network device determines the paging moment of the second terminal according to the obtained paging parameter used to determine the paging moment of the second terminal, and determines the paging moment of the first terminal according to the obtained paging parameter used to determine the paging moment of the first terminal, and the second network device sends the paging message at both the determined paging moment of the second terminal and the determined paging moment of the first terminal. In this case, the first terminal receives, at both the paging moment of the first terminal and the paging moment of the second terminal, the paging message sent by the second network device, which can effectively increase a success rate in paging the second terminal. Alternatively, the first terminal receives, at the paging moment of the first terminal or the paging moment of the second terminal, the paging message sent by the second network device.

For the area information of the terminal, a principle is similar to that of the paging parameter. If the paging message sent by the first network device carries the area information of the second terminal, the second network device may determine, according to the area information of the second terminal, an area for the second network device to send the paging message, for example, send the paging message in an area indicated by the area information of the second terminal. If the paging message sent by the first network device carries the area information of the first terminal, the second network device may determine, according to the area information of the first terminal, an area for the second network device to send the paging message, for example, send the paging message in an area indicated by the area information of the first terminal. If the paging message sent by the first network device carries the area information of the first terminal and paging information of the second terminal, the second network device may determine, according to the area information of the first terminal and the area information of the second terminal, an area for the second network device to send the paging message, for example, send the paging message in both an area indicated by the area information of the first terminal and an area indicated by the area information of the second terminal, which also increases the success rate in paging the second terminal.

For the paging manner 3 for the first network device, optionally, the paging message sent by the first network device may carry at least one of the following information:

the paging parameter used to determine the paging moment of the second terminal; or the area information of the second terminal.

If the paging message sent by the first network device carries the paging parameter used to determine the paging moment of the second terminal, the second network device may determine, according to the obtained paging parameter used to determine the paging moment of the second terminal, a paging moment for the second network device to send the paging message. An optional manner is: The second network device determines the paging moment of the second terminal according to the obtained paging parameter used to determine the paging moment of the second terminal, and sends the paging message at the determined paging moment of the second terminal. In this case, the first terminal receives, at the paging moment of the second terminal, the paging message sent by the second network device. Optionally, before receiving the paging message sent by the second network device, the first terminal receives a message that is sent by the second terminal and that is used to indicate the paging moment of the second terminal, and determines the paging moment of the second terminal according to the received message.

If the paging message sent by the first network device carries the area information of the second terminal, the second network device may determine, according to the area information of the second terminal, an area for the second network device to send the paging message, for example, send the paging message in an area indicated by the area information of the second terminal.

Optionally, for the paging manner 3 for the first network device, after receiving the paging message sent by the first network device, the second network device may determine, in one of the following manners, the another terminal that provides the relay service to the second terminal:

The second network device determines, according to a terminal identity, stored in the second network device, of a terminal that provides the relay service to the second terminal, the first terminal that provides the relay service to the second terminal. For example, the second network device determines some or all of one or more terminals identified by the terminal identity, stored in the second network device, of the terminal that provides the relay service to the second terminal, as the first terminal that provides the relay service to the second terminal.

The second network device uses each terminal in a coverage area of the second network device as the terminal that provides the relay service to the second terminal.

Optionally, when the second network device sends the paging message, the following message format 2 may be used:

Message Format 2:

For the message format 2, an existing PagingRecord field of a Paging message in the 3GPP TS36.331 is modified, and an IE Relay indication is added thereto and is of a Boolean type. Details are as follows.

```
PagingRecord ::=                                    SEQUENCE {
    ue-Identity        PagingUE-Identity,
    ue-other-Identity       PagingUE-Identity,
    Relay indication BOOLEAN
    ...
}
```

If the message format 2 is used, for different paging manners for the second network device, ue-Identity and ue-other-Identity have different meanings. A specific description is as follows.

Paging Manner 1 for the Second Network Device

For the paging manner 1 for the second network device, in the message format 2, ue-Identity is the terminal identity of the second terminal, and ue-other-Identity is the terminal identity of the first terminal that provides the relay service to the second terminal.

Paging Manner 2 for the Second Network Device

For the paging manner 2 for the second network device, in the message format 2, ue-Identity is the terminal identity of the first terminal, and ue-other-Identity is the terminal identity of the second terminal to which the first terminal provides the relay service.

Paging Manner 3 for the Second Network Device

For the paging manner 3 for the second network device, ue-Identity is the terminal identity of the second terminal. The terminal identity of the first terminal that provides the relay service to the second terminal may be carried or may be not carried, that is, ue-other-Identity is optional. In this manner, indication information Relay indication used to indicate that the second terminal is a terminal to which another terminal provides the relay service needs to be carried.

For the paging manner 3 for the second network device, after receiving the paging message sent by the first network device, optionally, the second network device may use each terminal in the coverage area of the second network device as the first terminal that provides the relay service to the second terminal. The second network device sends the paging message for paging the second terminal to each terminal in the coverage area of the second network device, where ue-Identity in the message is the terminal identity of the second terminal. In this case, optionally, ue-other-Identity, that is, the terminal identity of the first terminal, may be carried or may be not carried, but Relay indication needs to be carried, to indicate that the second terminal is a terminal to which another terminal provides the relay service.

That the second network device sends the paging message for paging the second terminal to each terminal in the coverage area of the second network device may be: The second network device sends, at one or more of all possible paging moments, the paging message for paging the second terminal.

Optionally, for all of the paging manner 1 for the first network device, the paging manner 2 for the first network device, and the paging manner 3 for the first network device, the second network device may send the paging message for paging the second terminal, where the paging message may be sent at the determined paging moment of the first terminal, or may be sent at the paging moment of the second terminal.

Optionally, if a terminal receiving the paging message determines that a terminal identity, stored in the terminal, of a terminal to which the terminal provides the relay service includes the terminal identity of the second terminal in the paging message, the terminal determines that the paging message pages a second terminal to which the terminal provides the relay service.

Relay indication is a newly added IE, and used to indicate that the second terminal is a terminal to which another terminal provides the relay service, and Relay indication may be a Boolean quantity. Optionally, when a value is "TRUE", it indicates that the second terminal is a terminal to which another terminal provides the relay service.

Similar to the manners for the first network device to send the paging message, if the paging message sent by the second network device carries information such as a paging parameter or area information, in the message format 2, Paging DRX may be further added to carry the paging parameter, and List of TAIs may be further added to carry the area information. For a method for determining a paging moment according to Paging DRX and a method for carrying area information by List of TAIs, refer to corresponding explanations in the paging format 1. Details are not described herein again.

In conclusion, after receiving the paging message sent by the first network device, the second network device performs different processing for different paging manners for the first network device, and when paging the second terminal by using the first terminal, may send the paging message for paging the first terminal, where the message carries the terminal identity of the second terminal; or send the paging message for paging the second terminal, where the message carries the terminal identity of the first terminal; or send the paging message for paging the second terminal, where the message carries the indication information used to indicate that the second terminal is a terminal to which another terminal provides the relay service. Optionally, the second network device may perform the paging according to a paging parameter and area information that are carried in the message sent by the first network device.

The following describes in detail processing executed by the first terminal after the first terminal receives the paging message sent by the second network device.

After receiving the paging message sent by the second network device, the first terminal first determines whether the received paging message pages a second terminal to which the first terminal provides the relay service, and if yes, pages the second terminal.

Optionally, the first terminal may determine, in the following manners, that the received paging message pages the second terminal to which the first terminal provides the relay service:

Manner 1

If the paging message includes indication information used to indicate that the second terminal is a terminal to which the first terminal provides the relay service, the first terminal determines that the paging message pages the second terminal to which the first terminal provides the relay service.

For example, in the message format 2, the indication information used to indicate that the second terminal is a terminal to which the first terminal provides the relay service may be carried explicitly. Optionally, one piece of indication information, for example, UE Relay indication, may be carried explicitly behind the terminal identity of the first terminal, the IE is different from Relay indication, Relay indication is used to indicate whether the second terminal is a terminal to which another terminal provides the relay service, and UE Relay indication indicates whether the second terminal is a terminal to which the first terminal identified by the terminal identity of the first terminal before the IE provides the relay service. Optionally, if UE Relay indication is TRUE, it indicates that the second terminal is a terminal to which the first terminal provides the relay service. Moreover, the paging message includes the terminal identity of the first terminal.

For another example, the indication information used to indicate that the second terminal is a terminal to which the first terminal provides the relay service may be carried implicitly. For example, the paging message includes terminal identities of multiple second terminals and terminal identities of multiple first terminals, and the first terminals and the second network device may agree in advance that, a second terminal identified by an $M^{th}$ terminal identity of a second terminal is a terminal to which a first terminal identified by an $N^{th}$ terminal identity of a first terminal provides the relay service. After receiving the paging message, the first terminal may determine, according to the rule, whether the paging message pages the second terminal to which the first terminal provides the relay service.

Manner 2

If a terminal identity list stored, in the first terminal, of terminals to which the first terminal provides the relay service includes the terminal identity of the second terminal paged by the paging message, the first terminal determines that the paging message pages a terminal to which the first terminal provides the relay service.

For the manner 2, the first terminal may detect a terminal to which the first terminal provides the relay service, delete, from the terminal identity list, a terminal identity of a terminal to which the first terminal no longer provides the relay service; and add, to the terminal identity list, a terminal identity of a terminal that becomes a terminal to which the first terminal provides the relay service.

Optionally, after receiving the paging message sent by the second network device, if the first terminal determines that the paging message includes indication information used to indicate that the paging message further pages the first terminal, the first terminal determines that the paging message further pages the first terminal.

Optionally, when paging the second terminal, the first terminal may page the second terminal at the paging moment of the second terminal. The first terminal may determine the paging moment of the second terminal in the following manners:

The first terminal determines the paging moment of the second terminal according to paging moment information received from the second terminal.

The first terminal determines the paging moment of the second terminal according to a paging parameter that is received from the second terminal and that is used to determine the paging moment. For example, the paging parameter is Paging DRX, and has a meaning the same as that described above. Details are not described herein again.

The first terminal determines the paging moment of the second terminal according to paging moment information of the second terminal obtained from the paging message. For example, the paging moment information includes what time to start paging and a paging period, and the first terminal pages the second terminal according to the received paging moment information.

The first terminal determines the paging moment of the second terminal according to a paging parameter that is obtained from the paging message sent by the second network device and that is used to determine the paging moment of the second terminal. For example, the paging message sent by the second network device to the first terminal carries a paging parameter, and the first terminal determines the paging moment of the second terminal according to the paging parameter in the received paging message.

Optionally, before the first terminal receives the paging message sent by the second network device, the first terminal determines the paging moment of the second terminal to which the first terminal provides the relay service; and the first terminal receives the paging message at the paging moment of the second terminal; and/or the first terminal receives the paging message at the paging moment of the first terminal.

Optionally, the paging message received by the first terminal further carries indication information, and the indication information is used to indicate that the paging message pages a terminal to which another terminal provides the relay service.

Optionally, the paging message received by the first terminal further carries indication information used to indicate whether the first terminal is also paged.

Optionally, the paging message received by the first terminal includes the terminal identity of the first terminal.

In conclusion, after receiving the paging message sent by the second network device, and determining, in the two manners, that the paging message pages the second terminal to which the first terminal provides the relay service, the first terminal pages the second terminal.

The following describes a processing procedure executed by the second terminal after the second terminal receives the paging message sent by the first terminal.

The second terminal may be a terminal to which multiple first terminals provide the relay service, and may receive paging messages sent by the multiple first terminals.

After determining that a terminal identity in a received paging message is the terminal identity of the second terminal, the second terminal determines that the paging message is a paging message that pages the second terminal, and the second terminal performs a subsequent calling procedure in response to the paging.

Optionally, before the second terminal receives the paging message, the second terminal may send, to the first terminal, the paging parameter used to determine the paging moment of the second terminal, to instruct the first terminal to determine, according to the paging parameter, the paging moment for paging the second terminal.

Optionally, before the second terminal receives the paging message, the second terminal may send the area information of the second terminal to the first terminal, to instruct the first terminal to page the second terminal in the area indicated by the area information.

Optionally, before the second terminal receives the paging message, the second terminal may send the terminal identity of the second terminal to the first terminal, so that the first terminal records the identity of the second terminal, and the first terminal determines that the second terminal is a terminal to which the first terminal provides the relay service.

A paging process in the embodiments of the present invention is described above from the perspective of mutual cooperation between a first network device, a second network device, a first terminal, and a second terminal. The present invention describes, below by using Embodiment 2 to Embodiment 13, a first terminal, a second terminal, a first network device, a second network device, and a paging method provided in the embodiments of the present invention.

Embodiment 2

Figure 4:
FIG. 4 is a schematic structural diagram of a network device according to Embodiment 2 of the present invention.

FIG. 4 is a schematic structural diagram of a network device according to Embodiment 2 of the present invention. As shown in FIG. 4, the network device includes:

a processing module 401, configured to determine that the network device needs to page a second terminal; and a sending module 402, configured to:

send a first paging message for paging the second terminal, where the first paging message carries a terminal identity of the second terminal and a terminal identity of a first terminal that provides a relay service to the second terminal; or send a second paging message for paging a first terminal, where the second paging message carries a terminal identity of the first terminal and a terminal identity of the second terminal that needs to be paged by using the first terminal and to which the first terminal provides a relay service; or send a third paging message for paging the second terminal, where the third paging message carries a terminal identity of the second terminal and first indication information, and the first indication information is used to indicate that the second terminal is a terminal to which another terminal provides a relay service.

Optionally, the processing module 401 is further configured to: if the sending module 402 sends the first paging message, determine that the first paging message further carries at least one of the following information:

a paging parameter used to determine a paging moment of the second terminal;

a paging parameter used to determine a paging moment of the first terminal;

area information of the second terminal; or area information of the first terminal.

Optionally, the processing module 401 is further configured to: if the sending module 402 sends the second paging message, determine that the second paging message further carries at least one of the following information:

a paging parameter used to determine a paging moment of the first terminal;

a paging parameter used to determine a paging moment of the second terminal;

area information of the first terminal; or area information of the second terminal.

Optionally, the processing module 401 is further configured to: if the sending module 402 sends the third paging message, determine that the third paging message further carries at least one of the following information:

a paging parameter used to determine a paging moment of the second terminal; or area information of the second terminal.

Optionally, the processing module 401 is further configured to:

if the sending module 402 sends the first paging message, determine that the first paging message further carries second indication information, where the second indication information is used to indicate that the second terminal is a terminal to which another terminal provides the relay service; and/or if the sending module 402 sends the second paging message, determine that the second paging message further carries third indication information, where the third indication information is used to indicate that the second terminal is a terminal to which another terminal provides the relay service.

Embodiment 3

Figure 5:
FIG. 5 is a schematic structural diagram of a network device according to Embodiment 3 of the present invention.

FIG. 5 is a schematic structural diagram of a network device according to Embodiment 3 of the present invention. As shown in FIG. 5, the network device includes:

a processor 501, configured to determine that the network device needs to page a second terminal; and a transmitter 502, configured to:

send a first paging message for paging the second terminal, where the first paging message carries a terminal identity of the second terminal and a terminal identity of a first terminal that provides a relay service to the second terminal; or send a second paging message for paging a first terminal, where the second paging message carries a terminal identity of the first terminal and a terminal identity of the second terminal that needs to be paged by using the first terminal and to which the first terminal provides a relay service; or send a third paging message for paging the second terminal, where the third paging message carries a terminal identity of the second terminal and first indication information, and the first indication information is used to indicate that the second terminal is a terminal to which another terminal provides a relay service.

Optionally, the processor 501 is further configured to: if the transmitter 502 sends the first paging message, determine that the first paging message further carries at least one of the following information:

a paging parameter used to determine a paging moment of the second terminal;

a paging parameter used to determine a paging moment of the first terminal;

area information of the second terminal; or area information of the first terminal.

Optionally, the processor 501 is further configured to: if the transmitter 502 sends the second paging message, determine that the second paging message further carries at least one of the following information:

a paging parameter used to determine a paging moment of the first terminal;

a paging parameter used to determine a paging moment of the second terminal;

area information of the first terminal; or area information of the second terminal.

Optionally, the processor 501 is further configured to: if the transmitter 502 sends the third paging message, determine that the third paging message further carries at least one of the following information:

a paging parameter used to determine a paging moment of the second terminal; or area information of the second terminal.

Optionally, the processor 501 is further configured to:

if the transmitter 502 sends the first paging message, determine that the first paging message further carries second indication information, where the second indication information is used to indicate that the second terminal is a terminal to which another terminal provides the relay service; and/or if the transmitter 502 sends the second paging message, determine that the second paging message further carries third indication information, where the third indication information is used to indicate that the second terminal is a terminal to which another terminal provides the relay service.

Embodiment 4

Figure 6:
FIG. 6 is a schematic structural diagram of a network device according to Embodiment 4 of the present invention.

FIG. 6 is a schematic structural diagram of a network device according to Embodiment 4 of the present invention. As shown in FIG. 6, the network device includes: a receiving module 601 and a processing module 602, where the receiving module 601 is configured to receive a first paging message for paging a second terminal, where the first paging message carries a terminal identity of the second terminal and a terminal identity of a first terminal that provides a relay service to the second terminal; and the processing module 602 is configured to page the second terminal by using the first terminal, or send a tenth paging message for paging the second terminal, where the tenth paging message carries the terminal identity of the second terminal and indication information indicating that the second terminal is a terminal to which another terminal provides the relay service; or the receiving module 601 is configured to receive a second paging message for paging a first terminal, where the second paging message carries a terminal identity of the first terminal and a terminal identity of a second terminal that needs to be paged by using the first terminal and to which the first terminal provides a relay service; and the processing module 602 is configured to page the second terminal by using the first terminal, or send an eleventh paging message for paging the second terminal, where the eleventh paging message carries the terminal identity of the second terminal and indication information indicating that the second terminal is a terminal to which another terminal provides the relay service; or the receiving module 601 is configured to receive a third paging message for paging a second terminal, where the third paging message carries a terminal identity of the second terminal and first indication information, and the first indication information is used to indicate that the second terminal is a terminal to which another terminal provides a relay service; and the processing module 602 is configured to determine a first terminal that provides the relay service to the second terminal, and page the second terminal by using the determined first terminal, or the processing module 602 is configured to send an eleventh paging message for paging the second terminal, where the eleventh paging message carries the terminal identity of the second terminal and indication information indicating that the second terminal is a terminal to which another terminal provides the relay service.

Optionally, if the receiving module 601 receives the first paging message, the processing module 602 is specifically configured to:

send a fourth paging message for paging the first terminal, where the fourth paging message carries the terminal identity of the first terminal and the terminal identity of the second terminal that needs to be paged by using the first terminal.

Optionally, the processing module 602 is further configured to: after the receiving module 601 receives the first paging message and before the processing module 602 sends the fourth paging message, obtain a paging parameter used to determine a paging moment of the first terminal, and/or obtain, from the first paging message, a paging parameter used to determine a paging moment of the second terminal; and determine, according to the obtained paging parameter, a paging moment for sending the fourth paging message; and the processing module 602 is specifically configured to:

send the fourth paging message at the determined paging moment for sending the fourth paging message.

Optionally, the processing module 602 is further configured to: after the receiving module 601 receives the first paging message and before the processing module 602 sends the fourth paging message, obtain area information of the first terminal, and/or obtain area information of the second terminal from the first paging message; and determine, according to the obtained area information, an area for sending the fourth paging message; and the processing module 602 is specifically configured to:
send the fourth paging message in the determined area for sending the fourth paging message.

Optionally, the fourth paging message further carries first indication information, and the first indication information is used to indicate that the second terminal is a terminal to which another terminal provides the relay service.

Optionally, if the receiving module 601 receives the first paging message, the processing module 602 is specifically configured to:

send a fifth paging message for paging the second terminal, where the fifth paging message carries the terminal identity of the second terminal and the terminal identity of the first terminal that needs to be used to page the second terminal.

Optionally, the processing module 602 is further configured to: after the receiving module 60i receives the first paging message and before the processing module 602 sends the fifth paging message, obtain a paging parameter used to determine a paging moment of the first terminal, and/or obtain, from the first paging message, a paging parameter used to determine a paging moment of the second terminal; and determine, according to the obtained paging parameter, a paging moment for sending the fifth paging message; and the processing module 602 is specifically configured to:

send the fifth paging message at the determined paging moment for sending the fifth paging message.

Optionally, the processing module 602 is further configured to: after the receiving module 601 receives the first paging message and before the processing module 602 sends the fifth paging message, obtain area information of the first terminal, and/or obtain area information of the second terminal from the first paging message; and determine, according to the obtained area information, an area for sending the fifth paging message; and the processing module 602 is specifically configured to:
send the fifth paging message in the determined area for sending the fifth paging message.

Optionally, the fifth paging message further carries second indication information, and the second indication information is used to indicate that the second terminal is a terminal to which another terminal provides the relay service.

Optionally, if the receiving module 601 receives the second paging message, the processing module 602 is specifically configured to:

send a sixth paging message for paging the first terminal, where the sixth paging message carries the terminal identity of the first terminal and the terminal identity of the second terminal that needs to be paged by using the first terminal.

Optionally, the processing module 602 is further configured to: after the receiving module 601 receives the second paging message and before the processing module 602 sends the sixth paging message, obtain a paging parameter used to determine a paging moment of the second terminal, and/or obtain, from the second paging message, a paging parameter used to determine a paging moment of the first terminal; and determine, according to the obtained paging parameter, a paging moment for sending the sixth paging message; and the processing module 602 is specifically configured to:

send the sixth paging message at the determined paging moment for sending the sixth paging message.

Optionally, the processing module 602 is further configured to: after the receiving module 601 receives the second paging message and before the processing module 602 sends the sixth paging message, obtain area information of the second terminal, and/or obtain area information of the first terminal from the second paging message; and determine, according to the obtained area information, an area for sending the sixth paging message; and the processing module 602 is specifically configured to:
send the sixth paging message in the determined area for sending the sixth paging message.

Optionally, the sixth paging message further carries third indication information, and the third indication information is used to indicate that the second terminal is a terminal to which another terminal provides the relay service.

Optionally, if the receiving module 601 receives the second paging message, the processing module 602 is specifically configured to:
send a seventh paging message for paging the second terminal, where the seventh paging message carries the terminal identity of the second terminal and the terminal identity of the first terminal that needs to be used to page the second terminal.

Optionally, the processing module 602 is further configured to: after the receiving module 601 receives the second paging message and before the processing module 602 sends the seventh paging message,
obtain a paging parameter used to determine a paging moment of the second terminal, and/or obtain, from the second paging message, a paging parameter used to determine a paging moment of the first terminal; and
determine, according to the obtained paging parameter, a paging moment for sending the seventh paging message; and
the processing module 602 is specifically configured to:
send the seventh paging message at the determined paging moment for sending the seventh paging message.

Optionally, the processing module 602 is further configured to: after the receiving module 601 receives the second paging message and before the processing module 602 sends the seventh paging message,
obtain area information of the second terminal, and/or obtain area information of the first terminal from the second paging message; and
determine, according to the obtained area information, an area for sending the seventh paging message; and
the processing module 602 is specifically configured to:
send the seventh paging message in the determined area for sending the seventh paging message.

Optionally, the seventh paging message further carries fourth indication information, and the fourth indication information is used to indicate that the second terminal is a terminal to which another terminal provides the relay service.

Optionally, if the receiving module 601 receives the third paging message, the processing module 602 is specifically configured to:
determine, according to a stored terminal identity of a terminal that provides the relay service to the second terminal, the first terminal that provides the relay service to the second terminal; or
use each terminal in a coverage area of the second network device as the first terminal that provides the relay service to the second terminal.

Optionally, if the receiving module 601 receives the third paging message, the processing module 602 is specifically configured to:
send an eighth paging message for paging the second terminal, where the eighth paging message carries the terminal identity of the second terminal and the terminal identity of the first terminal that needs to be used to page the second terminal.

Optionally, the processing module 602 is further configured to: after the receiving module 601 receives the third paging message and before the processing module 602 sends the eighth paging message,
obtain, from the third paging message, a paging parameter used to determine a paging moment of the second terminal, and determine, according to the obtained paging parameter, a paging moment for sending the eighth paging message; and
the processing module 602 is specifically configured to:
send the eighth paging message at the determined paging moment for sending the eighth paging message.

Optionally, the processing module 602 is further configured to: after the receiving module 601 receives the third paging message and before the processing module 602 sends the eighth paging message,
obtain area information of the second terminal from the third paging message; and determine, according to the obtained area information, an area for sending the eighth paging message; and
the processing module 602 is specifically configured to:
send the eighth paging message in the determined area for sending the eighth paging message.

Optionally, the eighth paging message further carries fifth indication information, and the fifth indication information is used to indicate that the second terminal is a terminal to which another terminal provides the relay service.

Optionally, if the receiving module 601 receives the third paging message, the processing module 602 is specifically configured to:
send a ninth paging message for paging the first terminal, where the ninth paging message carries the terminal identity of the first terminal and the terminal identity of the second terminal that needs to be paged by using the first terminal.

Optionally, the processing module 602 is further configured to: after the receiving module 601 receives the third paging message and before the processing module 602 sends the ninth paging message,
obtain, from the third paging message, a paging parameter used to determine a paging moment of the second terminal, and determine, according to the obtained paging parameter, a paging moment for sending the ninth paging message; and
the processing module 602 is specifically configured to:
send the ninth paging message at the determined paging moment for sending the ninth paging message.

Optionally, the processing module 602 is further configured to: after the receiving module 601 receives the third paging message and before the processing module 602 sends the ninth paging message,
obtain area information of the second terminal from the third paging message; and determine, according to the obtained area information, an area for sending the ninth paging message; and
the processing module 602 is specifically configured to:
send the ninth paging message in the determined area for sending the ninth paging message.

Optionally, the ninth paging message carries sixth indication information, and the sixth indication information is used to indicate that the second terminal is a terminal to which another terminal provides the relay service.

Embodiment 5

Figure 7:
FIG. 7 is a schematic structural diagram of a network device according to Embodiment 5 of the present invention.

FIG. 7 is a schematic structural diagram of a network device according to Embodiment 5 of the present invention. As shown in FIG. 7, the network device includes: a receiver 701 and a processor 702, where
the receiver 701 is configured to receive a first paging message for paging a second terminal, where the first paging message carries a terminal identity of the second terminal and a terminal identity of a first terminal that provides a relay service to the second terminal; and the processor 702 is configured to page the second terminal by using the first terminal, or send a tenth paging message for paging the second terminal, where the tenth paging message carries the terminal identity of the second terminal and indication information indicating that the second terminal is a terminal to which another terminal provides the relay service; or the receiver 701 is configured to receive a second paging message for paging a first terminal, where the second paging message carries a terminal identity of the first terminal and a terminal identity of a second terminal that needs to be paged by using the first terminal and to which the first terminal provides a relay service; and the processor 702 is configured to page the second terminal by using the first terminal, or send an eleventh paging message for paging the second terminal, where the eleventh paging message carries the terminal identity of the second terminal and indication information indicating that the second terminal is a terminal to which another terminal provides the relay service; or the receiver 701 is configured to receive a third paging message for paging a second terminal, where the third paging message carries a terminal identity of the second terminal and first indication information, and the first indication information is used to indicate that the second terminal is a terminal to which another terminal provides a relay service; and the processor 702 is configured to determine a first terminal that provides the relay service to the second terminal, and page the second terminal by using the determined first terminal, or the processor 702 is configured to send an eleventh paging message for paging the second terminal, where the eleventh paging message carries the terminal identity of the second terminal and indication information indicating that the second terminal is a terminal to which another terminal provides the relay service.

Optionally, if the receiver 701 receives the first paging message, the processor 702 is specifically configured to:

send a fourth paging message for paging the first terminal, where the fourth paging message carries the terminal identity of the first terminal and the terminal identity of the second terminal that needs to be paged by using the first terminal.

Optionally, the processor 702 is further configured to: after the receiver 701 receives the first paging message and before the processor 702 sends the fourth paging message, obtain a paging parameter used to determine a paging moment of the first terminal, and/or obtain, from the first paging message, a paging parameter used to determine a paging moment of the second terminal; and determine, according to the obtained paging parameter, a paging moment for sending the fourth paging message; and the processor 702 is specifically configured to:

send the fourth paging message at the determined paging moment for sending the fourth paging message.

Optionally, the processor 702 is further configured to: after the receiver 701 receives the first paging message and before the processor 702 sends the fourth paging message, obtain area information of the first terminal, and/or obtain area information of the second terminal from the first paging message; and determine, according to the obtained area information, an area for sending the fourth paging message; and the processor 702 is specifically configured to: send the fourth paging message in the determined area for sending the fourth paging message.

Optionally, the fourth paging message further carries first indication information, and the first indication information is used to indicate that the second terminal is a terminal to which another terminal provides the relay service.

Optionally, if the receiver 701 receives the first paging message, the processor 702 is specifically configured to:

send a fifth paging message for paging the second terminal, where the fifth paging message carries the terminal identity of the second terminal and the terminal identity of the first terminal that needs to be used to page the second terminal.

Optionally, the processor 702 is further configured to: after the receiver 701 receives the first paging message and before the processor 702 sends the fifth paging message, obtain a paging parameter used to determine a paging moment of the first terminal, and/or obtain, from the first paging message, a paging parameter used to determine a paging moment of the second terminal; and determine, according to the obtained paging parameter, a paging moment for sending the fifth paging message; and the processor 702 is specifically configured to:

send the fifth paging message at the determined paging moment for sending the fifth paging message.

Optionally, the processor 702 is further configured to: after the receiver 701 receives the first paging message and before the processor 702 sends the fifth paging message, obtain area information of the first terminal, and/or obtain area information of the second terminal from the first paging message; and determine, according to the obtained area information, an area for sending the fifth paging message; and the processor 702 is specifically configured to:

send the fifth paging message in the determined area for sending the fifth paging message.

Optionally, the fifth paging message further carries second indication information, and the second indication information is used to indicate that the second terminal is a terminal to which another terminal provides the relay service.

Optionally, if the receiver 701 receives the second paging message, the processor 702 is specifically configured to:

send a sixth paging message for paging the first terminal, where the sixth paging message carries the terminal identity of the first terminal and the terminal identity of the second terminal that needs to be paged by using the first terminal.

Optionally, the processor 702 is further configured to: after the receiver 701 receives the second paging message and before the processor 702 sends the sixth paging message, obtain a paging parameter used to determine a paging moment of the second terminal, and/or obtain, from the second paging message, a paging parameter used to determine a paging moment of the first terminal; and determine, according to the obtained paging parameter, a paging moment for sending the sixth paging message; and the processor 702 is specifically configured to:

send the sixth paging message at the determined paging moment for sending the sixth paging message.

Optionally, the processor 702 is further configured to: after the receiver 701 receives the second paging message and before the processor 702 sends the sixth paging message, obtain area information of the second terminal, and/or obtain area information of the first terminal from the second paging message; and determine, according to the obtained area information, an area for sending the sixth paging message; and the processor 702 is specifically configured to:

send the sixth paging message in the determined area for sending the sixth paging message.

Optionally, the sixth paging message further carries third indication information, and the third indication information is used to indicate that the second terminal is a terminal to which another terminal provides the relay service.

Optionally, if the receiver 701 receives the second paging message, the processor 702 is specifically configured to:

send a seventh paging message for paging the second terminal, where the seventh paging message carries the terminal identity of the second terminal and the terminal identity of the first terminal that needs to be used to page the second terminal.

Optionally, the processor 702 is further configured to: after the receiver 701 receives the second paging message and before the processor 702 sends the seventh paging message, obtain a paging parameter used to determine a paging moment of the second terminal, and/or obtain, from the second paging message, a paging parameter used to determine a paging moment of the first terminal; and determine, according to the obtained paging parameter, a paging moment for sending the seventh paging message; and the processor 702 is specifically configured to:

send the seventh paging message at the determined paging moment for sending the seventh paging message.

Optionally, the processor 702 is further configured to: after the receiver 701 receives the second paging message and before the processor 702 sends the seventh paging message, obtain area information of the second terminal, and/or obtain area information of the first terminal from the second paging message; and determine, according to the obtained area information, an area for sending the seventh paging message; and the processor 702 is specifically configured to: send the seventh paging message in the determined area for sending the seventh paging message.

Optionally, the seventh paging message further carries fourth indication information, and the fourth indication information is used to indicate that the second terminal is a terminal to which another terminal provides the relay service.

Optionally, if the receiver 701 receives the third paging message, the processor 702 is specifically configured to:

determine, according to a stored terminal identity of a terminal that provides the relay service to the second terminal, the first terminal that provides the relay service to the second terminal; or use each terminal in a coverage area of the second network device as the first terminal that provides the relay service to the second terminal.

Optionally, if the receiver 701 receives the third paging message, the processor 702 is specifically configured to:

send an eighth paging message for paging the second terminal, where the eighth paging message carries the terminal identity of the second terminal and the terminal identity of the first terminal that needs to be used to page the second terminal.

Optionally, the processor 702 is further configured to: after the receiver 701 receives the third paging message and before the processor 702 sends the eighth paging message, obtain, from the third paging message, a paging parameter used to determine a paging moment of the second terminal, and determine, according to the obtained paging parameter, a paging moment for sending the eighth paging message; and the processing module 702 is specifically configured to: send the eighth paging message at the determined paging moment for sending the eighth paging message.

Optionally, the processor 702 is further configured to: after the receiver 701 receives the third paging message and before the processor 702 sends the eighth paging message, obtain area information of the second terminal from the third paging message; and determine, according to the obtained area information, an area for sending the eighth paging message; and the processor 702 is specifically configured to: send the eighth paging message in the determined area for sending the eighth paging message.

Optionally, the eighth paging message further carries fifth indication information, and the fifth indication information is used to indicate that the second terminal is a terminal to which another terminal provides the relay service.

Optionally, if the receiver 701 receives the third paging message, the processor 702 is specifically configured to:

send a ninth paging message for paging the first terminal, where the ninth paging message carries the terminal identity of the first terminal and the terminal identity of the second terminal that needs to be paged by using the first terminal.

Optionally, the processor 702 is further configured to: after the receiver 701 receives the third paging message and before the processor 702 sends the ninth paging message, obtain, from the third paging message, a paging parameter used to determine a paging moment of the second terminal, and determine, according to the obtained paging parameter, a paging moment for sending the ninth paging message; and the processor 702 is specifically configured to:

send the ninth paging message at the determined paging moment for sending the ninth paging message.

Optionally, the processor 702 is further configured to: after the receiver 701 receives the third paging message and before the processor 702 sends the ninth paging message, obtain area information of the second terminal from the third paging message; and determine, according to the obtained area information, an area for sending the ninth paging message; and the processor 702 is specifically configured to: send the ninth paging message in the determined area for sending the ninth paging message.

Optionally, the ninth paging message carries sixth indication information, and the sixth indication information is used to indicate that the second terminal is a terminal to which another terminal provides the relay service.

Embodiment 6

Figure 8:
FIG. 8 is a schematic structural diagram of a first terminal according to Embodiment 6 of the present invention.

FIG. 8 is a schematic structural diagram of a first terminal according to Embodiment 6 of the present invention. As shown in the FIG. 8, the first terminal includes:

a receiving module 801, configured to receive a paging message, where the paging message carries a terminal identity of a second terminal; and a processing module 802, configured to: when determining that the second terminal is a terminal to which the first terminal provides a relay service, page the second terminal according to the terminal identity of the second terminal.

Optionally, the processing module 802 is specifically configured to:

if the paging message includes indication information indicating that the second terminal is a terminal to which the first terminal provides the relay service, determine that the second terminal is a terminal to which the first terminal provides the relay service.

Optionally, the processing module 802 is specifically configured to:

if determining that a terminal identity list, stored in the first terminal, of terminals to which the first terminal provides the relay service includes the terminal identity of the second terminal, determine that the second terminal is a terminal to which the first terminal provides the relay service.

Optionally, the processing module 802 is further configured to:

delete, from the terminal identity list, a terminal identity of a terminal to which the first terminal no longer provides the relay service; and/or add, to the terminal identity list, a terminal identity of a terminal that becomes a terminal to which the first terminal provides the relay service.

Optionally, the processing module 802 is further configured to:

if determining that the paging message includes indication information indicating that the paging message further pages the first terminal, determine that the paging message further pages the first terminal.

Optionally, the processing module 802 is further configured to determine a paging moment of the second terminal in one of the following manners:

determining the paging moment of the second terminal according to paging moment information of the second terminal that is received by the receiving module 801 from the second terminal;

determining the paging moment of the second terminal according to a paging parameter that is received by the receiving module 801 from the second terminal and that is used to determine the paging moment of the second terminal;

determining the paging moment of the second terminal according to paging moment information of the second terminal obtained from the paging message; or determining the paging moment of the second terminal according to a paging parameter that is obtained from the paging message and that is used to determine the paging moment of the second terminal; and the processing module 802 is specifically configured to:
page the second terminal according to the determined paging moment of the second terminal.

Optionally, the processing module 802 is further configured to: before the receiving module 801 receives the paging message, determine the paging moment of the second terminal; and the receiving module 801 is specifically configured to: receive the paging message at the paging moment of the second terminal determined by the processing module 802; and/or receive the paging message at a paging moment of the first terminal.

Optionally, the paging message carries first indication information, and the first indication information is used to indicate that the paging message pages a terminal to which another terminal provides the relay service; and/or the paging message carries second indication information, and the second indication information is used to indicate whether the paging message pages the first terminal.

Optionally, the paging message includes a terminal identity of the first terminal.

Embodiment 7

Figure 9:
FIG. 9 is a schematic structural diagram of a first terminal according to Embodiment 7 of the present invention.

FIG. 9 is a schematic structural diagram of a first terminal according to Embodiment 7 of the present invention. As shown in the FIG. 9, the first terminal includes:

a receiver 901, configured to receive a paging message, where the paging message carries a terminal identity of a second terminal; and a processor 902, configured to: when determining that the second terminal is a terminal to which the first terminal provides a relay service, page the second terminal according to the terminal identity of the second terminal.

Optionally, the processor 902 is specifically configured to:

if the paging message includes indication information indicating that the second terminal is a terminal to which the first terminal provides the relay service, determine that the second terminal is a terminal to which the first terminal provides the relay service.

Optionally, the processor 902 is specifically configured to:

if determining that a terminal identity list, stored in the first terminal, of terminals to which the first terminal provides the relay service includes the terminal identity of the second terminal, determine that the second terminal is a terminal to which the first terminal provides the relay service.

Optionally, the processor 902 is further configured to:

delete, from the terminal identity list, a terminal identity of a terminal to which the first terminal no longer provides the relay service; and/or add, to the terminal identity list, a terminal identity of a terminal that becomes a terminal to which the first terminal provides the relay service.

Optionally, the processor 902 is further configured to:

if determining that the paging message includes indication information indicating that the paging message further pages the first terminal, determine that the paging message further pages the first terminal.

Optionally, the processor 902 is further configured to determine a paging moment of the second terminal in one of the following manners:

determining the paging moment of the second terminal according to paging moment information of the second terminal that is received by the receiver 901 from the second terminal;

determining the paging moment of the second terminal according to a paging parameter that is received by the receiver 901 from the second terminal and that is used to determine the paging moment of the second terminal;

determining the paging moment of the second terminal according to paging moment information of the second terminal obtained from the paging message; or determining the paging moment of the second terminal according to a paging parameter that is obtained from the paging message and that is used to determine the paging moment of the second terminal; and the processor 902 is specifically configured to:
page the second terminal according to the determined paging moment of the second terminal.

Optionally, the processor 902 is further configured to: before the receiver 901 receives the paging message, determine the paging moment of the second terminal; and the receiver 901 is specifically configured to: receive the paging message at the paging moment of the second terminal determined by the processor 902; and/or receive the paging message at a paging moment of the first terminal.

Optionally, the paging message carries first indication information, and the first indication information is used to indicate that the paging message pages a terminal to which another terminal provides the relay service; and/or the paging message carries second indication information, and the second indication information is used to indicate whether the paging message pages the first terminal.

Optionally, the paging message includes a terminal identity of the first terminal.

Embodiment 8

Figure 10:
FIG. 10 is a schematic structural diagram of a second terminal according to Embodiment 8 of the present invention.

FIG. 10 is a schematic structural diagram of a second terminal according to Embodiment 8 of the present invention. As shown in the FIG. 10, the second terminal includes:

a transceiver module 1001, configured to receive a paging message sent by a first terminal; and a processing module 1002, configured to: after determining that a terminal identity in the paging message received by the transceiver module 1001 is a terminal identity of the second terminal, determine that the paging message pages the second terminal.

Optionally, the transceiver module 1001 is further configured to: before receiving the paging message, send at least one of the following information to the first terminal:

a paging parameter used to determine a paging moment of the second terminal; or area information of the second terminal.

Optionally, the transceiver module 1001 is further configured to:

before receiving the paging message, send the terminal identity of the second terminal to the first terminal.

Embodiment 9

Figure 11:
FIG. 11 is a schematic structural diagram of a second terminal according to Embodiment 9 of the present invention.

FIG. 11 is a schematic structural diagram of a second terminal according to Embodiment 9 of the present invention. As shown in the FIG. 11, the second terminal includes:

a transceiver 1101, configured to receive a paging message sent by a first terminal; and a processor 1102, configured to: after determining that a terminal identity in the paging message received by the transceiver 1101 is a terminal identity of the second terminal, determine that the paging message pages the second terminal.

Optionally, the transceiver 1101 is further configured to: before receiving the paging message, send at least one of the following information to the first terminal:

a paging parameter used to determine a paging moment of the second terminal; or area information of the second terminal.

Optionally, the transceiver 1101 is further configured to:

before receiving the paging message, send the terminal identity of the second terminal to the first terminal.

Embodiment 10

Figure 12:
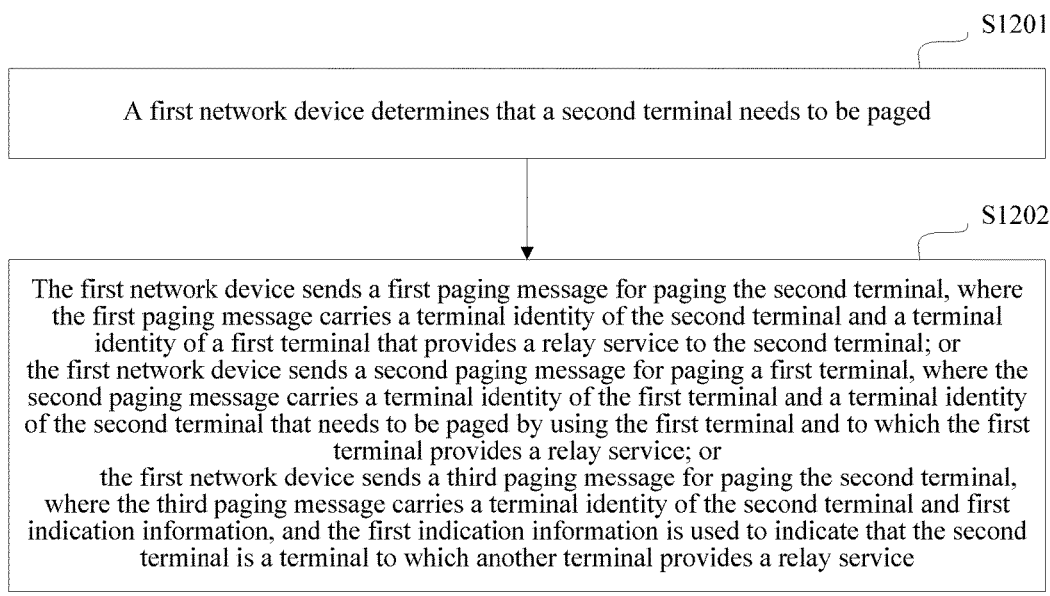
FIG. 12 is a flowchart of a method according to Embodiment 10 of the present invention.

FIG. 12 is a flowchart of a method according to Embodiment 10 of the present invention. As shown in FIG. 12, the method includes the following steps:

S1201: A first network device determines that a second terminal needs to be paged.

S1202: The first network device sends a first paging message for paging the second terminal, where the first paging message carries a terminal identity of the second terminal and a terminal identity of a first terminal that provides a relay service to the second terminal; or the first network device sends a second paging message for paging a first terminal, where the second paging message carries a terminal identity of the first terminal and a terminal identity of the second terminal that needs to be paged by using the first terminal and to which the first terminal provides a relay service; or the first network device sends a third paging message for paging the second terminal, where the third paging message carries a terminal identity of the second terminal and first indication information, and the first indication information is used to indicate that the second terminal is a terminal to which another terminal provides a relay service.

Optionally, if the first network device sends the first paging message, the first paging message further carries at least one of the following information:

a paging parameter used to determine a paging moment of the second terminal;

a paging parameter used to determine a paging moment of the first terminal;

area information of the second terminal; or area information of the first terminal.

Optionally, if the first network device sends the second paging message, the second paging message further carries at least one of the following information:

a paging parameter used to determine a paging moment of the first terminal;

a paging parameter used to determine a paging moment of the second terminal;

area information of the first terminal; or area information of the second terminal.

Optionally, if the first network device sends the third paging message, the third paging message further carries at least one of the following information:

a paging parameter used to determine a paging moment of the second terminal; or area information of the second terminal.

Optionally, if the first network device sends the first paging message, the first paging message further carries second indication information, where the second indication information is used to indicate that the second terminal is a terminal to which another terminal provides the relay service; and/or if the first network device sends the second paging message, the second paging message further carries third indication information, where the third indication information is used to indicate that the second terminal is a terminal to which another terminal provides the relay service.

Embodiment 11

Figure 13A:
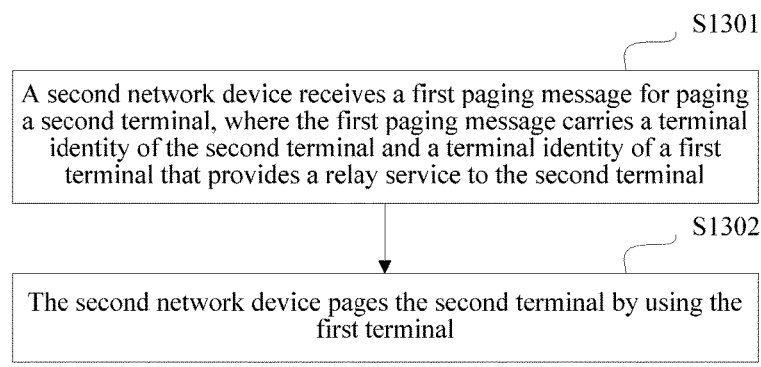
FIG. 13A, FIG. 13B, and FIG. 13C are flowcharts of a method according to Embodiment 11 of the present invention.

As shown in FIG. 13A, a method in Embodiment 11 includes the following steps:

S1301: A second network device receives a first paging message for paging a second terminal, where the first paging message carries a terminal identity of the second terminal and a terminal identity of a first terminal that provides a relay service to the second terminal.

S1302: The second network device pages the second terminal by using the first terminal, or sends a tenth paging message for paging the second terminal, where the tenth paging message carries the terminal identity of the second terminal and indication information indicating that the second terminal is a terminal to which another terminal provides the relay service.

Figure 13B:
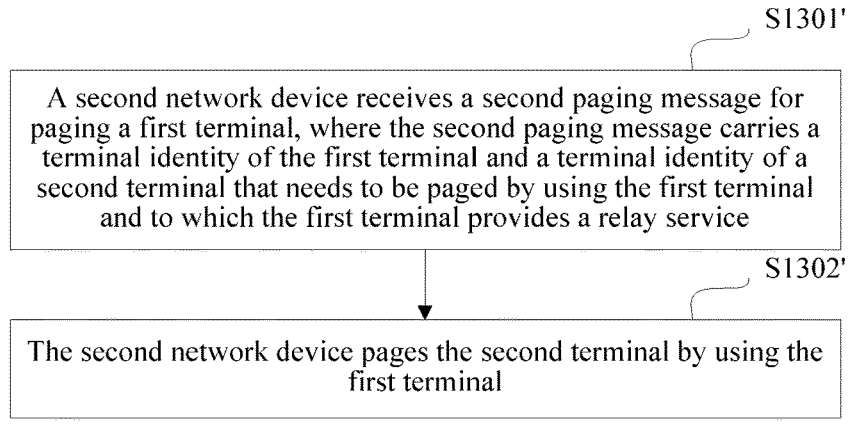

Alternatively, as shown in FIG. 13B, the method includes the following steps:

S1301': A second network device receives a second paging message for paging a first terminal, where the second paging message carries a terminal identity of the first terminal and a terminal identity of a second terminal that needs to be paged by using the first terminal and to which the first terminal provides a relay service.

S1302': The second network device pages the second terminal by using the first terminal, or sends an eleventh paging message for paging the second terminal, where the eleventh paging message carries the terminal identity of the second terminal and indication information indicating that the second terminal is a terminal to which another terminal provides the relay service.

Figure 13C:
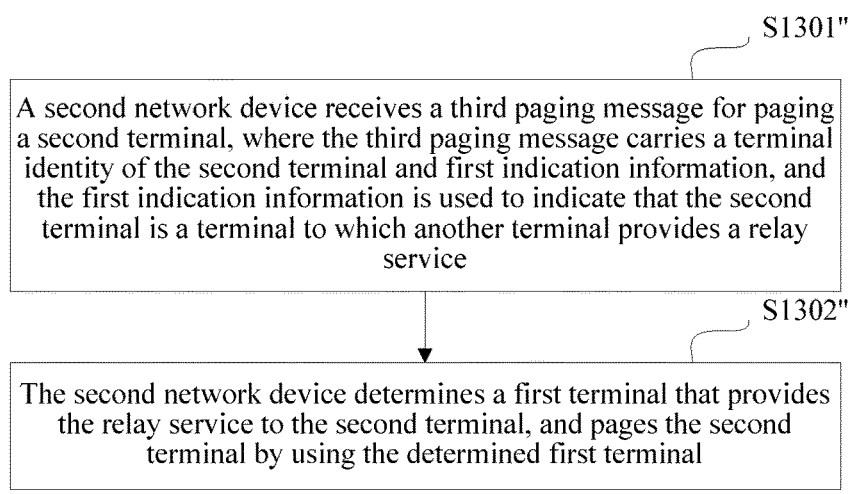

Alternatively, as shown in FIG. 13C, the method includes the following steps:

S1301": A second network device receives a third paging message for paging a second terminal, where the third paging message carries a terminal identity of the second terminal and first indication information, and the first indication information is used to indicate that the second terminal is a terminal to which another terminal provides a relay service.

S1302": The second network device determines a first terminal that provides the relay service to the second terminal, and pages the second terminal by using the determined first terminal; or sends an eleventh paging message for paging the second terminal, where the eleventh paging message carries the terminal identity of the second terminal and indication information indicating that the second terminal is a terminal to which another terminal provides the relay service.

Optionally, if the second network device receives the first paging message, the paging, by the second network device, the second terminal by using the first terminal includes:

sending, by the second network device, a fourth paging message for paging the first terminal, where the fourth paging message carries the terminal identity of the first terminal and the terminal identity of the second terminal that needs to be paged by using the first terminal.

Optionally, after the receiving, by a second network device, a first paging message and before the sending, by the second network device, a fourth paging message, the method further includes:

obtaining, by the second network device, a paging parameter used to determine a paging moment of the first terminal, and/or obtaining, from the first paging message, a paging parameter used to determine a paging moment of the second terminal; and determining, by the second network device according to the obtained paging parameter, a paging moment for sending the fourth paging message; and the sending, by the second network device, a fourth paging message includes:

sending, by the second network device, the fourth paging message at the determined paging moment for sending the fourth paging message.

Optionally, after the receiving, by a second network device, a first paging message and before the sending, by the second network device, a fourth paging message, the method further includes:

obtaining, by the second network device, area information of the first terminal, and/or obtaining area information of the second terminal from the first paging message; and determining, by the second network device according to the obtained area information, an area for sending the fourth paging message; and the sending, by the second network device, a fourth paging message includes: sending, by the second network device, the fourth paging message in the determined area for sending the fourth paging message.

Optionally, the fourth paging message further carries first indication information, and the first indication information is used to indicate that the second terminal is a terminal to which another terminal provides the relay service.

Optionally, if the second network device receives the first paging message, the paging, by the second network device, the second terminal by using the first terminal includes:

sending, by the second network device, a fifth paging message for paging the second terminal, where the fifth paging message carries the terminal identity of the second terminal and the terminal identity of the first terminal that needs to be used to page the second terminal.

Optionally, after the receiving, by a second network device, a first paging message and before the sending, by the second network device, a fifth paging message, the method further includes:

obtaining, by the second network device, a paging parameter used to determine a paging moment of the first terminal, and/or obtaining, from the first paging message, a paging parameter used to determine a paging moment of the second terminal; and determining, by the second network device according to the obtained paging parameter, a paging moment for sending the fifth paging message; and the sending, by the second network device, a fifth paging message includes:

sending, by the second network device, the fifth paging message at the determined paging moment for sending the fifth paging message.

Optionally, after the receiving, by a second network device, a first paging message and before the sending, by the second network device, a fifth paging message, the method further includes:

obtaining, by the second network device, area information of the first terminal, and/or obtaining area information of the second terminal from the first paging message; and determining, by the second network device according to the obtained area information, an area for sending the fifth paging message; and the sending, by the second network device, a fifth paging message includes:

sending, by the second network device, the fifth paging message in the determined area for sending the fifth paging message.

Optionally, the fifth paging message further carries second indication information, and the second indication information is used to indicate that the second terminal is a terminal to which another terminal provides the relay service.

Optionally, if the second network device receives the second paging message, the paging, by the second network device, the second terminal by using the first terminal includes:

sending, by the second network device, a sixth paging message for paging the first terminal, where the sixth paging message carries the terminal identity of the first terminal and the terminal identity of the second terminal that needs to be paged by using the first terminal.

Optionally, after the receiving, by a second network device, a second paging message and before the sending, by the second network device, a sixth paging message, the method further includes:

obtaining, by the second network device, a paging parameter used to determine a paging moment of the second terminal, and/or obtaining, from the second paging message, a paging parameter used to determine a paging moment of the first terminal; and determining, by the second network device according to the obtained paging parameter, a paging moment for sending the sixth paging message; and the sending, by the second network device, a sixth paging message includes:

sending, by the second network device, the sixth paging message at the determined paging moment for sending the sixth paging message.

Optionally, after the receiving, by a second network device, a second paging message and before the sending, by the second network device, a sixth paging message, the method further includes:

obtaining, by the second network device, area information of the second terminal, and/or obtaining area information of the first terminal from the second paging message; and determining, by the second network device according to the obtained area information, an area for sending the sixth paging message; and the sending, by the second network device, a sixth paging message includes:

sending, by the second network device, the sixth paging message in the determined area for sending the sixth paging message.

Optionally, the sixth paging message further carries third indication information, and the third indication information is used to indicate that the second terminal is a terminal to which another terminal provides the relay service.

Optionally, if the second network device receives the second paging message, the paging, by the second network device, the second terminal by using the first terminal includes:

sending, by the second network device, a seventh paging message for paging the second terminal, where the seventh paging message carries the terminal identity of the second terminal and the terminal identity of the first terminal that needs to be used to page the second terminal.

Optionally, after the receiving, by a second network device, a second paging message and before the sending, by the second network device, a seventh paging message, the method further includes:

obtaining, by the second network device, a paging parameter used to determine a paging moment of the second terminal, and/or obtaining, from the second paging message, a paging parameter used to determine a paging moment of the first terminal; and determining, by the second network device according to the obtained paging parameter, a paging moment for sending the seventh paging message; and the sending, by the second network device, a seventh paging message includes:

sending, by the second network device, the seventh paging message at the determined paging moment for sending the seventh paging message.

Optionally, after the receiving, by a second network device, a second paging message and before the sending, by the second network device, a seventh paging message, the method further includes:

obtaining, by the second network device, area information of the second terminal, and/or obtaining area information of the first terminal from the second paging message; and determining, by the second network device according to the obtained area information, an area for sending the seventh paging message; and the sending, by the second network device, a seventh paging message includes: sending, by the second network device, the seventh paging message in the determined area for sending the seventh paging message.

Optionally, the seventh paging message further carries fourth indication information, and the fourth indication information is used to indicate that the second terminal is a terminal to which another terminal provides the relay service.

Optionally, if the second network device receives the third paging message, the determining, by the second network device, a first terminal that provides the relay service to the second terminal includes:

determining, by the second network device according to a stored terminal identity of a terminal that provides the relay service to the second terminal, the first terminal that provides the relay service to the second terminal; or using, by the second network device, each terminal in a coverage area of the second network device as the first terminal that provides the relay service to the second terminal.

Optionally, if the second network device receives the third paging message, the paging, by the second network device, the second terminal by using the determined first terminal includes:

sending, by the second network device, an eighth paging message for paging the second terminal, where the eighth paging message carries the terminal identity of the second terminal and the terminal identity of the first terminal that needs to be used to page the second terminal.

Optionally, after the receiving, by a second network device, a third paging message and before the sending, by the second network device, an eighth paging message, the method further includes:

obtaining, by the second network device from the third paging message, a paging parameter used to determine a paging moment of the second terminal, and determining, according to the obtained paging parameter, a paging moment for sending the eighth paging message; and the sending, by the second network device, an eighth paging message includes: sending, by the second network device, the eighth paging message at the determined paging moment for sending the eighth paging message.

Optionally, after the receiving, by a second network device, a third paging message and before the sending, by the second network device, an eighth paging message, the method further includes:

obtaining, by the second network device, area information of the second terminal from the third paging message; and determining, according to the obtained area information, an area for sending the eighth paging message; and the sending, by the second network device, an eighth paging message includes:

sending, by the second network device, the eighth paging message in the determined area for sending the eighth paging message.

Optionally, the eighth paging message further carries fifth indication information, and the fifth indication information is used to indicate that the second terminal is a terminal to which another terminal provides the relay service.

Optionally, if the second network device receives the third paging message, the paging, by the second network device, the second terminal by using the determined first terminal includes:

sending, by the second network device, a ninth paging message for paging the first terminal, where the ninth paging message carries the terminal identity of the first terminal and the terminal identity of the second terminal that needs to be paged by using the first terminal.

Optionally, after the receiving, by a second network device, a third paging message and before the sending, by the second network device, a ninth paging message, the method further includes:

obtaining, by the second network device from the third paging message, a paging parameter used to determine a paging moment of the second terminal, and determining, according to the obtained paging parameter, a paging moment for sending the ninth paging message; and the sending, by the second network device, a ninth paging message includes:

sending, by the second network device, the ninth paging message at the determined paging moment for sending the ninth paging message.

Optionally, after the receiving, by a second network device, a third paging message and before the sending, by the second network device, a ninth paging message, the method further includes:

obtaining, by the second network device, area information of the second terminal from the third paging message; and determining, according to the obtained area information, an area for sending the ninth paging message; and the sending, by the second network device, a ninth paging message includes:

sending, by the second network device, the ninth paging message in the determined area for sending the ninth paging message.

Optionally, the ninth paging message carries sixth indication information, and the sixth indication information is used to indicate that the second terminal is a terminal to which another terminal provides the relay service.

Embodiment 12

Figure 14:
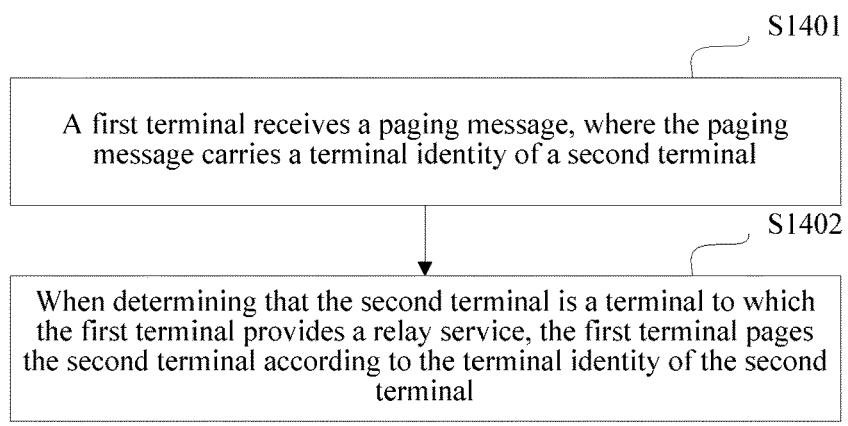
FIG. 14 is a flowchart of a method according to Embodiment 12 of the present invention.

FIG. 14 is a flowchart of a method according to Embodiment 12 of the present invention. As shown in FIG. 14, the method includes the following steps:

S1401: A first terminal receives a paging message, where the paging message carries a terminal identity of a second terminal.

S1402: When determining that the second terminal is a terminal to which the first terminal provides a relay service, the first terminal pages the second terminal according to the terminal identity of the second terminal.

Optionally, the determining, by the first terminal, that the second terminal is a terminal to which the first terminal provides a relay service includes:

if the paging message includes indication information indicating that the second terminal is a terminal to which the first terminal provides the relay service, determining, by the first terminal, that the second terminal is a terminal to which the first terminal provides the relay service.

Optionally, the determining, by the first terminal, that the second terminal is a terminal to which the first terminal provides a relay service includes:

if determining that a stored terminal identity list of terminals to which the first terminal provides the relay service includes the terminal identity of the second terminal, determining, by the first terminal, that the second terminal is a terminal to which the first terminal provides the relay service.

Optionally, the method further includes:

deleting, by the first terminal from the terminal identity list, a terminal identity of a terminal to which the first terminal no longer provides the relay service; and/or adding, by the first terminal to the terminal identity list, a terminal identity of a terminal that becomes a terminal to which the first terminal provides the relay service.

Optionally, after the receiving, by a first terminal, a paging message, the method further includes:

if the first terminal determines that the paging message includes indication information indicating that the paging message further pages the first terminal, determining, by the first terminal, that the paging message further pages the first terminal.

Optionally, before the paging, by the first terminal, the second terminal, the method further includes: determining, by the first terminal, a paging moment of the second terminal in one of the following manners:

determining, by the first terminal, the paging moment of the second terminal according to paging moment information of the second terminal received from the second terminal;

determining, by the first terminal, the paging moment of the second terminal according to a paging parameter that is received from the second terminal and that is used to determine the paging moment of the second terminal;

determining, by the first terminal, the paging moment of the second terminal according to paging moment information of the second terminal obtained from the paging message; or determining, by the first terminal, the paging moment of the second terminal according to a paging parameter that is obtained from the paging message and that is used to determine the paging moment of the second terminal; and the paging, by the first terminal, the second terminal includes:

paging, by the first terminal, the second terminal according to the determined paging moment of the second terminal.

Optionally, before the receiving, by a first terminal, a paging message, the method further includes:

determining, by the first terminal, the paging moment of the second terminal; and the receiving, by a first terminal, a paging message includes:

receiving, by the first terminal, the paging message at the paging moment of the second terminal; and/or receiving, by the first terminal, the paging message at a paging moment of the first terminal.

Optionally, the paging message carries first indication information, and the first indication information is used to indicate that the paging message pages a terminal to which another terminal provides the relay service; and/or the paging message carries second indication information, and the second indication information is used to indicate whether the paging message pages the first terminal.

Optionally, the paging message includes a terminal identity of the first terminal.

Embodiment 13

Figure 15:
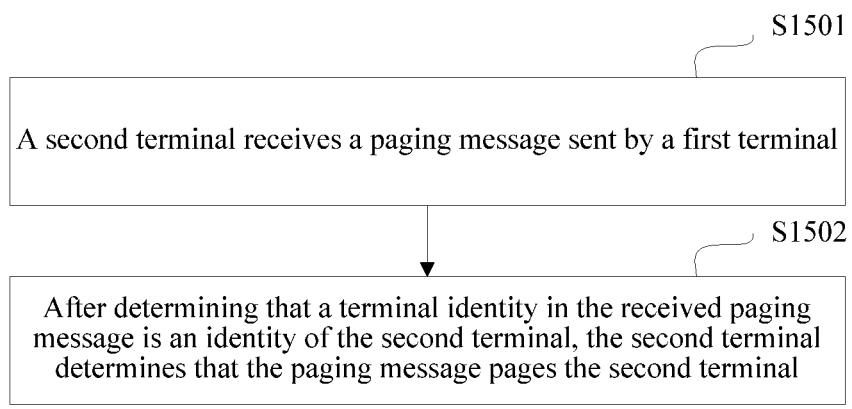
FIG. 15 is a flowchart of a method according to Embodiment 13 of the present invention.

FIG. 15 is a flowchart of a method according to Embodiment 13 of the present invention. The method includes the following steps:

S1501: A second terminal receives a paging message sent by a first terminal.

S1502: After determining that a terminal identity in the received paging message is an identity of the second terminal, the second terminal determines that the paging message pages the second terminal.

Optionally, before the receiving, by a second terminal, a paging message, the method further includes:

sending, by the second terminal, at least one of the following information to the first terminal:

a paging parameter used to determine a paging moment of the second terminal; or area information of the second terminal.

Optionally, before the receiving, by a second terminal, a paging message, the method further includes:

sending, by the second terminal, the terminal identity of the second terminal to the first terminal.

In the following Embodiment 14 to Embodiment 18, a paging process in the embodiments of the present invention is described by using a paging process in an LTE system as an example, where an evolved nodeB (evolved NodeB, eNB) and a mobility management entity (Mobility Management Entity, MME) are respectively the second network device and the first network device in Embodiment 1.

Embodiment 14

Figure 16:
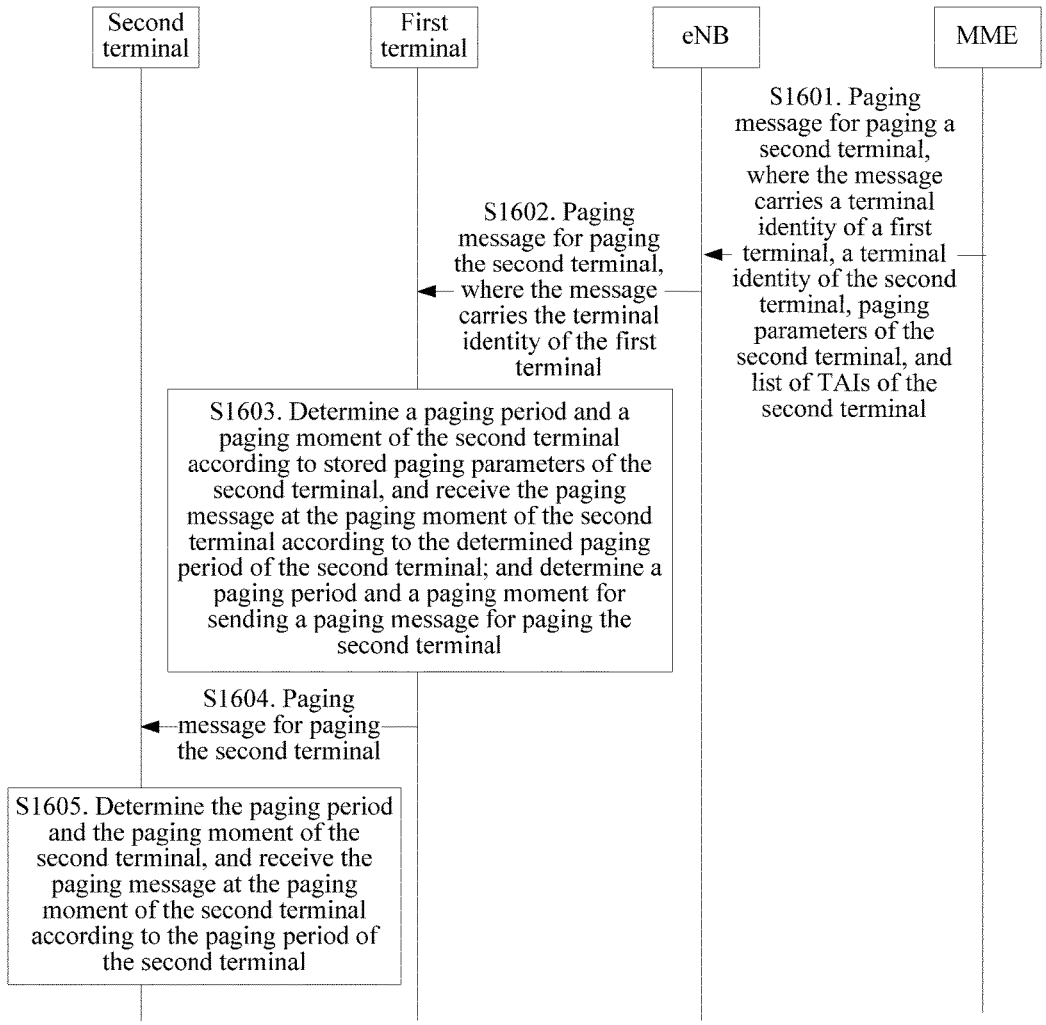
FIG. 16 is a flowchart according to Embodiment 14 of the present invention.

FIG. 16 is a flowchart of a paging process according to Embodiment 14 of the present invention. As shown in FIG. 16, the paging process includes the following steps:

S1601: An MME sends a paging message for paging a second terminal, where the message carries a terminal identity of a first terminal, a terminal identity of the second terminal, paging parameters of the second terminal, and List of TAIs of the second terminal, and the paging parameters include UE Identity Index Value and Paging DRX.

S1602: After receiving the paging message sent by the MME, an eNB determines a paging moment and a paging period of the second terminal according to the paging parameters of the second terminal carried in the paging message, determines a paging area according to List of TAIs of the second terminal carried in the paging message, and sends, in the determined paging area at the paging moment of the second terminal according to the determined paging period, a paging message for paging the second terminal, where the message carries the terminal identity of the first terminal.

S1603: The first terminal determines the paging period and the paging moment of the second terminal according to stored paging parameters of the second terminal, and receives the paging message at the paging moment of the second terminal according to the determined paging period of the second terminal; and the first terminal determines a paging period and a paging moment for sending a paging message for paging the second terminal.

S1604: The first terminal sends the paging message to the second terminal according to the paging period and the paging moment of the second terminal that are determined in step S1603.

S1605: The second terminal determines the paging period and the paging moment of the second terminal, and receives the paging message at the paging moment of the second terminal according to the paging period of the second terminal.

Embodiment 15

Figure 17:
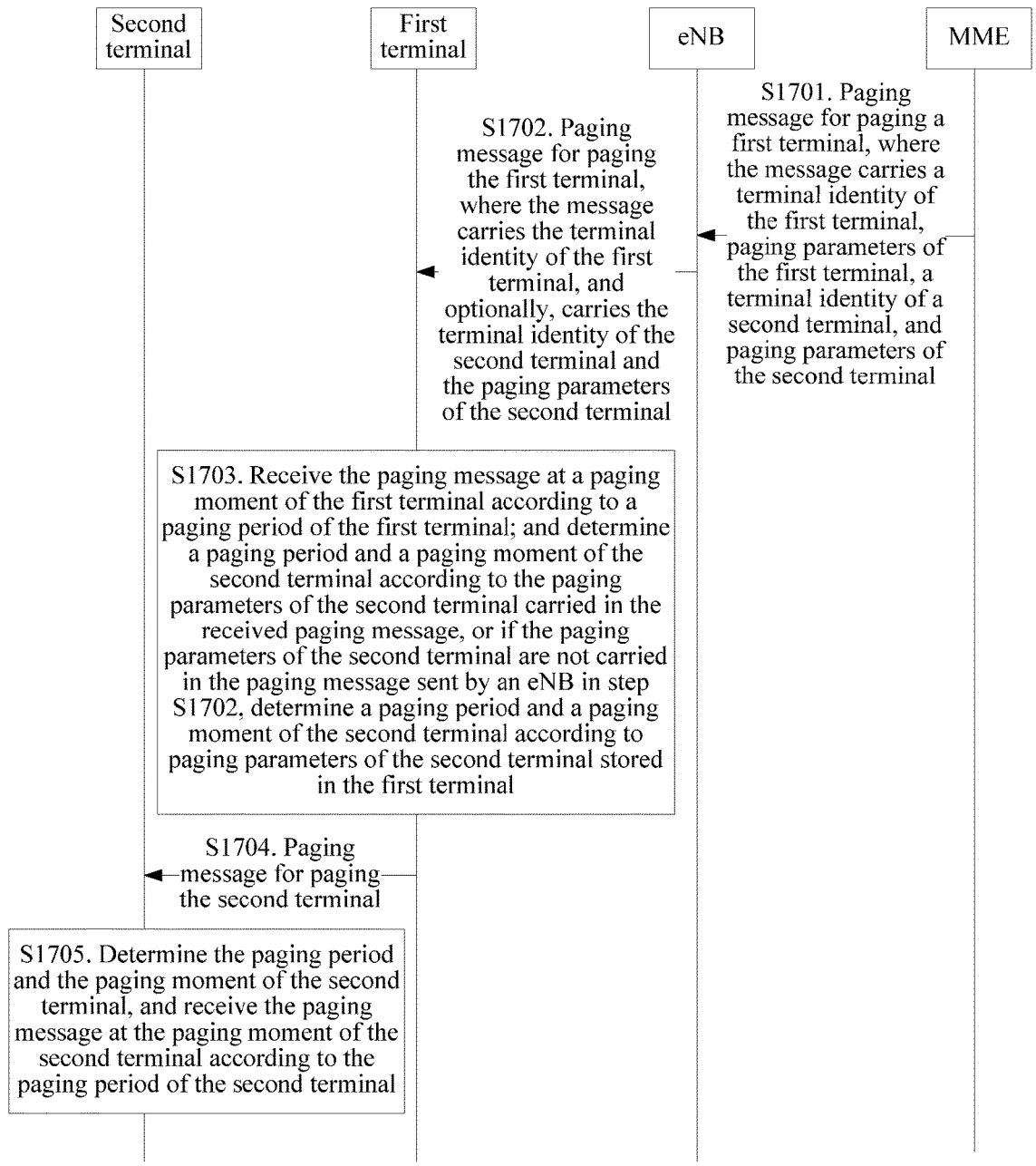
FIG. 17 is a flowchart according to Embodiment 15 of the present invention.

FIG. 17 is a flowchart of a paging process according to Embodiment 15 of the present invention. As shown in FIG. 17, the paging process includes the following steps:

S1701: An MME sends a paging message for paging a first terminal, where the message carries a terminal identity of the first terminal, paging parameters and List of TAIs of the first terminal, and a terminal identity of a second terminal, and the paging parameters include UE Identity Index Value and Paging DRX. Optionally, the paging message further includes paging parameters of the second terminal, for example, UE Other Identity Index Value and Paging DRX.

S1702: After receiving the paging message sent by the MME, an eNB determines a paging moment and a paging period of the first terminal according to the paging parameters of the first terminal carried in the paging message, determines a paging area according to List of TAIs carried in the paging message, and sends, in the determined paging area at the paging moment of the first terminal according to the determined paging period, a paging message for paging the first terminal, where the message carries the identity of the first terminal, and optionally, further carries the terminal identity of the second terminal and the paging parameters of the second terminal.

S1703: The first terminal determines the paging period and the paging moment of the first terminal, and receives the paging message at the paging moment of the first terminal according to the paging period; and the first terminal determines a paging period and a paging moment of the second terminal according to the paging parameters of the second terminal carried in the received paging message, or if the paging parameters of the second terminal are not carried in the paging message sent by the eNB in step S1702, the first terminal determines a paging period and a paging moment of the second terminal according to paging parameters of the second terminal stored in the first terminal.

S1704: Send a paging message to the second terminal according to the determined paging period and paging moment of the second terminal.

S1705: The second terminal determines the paging period and the paging moment of the second terminal, and receives the paging message at the paging moment of the second terminal according to the paging period of the second terminal.

Embodiment 16

Figure 18:
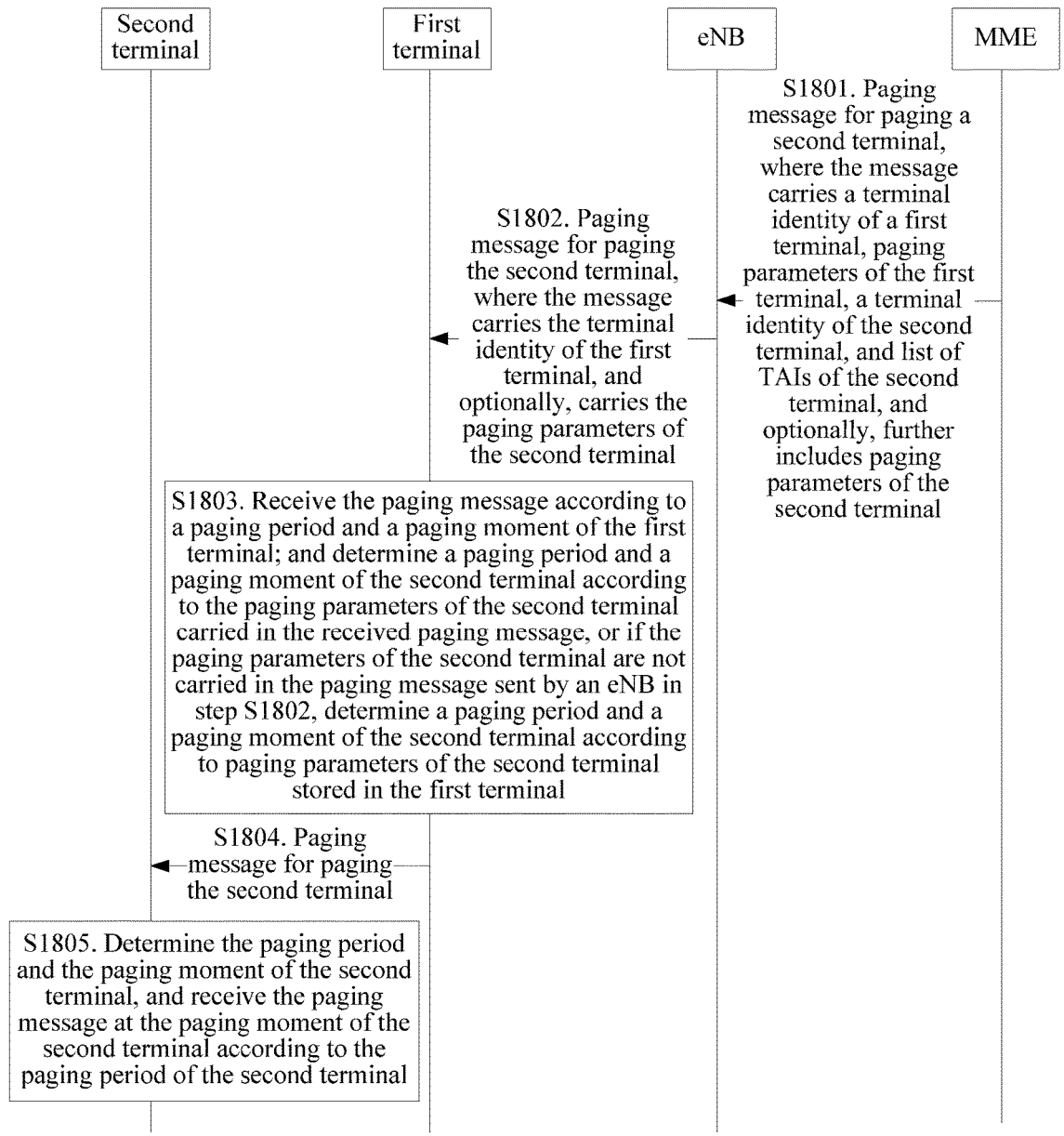
FIG. 18 is a flowchart according to Embodiment 16 of the present invention.

FIG. 18 is a flowchart of a paging process according to Embodiment 16 of the present invention. As shown in FIG. 18, the paging process includes the following steps:

S1801: An MME sends a paging message for paging a second terminal, where the message carries a terminal identity of a first terminal, paging parameters of the first terminal, for example, UE Identity Index Value and Paging DRX, a terminal identity of the second terminal, and List of TAIs of the second terminal, and optionally, further includes paging parameters of the second terminal, for example, UE Other Identity Index Value and Paging DRX.

S1802: After receiving the paging message sent by the MME, an eNB determines a paging moment and a paging period of the first terminal according to the paging parameters of the first terminal carried in the paging message, determines a paging area according to List of TAIs of the second terminal carried in the paging message, and sends, in the determined paging area at the determined paging moment of the first terminal according to the determined paging period of the first terminal, a paging message for paging the second terminal, where the message carries the terminal identity of the first terminal, and optionally, further carries the paging parameters of the second terminal.

S1803: The first terminal receives the paging message according to the paging period and the paging moment of the first terminal; and the first terminal determines a paging period and a paging moment of the second terminal according to the paging parameters of the second terminal carried in the received paging message, or if the paging parameters of the second terminal are not carried in the paging message sent by the eNB in step S1802, the first terminal determines a paging period and a paging moment of the second terminal according to paging parameters of the second terminal stored in the first terminal.

S1804: The first terminal sends a paging message to the second terminal at the paging moment of the second terminal according to the determined paging period of the second terminal.

S1805: The second terminal determines the paging period and the paging moment of the second terminal, and receives the paging message at the paging moment of the second terminal according to the paging period of the second terminal.

Embodiment 17

Different from Embodiments 14, 15, and 16, in this embodiment, the paging message in Embodiment 14, 15, or 16 further carries indication information, to indicate whether the first terminal and the second terminal are both paged. When the indication is true/false, it indicates that the first and second terminals are both paged. After receiving the corresponding paging message, the first terminal determines that the first terminal is also paged by a network. When the indication is false/true, it indicates that only the second terminal is paged.

Embodiment 18

Figure 19:
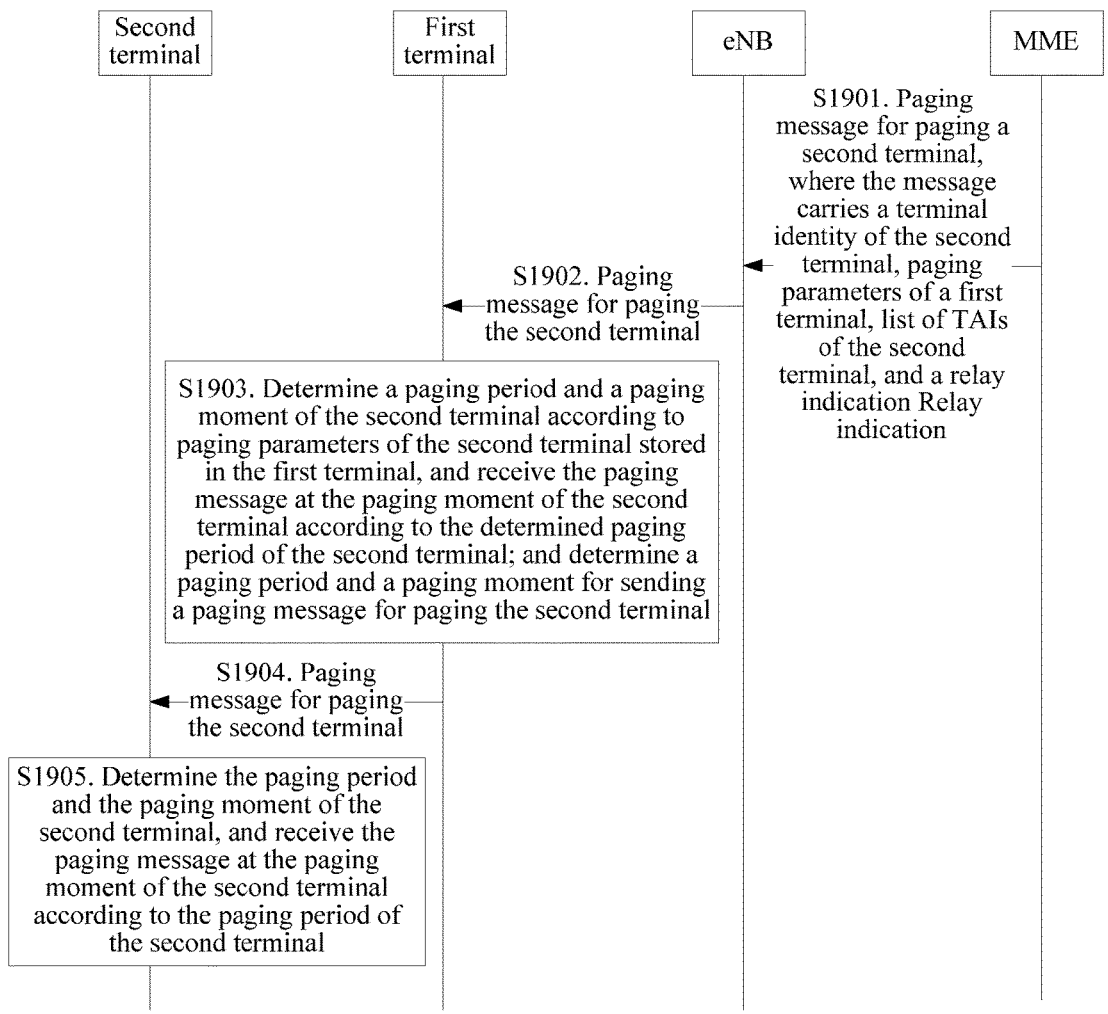
FIG. 19 is a flowchart according to Embodiment 18 of the present invention.

FIG. 19 is a flowchart of a paging process according to Embodiment 18 of the present invention. As shown in FIG. 19, the paging process includes the following steps:

S1901: An MME sends a paging message for paging a second terminal, where the message carries an identity of the second terminal, paging parameters of the second terminal, for example, UE Identity Index Value and Paging DRX, List of TAIs of the second terminal, and a relay indication Relay indication. The relay indication is used to indicate that the second terminal is a terminal to which another terminal provides a relay service.

S1902: After receiving the paging message sent by the MME, an eNB determines a paging moment and a paging period of the second terminal according to the paging parameters of the second terminal carried in the paging message, determines a paging area according to List of TAIs of the second terminal carried in the paging message, and sends, in the determined paging area at the paging moment of the second terminal according to the determined paging period of the second terminal, a paging message for paging the second terminal.

S1903: A first terminal determines the paging period and the paging moment of the second terminal according to stored paging parameters of the second terminal, and receives the paging message at the paging moment of the second terminal according to the determined paging period of the second terminal; and further, the first terminal determines a paging period and a paging moment for sending a paging message for paging the second terminal.

S1904: Send the paging message to the second terminal according to the paging period and the paging moment of the second terminal that are determined in step S1903.

S1905: The second terminal determines the paging period and the paging moment of the second terminal, and receives the paging message at the paging moment of the second terminal according to the paging period of the second terminal.

Embodiments related to a paging process are described above, and embodiments related to an area information update process are described below.

Embodiment 19

In Embodiment 19, an area information update process in the embodiments of the present invention is described from the perspective of mutual cooperation between a first terminal, a second terminal, and a network.

Figure 20:
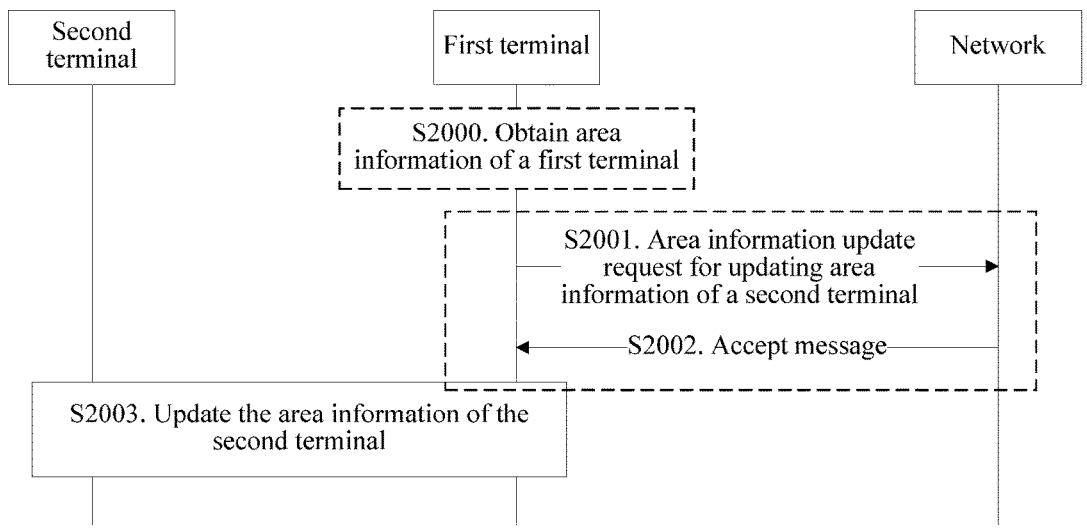
FIG. 20 is a flowchart of an area information update process according to Embodiment 19 of the present invention.

Referring to FIG. 20, the area information update process in Embodiment 19 includes the following steps:

S2003: A first terminal updates area information of a second terminal.

Before step Sam, optionally, the process further includes the following steps:

S2001: The first terminal sends an area information update request for updating the area information of the second terminal to a network.

S2002: The network sends an accept message of the area information update request to the first terminal.

Alternatively, before step Sam, optionally, the process further includes the following step:

S2000: The first terminal obtains area information of the first terminal.

For a first area information update case in which step S2001 and step S2002 are performed, optionally, step S2003 specifically includes:

sending, by the first terminal, a part or all of area information of the first terminal to the second terminal; or updating, by the first terminal, the area information of the second terminal according to the accept message received in step S2002.

For a second area information update case in which step S2000 is performed, optionally, step S2003 specifically includes: updating, by the first terminal, the area information of the second terminal according to the obtained area information of the first terminal.

By means of Embodiment 19, a first terminal updates area information of a second terminal to which the first terminal provides a relay service.

In Embodiment 19, the network refers to a device in a communications system except terminals, for example, includes devices such as a second network device and a first network device.

In Embodiment 19, the area information may include but not limited to one or more of the following information:

tracking area (Tracking Area, TA) information, for example, a TA list (TA list);

location area (Location Area, LA) information, for example, a location area identity (Location Area Identity, LAI); or routing area (Routing Area, RA) information, for example, a routing area identity (Routing Area Identity, RAI).

In step S2001, the first terminal may add an identity of the second terminal to an area information update request message to send the area information update request for updating the area information of the second terminal. The identity of the second terminal may include but not limited to:

a name of the second terminal, an international mobile subscriber identification number (International Mobile Subscriber Identification Number, IMSI) of the second terminal, a temporary mobile subscriber identity (Temporary Mobile Subscriber Identity, TMSI) of the second terminal, and the like, as long as the network can identify the second terminal according to the identity of the second terminal.

For the second case in which the area information of the second terminal is updated by performing step S2000 and step S2003, optionally, step S2000 specifically includes:

sending, by the first terminal, an area information update request for updating the area information of the first terminal; and using area information in an accept message that is returned in response to the area information update request, as the area information of the first terminal.

For the second case in which the area information of the second terminal is updated by performing step S2000 and step S2003, optionally, step S2003 specifically includes:

sending, by the first terminal, a part or all of the area information of the first terminal to the second terminal.

Optionally, after step S2000, the first terminal may perform step S2003 when at least one of the following trigger conditions is met:

a condition 1: the first terminal detects that the second terminal becomes a terminal to which the first terminal provides the relay service;

a condition 2: the first terminal determines that the area information of the second terminal does not overlap the area information of the first terminal;

a condition 3: the area information of the first terminal changes; or a condition 4: the first terminal receives an area information update request that is sent by the second terminal and that is used to update the area information of the second terminal.

Similarly, the first terminal may also perform step S2001 when at least one of the trigger conditions is met, to send the area information update request for updating the area information of the second terminal.

The four conditions are merely exemplary. During an implementation, trigger conditions are not limited to the four.

In the condition 1, a possible case in which the second terminal becomes a terminal to which the first terminal provides the relay service includes but not limited the following two:

the second terminal becomes a terminal to which the first terminal provides the relay service, from a terminal to which another terminal except the first terminal provides the relay service; and the second terminal becomes a terminal to which the first terminal provides the relay service, from a terminal to which no terminal provides the relay service.

In the condition 2, the first terminal may determine, in the following manner, that the area information of the second terminal does not overlap the area information of the first terminal:

For example, when the area information is a TA list, and the TA list includes one or more TA identities. When the first terminal determines that a TA identity (Tracking Area identity, TAI) in a TA list of the first terminal is different from any one of TAIs in a TA list of the second terminal, the first terminal determines that the area information of the second terminal does not overlap the area information of the first terminal.

Optionally, when the condition 2 is met, before the first terminal performs step S2003, the process may further include:

obtaining, by the first terminal, the area information of the second terminal from the second terminal.

Optionally, for the condition 4, the second terminal may send the area information update request when at least one of the following conditions is met:

the second terminal sends the area information update request when determining that an area in which the second terminal is located does not overlap an area indicated by the obtained area information of the first terminal;

the second terminal sends the area information update request when becoming a terminal to which the first terminal provides the relay service; or the second terminal sends the area information update request when an area information update timer of the second terminal times out.

Optionally, for the first case in which the area information of the second terminal is updated by performing step S2001, step S2002, and step S2003, the area information update request sent in step S2001 may carry first indication information, and the first indication information is used to indicate that the second terminal is a terminal to which another terminal provides the relay service.

For example, the first indication information is IND1, and when IND1 is 1, it indicates that the second terminal is a terminal to which another terminal provides the relay service. Herein, the another terminal generally refers to all terminals that provide the relay service to the second terminal, and includes the first terminal.

Optionally, the area information update accept message sent in step S2002 carries second indication information, and the second indication information is used to indicate that the second terminal is a terminal to which another terminal provides the relay service.

For example, the second indication information is IND2, and when IND2 is 1, it indicates that the second terminal is a terminal to which another terminal provides the relay service. Herein, the another terminal generally refers to all terminals that provide the relay service to the second terminal, and includes the first terminal.

Optionally, the area information update request message sent in step S2001 carries a terminal identity of the first terminal.

Optionally, the area information update accept message sent in step 2002 carries the terminal identity of the first terminal.

Similar to the explanation of the identity of the second terminal above, the identity of the first terminal may include but not limited to: a name of the first terminal, an IMSI of the first terminal, a TMSI of the first terminal, and the like, as long as the network and/or a terminal (for example, the second terminal) can identify the first terminal according to the identity of the first terminal.

Optionally, for the first case in which the area information of the second terminal is updated by performing step S2001, step S2002, and step S2003, in step S2003, a manner for the first terminal to update the area information of the second terminal includes but not limited to the following two:

Update Manner 1

The first terminal updates the area information of the second terminal according to the accept message received in step S2002.

Update Manner 2

Similar to the second case in which the area information of the second terminal is updated by performing step S2000 and step S2003, in the first area information update case, the first terminal also sends the area information of the first terminal to the second terminal, and the second terminal updates the area information of the second terminal according to the received area information of the first terminal.

Specifically, in the update manner 1, the first terminal may obtain updated area information of the second terminal from the accept message received in step S2002, and send the obtained area information to the second terminal, and the second terminal updates the area information according to the received area information; or the first terminal sends the accept message received in step S2002 to the second terminal, and the second terminal obtains updated area information of the second terminal from the received accept message, and updates the area information according to the obtained area information.

Optionally, for the update manner 1, if the first terminal obtains the updated area information of the second terminal from the accept message received in step S2002, and send the obtained area information to the second terminal, optionally, after the obtaining, by the first terminal, updated area information of the second terminal from the accept message received in step S2002, the process further includes: storing, by the first terminal, the updated area information of the second terminal obtained from the accept message.

Optionally, for the update manner 1, if the first terminal sends the accept message received in step S2002 to the second terminal, after the sending, by the first terminal, the accept message received in step S2002 to the second terminal, the process further includes:

receiving, by the first terminal, the updated area information of the second terminal sent by the second terminal; and storing, by the first terminal, the updated area information of the second terminal received from the second terminal.

Specifically, in the Update Manner 2, when determining that an area indicated by the area information in the accept message received in step S2002 overlaps an area in which the first terminal is located, the first terminal sends a part or all of the area information of the first terminal to the second terminal.

The first terminal may determine, in the following manner, that the area indicated by the area information in the accept message overlaps the area in which the first terminal is located:

For example, when the area information is a TA list, and the TA list includes one or more TA identities, when the first terminal determines that a TA list of the first terminal and a TA list in the accept message include one or more same TAIs, the first terminal determines that the areas overlap.

If the first terminal sends, after receiving the area information update request message that is sent by the second terminal and that is used to update the area information of the second terminal, the area information update request message for updating the area information of the second terminal, that is, the first terminal performs step S2001 when the condition 4 in the trigger conditions is met, for the update manner 1 of area information update, the accept message sent by the first terminal to the second terminal is sent in response to the area information update request sent by the second terminal; and for the update manner 2 of area information update, the updated area information of the second terminal sent by the first terminal to the second terminal is sent after the first terminal receives the area information update request message sent by the second terminal.

An area information update process in the embodiments of the present invention is described above from the perspective of mutual cooperation between a first terminal and a second terminal. The present invention describes, below by using Embodiment 20 to Embodiment 25, a first terminal, a second terminal, and an area information update method provided in the embodiments of the present invention.

Embodiment 20

Figure 21:
FIG. 21 is a schematic structural diagram of a first terminal according to Embodiment 20 of the present invention.

FIG. 21 is a schematic structural diagram of a first terminal according to Embodiment 20 of the present invention. As shown in FIG. 21, the first terminal includes: a transceiver module 2101 and a processing module 2102.

In Embodiment 20, there are two optional implementation manners when the first terminal updates area information of a second terminal:

an implementation manner 1: the first terminal initiates an area information update process for updating the area information of the second terminal, to update the area information of the second terminal; and an implementation manner 2: the first terminal updates the area information of the second terminal according to area information of the first terminal.

Specifically, for the implementation manner 1, the transceiver module 2101 is configured to send an area information update request for updating the area information of the second terminal, and receive accept information of the area information update request, where the second terminal is a terminal to which the first terminal provides a relay service; and the processing module 2102 is configured to: after the transceiver module 2101 receives the accept message, update the area information of the second terminal.

Optionally, the processing module 2102 is specifically configured to:

update the area information of the second terminal according to the accept message.

Optionally, the processing module 2102 is specifically configured to:

obtain updated area information of the second terminal from the accept message, and send the obtained updated area information of the second terminal to the second terminal.

Optionally, the processing module 2102 is further configured to:

after obtaining the updated area information of the second terminal from the accept message, store the updated area information of the second terminal obtained from the accept message.

Optionally, the processing module 2102 is specifically configured to:

send the received accept message to the second terminal by using the transceiver module 2101.

Optionally, the transceiver module 2101 is further configured to:

receive updated area information of the second terminal sent by the second terminal; and store the updated area information of the second terminal received from the second terminal.

Optionally, the processing module 2102 is specifically configured to:

send a part or all of area information of the first terminal to the second terminal by using the transceiver module 2101.

Optionally, the processing module 2102 is specifically configured to:

when determining that an area indicated by area information in the accept message overlaps an area in which the first terminal is located, send a part or all of the area information of the first terminal to the second terminal by using the transceiver module 2101.

Optionally, the transceiver module 2101 is specifically configured to: when at least one of the following conditions is met, send an area information update request message for updating the area information of the second terminal:

the second terminal becomes a terminal to which the first terminal provides the relay service;

the area information of the second terminal does not overlap the area information of the first terminal;

the area information of the first terminal changes; or the transceiver module 2101 receives an area information update request message that is sent by the second terminal and that is used to update the area information of the second terminal.

Optionally, the transceiver module 2101 is further configured to:

before sending, because the area information of the second terminal does not overlap the area information of the first terminal, an area information update request message for updating the area information of the second terminal, obtain the area information of the second terminal from the second terminal.

Optionally, the area information update request message carries first indication information, and the first indication information is used to indicate that the second terminal is a terminal to which another terminal provides the relay service; and/or the accept message carries second indication information, and the second indication information is used to indicate that the second terminal is a terminal to which another terminal provides the relay service.

Optionally, the area information update request message and/or the accept message carries a terminal identity of the first terminal.

Specifically, for the implementation manner 2, the transceiver module 2101 is configured to obtain the area information of the first terminal; and the processing module 2102 is configured to update, according to the area information of the first terminal obtained by the transceiver module 2101, the area information of the second terminal to which the first terminal provides a relay service.

Optionally, the transceiver module 2101 is specifically configured to:

send a first area information update request message for updating the area information of the first terminal; and use area information in an accept message of the first area information update request message as the area information of the first terminal.

Optionally, the processing module 2102 is specifically configured to:

when at least one of the following conditions is met, update the area information of the second terminal according to the area information of the first terminal obtained by the transceiver module 2101:

it is detected that the second terminal becomes a terminal to which the first terminal provides the relay service;

it is determined that the area information of the second terminal does not overlap the area information of the first terminal;

the area information of the first terminal changes; or the transceiver module 2101 receives a second area information update request message that is sent by the second terminal and that is used to update the area information of the second terminal.

Optionally, the processing module 2102 is specifically configured to:

send a part or all of the area information of the first terminal to the second terminal.

Embodiment 21

Figure 22:
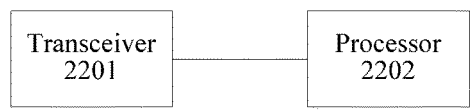
FIG. 22 is a schematic structural diagram of a first terminal according to Embodiment 21 of the present invention.

FIG. 22 is a schematic structural diagram of a first terminal according to Embodiment 21 of the present invention. As shown in FIG. 22, the first terminal includes: a transceiver 2201 and a processor 2202.

In Embodiment 21, there are two optional implementation manners when the first terminal updates area information of a second terminal:

an implementation manner 1: the first terminal initiates an area information update process for updating the area information of the second terminal, to update the area information of the second terminal; and an implementation manner 2: the first terminal updates the area information of the second terminal according to area information of the first terminal.

Specifically, for the implementation manner 1, the transceiver 2201 is configured to send an area information update request for updating the area information of the second terminal, and receive accept information of the area information update request, where the second terminal is a terminal to which the first terminal provides a relay service; and the processor 2202 is configured to: after the transceiver 2201 receives the accept message, update the area information of the second terminal.

Optionally, the processor 2202 is specifically configured to:

update the area information of the second terminal according to the accept message.

Optionally, the processor 2202 is specifically configured to:

obtain updated area information of the second terminal from the accept message, and send the obtained updated area information of the second terminal to the second terminal.

Optionally, the processor 2202 is further configured to:

after obtaining the updated area information of the second terminal from the accept message, store the updated area information of the second terminal obtained from the accept message.

Optionally, the processor 2202 is specifically configured to:

send the received accept message to the second terminal by using the transceiver 2201.

Optionally, the transceiver 2201 is further configured to:

receive updated area information of the second terminal sent by the second terminal; and store the updated area information of the second terminal received from the second terminal.

Optionally, the processor 2202 is specifically configured to:

send a part or all of area information of the first terminal to the second terminal by using the transceiver 2201.

Optionally, the processor 2202 is specifically configured to:

when determining that an area indicated by area information in the accept message overlaps an area in which the first terminal is located, send a part or all of the area information of the first terminal to the second terminal by using the transceiver 2201.

Optionally, the transceiver 2201 is specifically configured to: when at least one of the following conditions is met, send an area information update request message for updating the area information of the second terminal:

the second terminal becomes a terminal to which the first terminal provides the relay service;

the area information of the second terminal does not overlap the area information of the first terminal;

the area information of the first terminal changes; or the transceiver 2201 receives an area information update request message that is sent by the second terminal and that is used to update the area information of the second terminal.

Optionally, the transceiver 2201 is further configured to:

before sending, because the area information of the second terminal does not overlap the area information of the first terminal, an area information update request message for updating the area information of the second terminal, obtain the area information of the second terminal from the second terminal.

Optionally, the area information update request message carries first indication information, and the first indication information is used to indicate that the second terminal is a terminal to which another terminal provides the relay service; and/or the accept message carries second indication information, and the second indication information is used to indicate that the second terminal is a terminal to which another terminal provides the relay service.

Optionally, the area information update request message and/or the accept message carries a terminal identity of the first terminal.

Specifically, for the implementation manner 2, the transceiver 2201 is configured to obtain the area information of the first terminal; and the processor 2202 is configured to update, according to the area information of the first terminal obtained by the transceiver 2201, the area information of the second terminal to which the first terminal provides a relay service.

Optionally, the transceiver 2201 is specifically configured to:

send a first area information update request message for updating the area information of the first terminal; and use area information in an accept message of the first area information update request message as the area information of the first terminal.

Optionally, the processor 2202 is specifically configured to:

when at least one of the following conditions is met, update the area information of the second terminal according to the area information of the first terminal obtained by the transceiver 2201:

it is detected that the second terminal becomes a terminal to which the first terminal provides the relay service;

it is determined that the area information of the second terminal does not overlap the area information of the first terminal;

the area information of the first terminal changes; or the transceiver 2201 receives a second area information update request message that is sent by the second terminal and that is used to update the area information of the second terminal.

Optionally, the processor 2202 is specifically configured to:

send a part or all of the area information of the first terminal to the second terminal.

Embodiment 22

Figure 23:
FIG. 23 is a schematic structural diagram of a second terminal according to Embodiment 22 of the present invention.

FIG. 23 is a schematic structural diagram of a second terminal according to Embodiment 22 of the present invention. As shown in the FIG. 23, the second terminal includes:

a transceiver module 2301, configured to obtain updated area information of the second terminal from a first terminal; and a processing module 2302, configured to update area information of the second terminal according to the obtained updated area information of the second terminal, where the first terminal provides a relay service to the second terminal.

Optionally, the transceiver module 2301 is specifically configured to:

receive an area information update accept message sent by the first terminal; and obtain the updated area information of the second terminal from the received area information update accept message.

Optionally, the transceiver module 2301 is further configured to:

after obtaining the updated area information of the second terminal from the received area information update accept message, send the obtained updated area information of the second terminal to the first terminal.

Optionally, the transceiver module 2301 is further configured to:

before receiving the area information update accept message sent by the first terminal, send, by using the first terminal, an area information update request message for updating the area information, where the area information update accept message received by the transceiver module 2301 responds to the area information update request message sent by the transceiver module 2301.

Optionally, the transceiver module 2301 is specifically configured to:

receive the updated area information of the second terminal sent by the first terminal.

Optionally, the updated area information of the second terminal received by the transceiver module 2301 from the first terminal includes:

all or a part of area information of the first terminal; or the updated area information of the second terminal obtained by the first terminal from a network.

Optionally, the transceiver module 2301 is further configured to: before receiving the updated area information of the second terminal sent by the first terminal, send, by using the first terminal, an area information update request message for updating the area information, where the updated area information of the second terminal received by the transceiver module 2301 is sent by the first terminal after the first terminal receives the area information update request message sent by the transceiver module 2301.

Optionally, the transceiver module 2301 is further configured to: before sending the area information update request message by using the first terminal, obtain area information of the first terminal; and the transceiver module 2301 is specifically configured to: when it is determined that an area in which the second terminal is located does not overlap an area indicated by the obtained area information of the first terminal, send the area information update request message by using the first terminal.

Optionally, the transceiver module 2301 is specifically configured to:

when the second terminal becomes a terminal to which the first terminal provides the relay service, obtain the area information of the first terminal.

Optionally, the transceiver module 2301 is specifically configured to:

when the second terminal becomes a terminal to which the first terminal provides the relay service, send the area information update request message by using the first terminal.

Optionally, the area information update request message carries first indication information, and the first indication information is used to indicate that the second terminal is a terminal to which another terminal provides the relay service; and/or the area information update accept message carries second indication information, and the second indication information is used to indicate that the second terminal is a terminal to which another terminal provides the relay service.

Optionally, the area information update request message and/or the information update accept message carries a terminal identity of the first terminal.

Embodiment 23

Figure 24:
FIG. 24 is a schematic structural diagram of a second terminal according to Embodiment 23 of the present invention.

FIG. 24 is a schematic structural diagram of a second terminal according to Embodiment 23 of the present invention. As shown in the FIG. 24, the second terminal includes:

a transceiver 2401, configured to obtain updated area information of the second terminal from a first terminal; and a processor 2402, configured to update area information of the second terminal according to the obtained updated area information of the second terminal, where the first terminal provides a relay service to the second terminal.

Optionally, the transceiver 2401 is specifically configured to:

receive an area information update accept message sent by the first terminal; and obtain the updated area information of the second terminal from the received area information update accept message.

Optionally, the transceiver 2401 is further configured to:

after obtaining the updated area information of the second terminal from the received area information update accept message, send the obtained updated area information of the second terminal to the first terminal.

Optionally, the transceiver 2401 is further configured to:

before receiving the area information update accept message sent by the first terminal, send, by using the first terminal, an area information update request message for updating the area information, where the area information update accept message received by the transceiver 2401 responds to the area information update request message sent by the transceiver 2401.

Optionally, the transceiver 2401 is specifically configured to:

receive the updated area information of the second terminal sent by the first terminal.

Optionally, the updated area information of the second terminal received by the transceiver 2401 from the first terminal includes:

all or a part of area information of the first terminal; or the updated area information of the second terminal obtained by the first terminal from a network.

Optionally, the transceiver 2401 is further configured to: before receiving the updated area information of the second terminal sent by the first terminal, send, by using the first terminal, an area information update request message for updating the area information, where the updated area information of the second terminal received by the transceiver 2401 is sent by the first terminal after the first terminal receives the area information update request message sent by the transceiver 2401.

Optionally, the transceiver 2401 is further configured to:

before sending the area information update request message by using the first terminal, obtain area information of the first terminal; and the transceiver 2401 is specifically configured to: when it is determined that an area in which the second terminal is located does not overlap an area indicated by the obtained area information of the first terminal, send the area information update request message by using the first terminal.

Optionally, the transceiver 2401 is specifically configured to:

when the second terminal becomes a terminal to which the first terminal provides the relay service, obtain the area information of the first terminal.

Optionally, the transceiver 2401 is specifically configured to:

when the second terminal becomes a terminal to which the first terminal provides the relay service, send the area information update request message by using the first terminal.

Optionally, the area information update request message carries first indication information, and the first indication information is used to indicate that the second terminal is a terminal to which another terminal provides the relay service; and/or the area information update accept message carries second indication information, and the second indication information is used to indicate that the second terminal is a terminal to which another terminal provides the relay service.

Optionally, the area information update request message and/or the information update accept message carries a terminal identity of the first terminal.

Embodiment 24

In Embodiment 24, there are two optional implementation manners when a first terminal updates area information of a second terminal:

an implementation manner 1: the first terminal initiates an area information update process for updating the area information of the second terminal, to update the area information of the second terminal; and an implementation manner 2: the first terminal updates the area information of the second terminal according to area information of the first terminal.

Figure 25A:
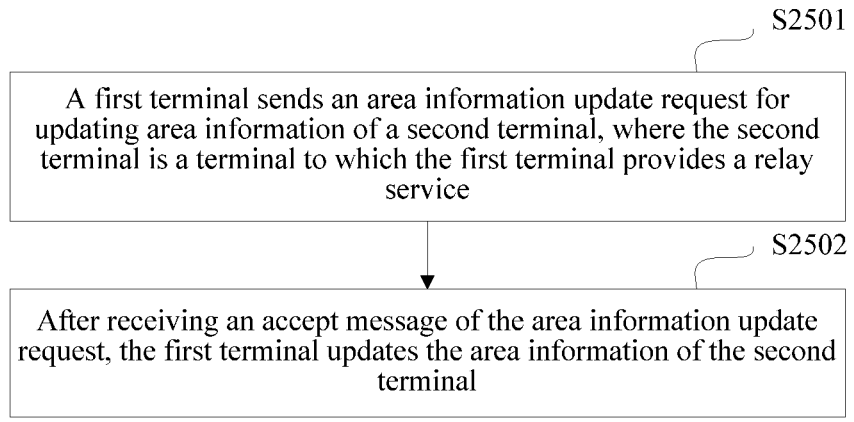
FIG. 25A is a flowchart of a method in an implementation manner 1 according to Embodiment 24 of the present invention.

Specifically, for the implementation manner 1, as shown in FIG. 25A, an area information update method in Embodiment 24 includes:

S2501: A first terminal sends an area information update request for updating area information of a second terminal, where the second terminal is a terminal to which the first terminal provides a relay service.

S2502: After receiving an accept message of the area information update request, the first terminal updates the area information of the second terminal.

Optionally, the updating, by the first terminal, the area information of the second terminal in step S2502 includes:

updating, by the first terminal, the area information of the second terminal according to the accept message.

Optionally, the updating, by the first terminal, the area information of the second terminal according to the accept message includes:

obtaining, by the first terminal, updated area information of the second terminal from the accept message, and sending the obtained updated area information of the second terminal to the second terminal.

Optionally, after the obtaining, by the first terminal, updated area information of the second terminal from the accept message, the method further includes:

storing, by the first terminal, the updated area information of the second terminal obtained from the accept message.

Optionally, the updating, by the first terminal, the area information of the second terminal according to the accept message includes:

sending, by the first terminal, the received accept message to the second terminal.

Optionally, after the updating, by the first terminal, the area information of the second terminal in step S2502, the method further includes:

receiving, by the first terminal, updated area information of the second terminal sent by the second terminal; and storing, by the first terminal, the updated area information of the second terminal received from the second terminal.

Optionally, the updating, by the first terminal, the area information of the second terminal in step S2502 includes: sending, by the first terminal, a part or all of area information of the first terminal to the second terminal Optionally, the sending, by the first terminal, a part or all of area information of the first terminal to the second terminal includes:

when determining that an area indicated by area information in the accept message overlaps an area in which the first terminal is located, sending, by the first terminal, a part or all of the area information of the first terminal to the second terminal.

Optionally, when at least one of the following conditions is met, the first terminal sends an area information update request message for updating the area information of the second terminal:

the first terminal detects that the second terminal becomes a terminal to which the first terminal provides the relay service;

the first terminal determines that the area information of the second terminal does not overlap the area information of the first terminal;

the area information of the first terminal changes; or the first terminal receives an area information update request message that is sent by the second terminal and that is used to update the area information of the second terminal.

Optionally, before sending, by the first terminal because the area information of the second terminal does not overlap the area information of the first terminal, an area information update request message for updating the area information of the second terminal, the method further includes:

obtaining, by the first terminal, the area information of the second terminal from the second terminal.

Optionally, the area information update request message carries first indication information, and the first indication information is used to indicate that the second terminal is a terminal to which another terminal provides the relay service; and/or the accept message carries second indication information, and the second indication information is used to indicate that the second terminal is a terminal to which another terminal provides the relay service.

Optionally, the area information update request message and/or the accept message carries a terminal identity of the first terminal.

Figure 25B:
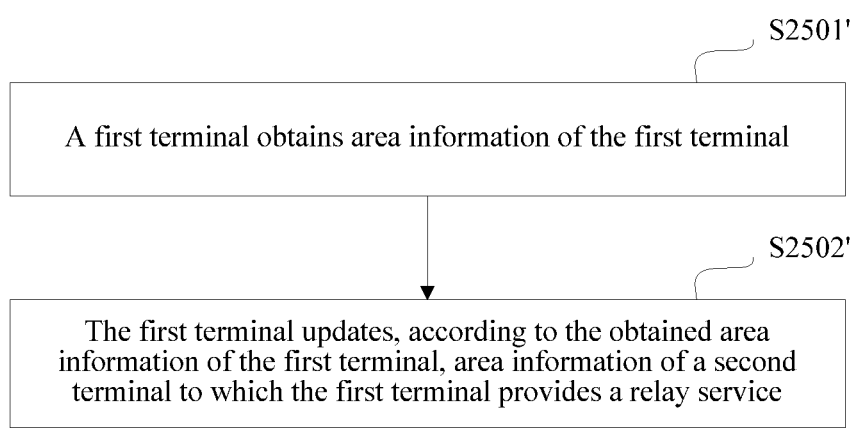
FIG. 25B is a flowchart of a method in an implementation manner 2 according to Embodiment 24 of the present invention.

Specifically, for the implementation manner 2, as shown in FIG. 25B, an area information update method in Embodiment 24 includes:

S2501': A first terminal obtains area information of the first terminal.

S2502': The first terminal updates, according to the obtained area information of the first terminal, area information of a second terminal to which the first terminal provides a relay service.

Optionally, the obtaining, by the first terminal, area information of the first terminal includes:

sending, by the first terminal, a first area information update request message for updating the area information of the first terminal; and using, by the first terminal, area information in an accept message of the first area information update request message as the area information of the first terminal.

Optionally, the updating, by the first terminal according to the obtained area information of the first terminal, area information of a second terminal includes: when at least one of the following conditions is met, updating, by the first terminal, the area information of the second terminal according to the obtained area information of the first terminal:

the first terminal detects that the second terminal becomes a terminal to which the first terminal provides the relay service;

the first terminal determines that the area information of the second terminal does not overlap the area information of the first terminal;

the area information of the first terminal changes; or the first terminal receives a second area information update request message that is sent by the second terminal and that is used to update the area information of the second terminal.

Optionally, the updating, by the first terminal, area information of a second terminal according to the obtained area information of the first terminal includes:

sending, by the first terminal, a part or all of the area information of the first terminal to the second terminal.

Embodiment 25

Figure 26:
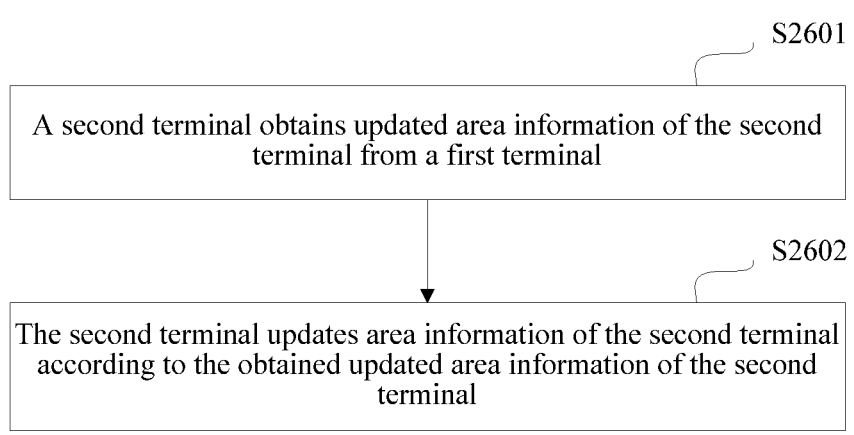
FIG. 26 is a flowchart of a method according to Embodiment 25 of the present invention.

FIG. 26 is a flowchart of a method according to Embodiment 25 of the present invention. As shown in FIG. 26, the method includes the following steps:

S2601: A second terminal obtains updated area information of the second terminal from a first terminal.

S2602: The second terminal updates area information of the second terminal according to the obtained updated area information of the second terminal.

The first terminal provides a relay service to the second terminal.

Optionally, the obtaining, by a second terminal, updated area information of the second terminal from a first terminal includes:

receiving, by the second terminal, an area information update accept message sent by the first terminal; and obtaining, by the second terminal, the updated area information of the second terminal from the received area information update accept message.

Optionally, after the obtaining, by the second terminal, the updated area information of the second terminal from the received area information update accept message, the method further includes:

sending, by the second terminal, the obtained updated area information of the second terminal to the first terminal.

Optionally, before the receiving, by the second terminal, an area information update accept message sent by the first terminal, the method further includes:

sending, by the second terminal by using the first terminal, an area information update request message for updating the area information, where the area information update accept message received by the second terminal responds to the area information update request message sent by the second terminal.

Optionally, the obtaining, by a second terminal, updated area information of the second terminal from a first terminal includes:

receiving, by the second terminal, the updated area information of the second terminal sent by the first terminal.

Optionally, the updated area information of the second terminal received by the second terminal from the first terminal includes:

all or a part of area information of the first terminal; or the updated area information of the second terminal obtained by the first terminal from a network.

Optionally, before the receiving, by the second terminal, the updated area information of the second terminal sent by the first terminal, the method further includes:

sending, by the second terminal by using the first terminal, an area information update request message for updating the area information, where the updated area information of the second terminal received by the second terminal is sent by the first terminal after the first terminal receives the area information update request message sent by the second terminal.

Optionally, before the sending, by the second terminal, an area information update request message by using the first terminal, the method further includes: obtaining, by the second terminal, area information of the first terminal; and the sending, by the second terminal, an area information update request message by using the first terminal includes: when determining that an area in which the second terminal is located does not overlap an area indicated by the obtained area information of the first terminal, sending, by the second terminal, the area information update request message by using the first terminal.

Optionally, the obtaining, by the second terminal, area information of the first terminal includes:

when becoming a terminal to which the first terminal provides the relay service, obtaining, by the second terminal, the area information of the first terminal.

Optionally, the sending, by the second terminal, an area information update request message by using the first terminal includes:

when becoming a terminal to which the first terminal provides the relay service, sending, by the second terminal, the area information update request message by using the first terminal.

Optionally, the area information update request message carries first indication information, and the first indication information is used to indicate that the second terminal is a terminal to which another terminal provides the relay service; and/or the area information update accept message carries second indication information, and the second indication information is used to indicate that the second terminal is a terminal to which another terminal provides the relay service.

Optionally, the area information update request message and/or the information update accept message carries a terminal identity of the first terminal.

In the following Embodiment 26 to Embodiment 30, an area information update process in the embodiments of the present invention is described by using a tracking area update (Tracking Area Update, TAU) process as an example, where a tracking area update request (TAU Request) message is the area information update request in Embodiment 19, and a tracking area update accept (Tracking Area Update Accept) message is the accept message in Embodiment 19. An evolved NodeB (evolved NodeB, eNB) and a mobility management entity (Mobility Management Entity, MME) are the network in Embodiment 19.

Embodiment 26

Figure 27:
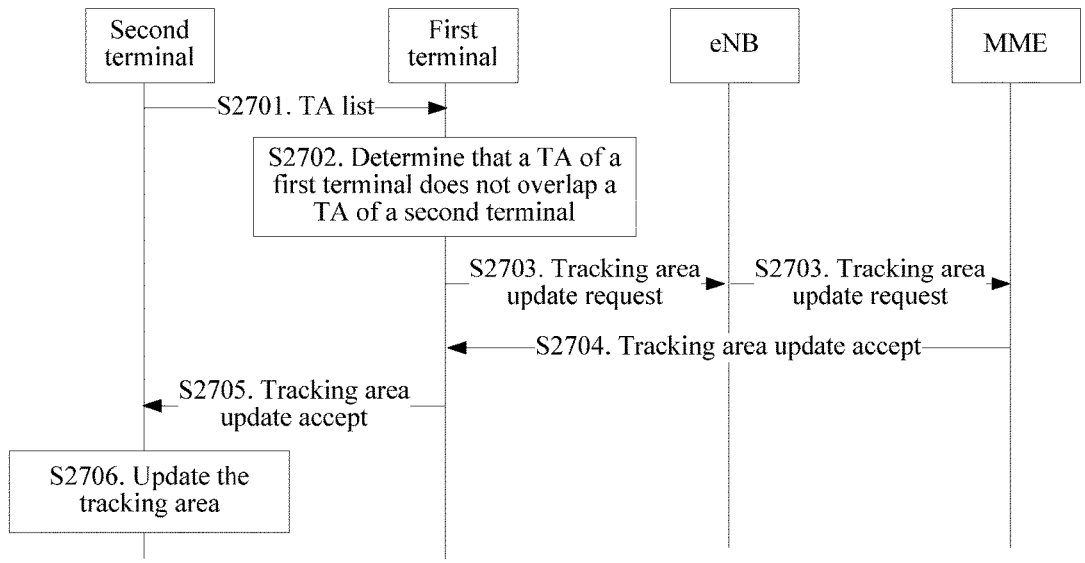
FIG. 27 is a flowchart according to Embodiment 26 of the present invention.

As shown in FIG. 27, Embodiment 26 includes the following steps:

S2701: A second terminal sends a TA list of the second terminal to a first terminal.

S2702: After receiving the TA list of the second terminal, the first terminal determines that a TA of the first terminal does not overlap a TA of the second terminal.

S2703: The first terminal sends, to an MME by using an eNB, a TA update request (TAU Request) message for updating the TA of the second terminal.

S2704: The first terminal receives, from the eNB, an update accept (Tracking Area Update Accept) message sent by the MME.

S2705: The first terminal forwards the Tracking Area Update Accept message received by the first terminal to the second terminal.

S2706: The second terminal updates the tracking area according to an updated TA list in the received Tracking Area Update Accept message.

Embodiment 27

Different from Embodiment 26, a first terminal updates a tracking area of a second terminal when detecting that the second terminal becomes a terminal to which the first terminal provides a relay service, and after receiving a Tracking Area Update Accept, the first terminal does not directly forward the Tracking Area Update Accept to the second terminal, but obtains an updated TA list of the second terminal from the Tracking Area Update Accept, and sends the obtained TA list to the second terminal, and the second terminal updates the tracking area according to the received TA list.

Figure 28:
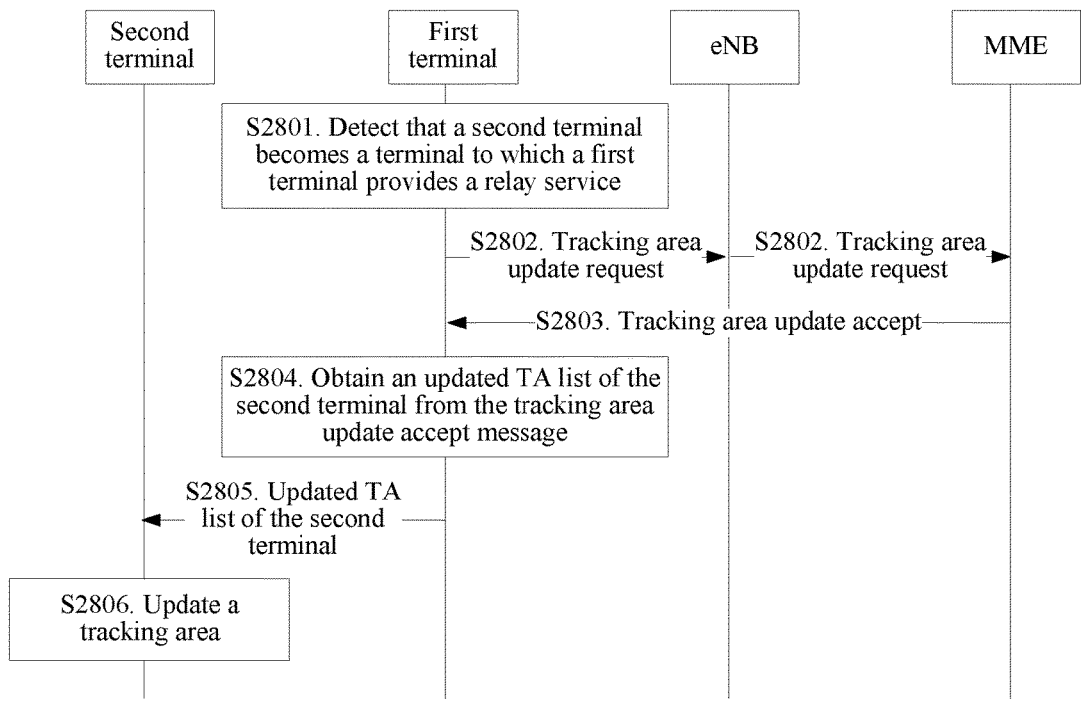
FIG. 28 is a flowchart according to Embodiment 27 of the present invention.

As shown in FIG. 28, Embodiment 27 includes the following steps:

S2801: Detect that a second terminal becomes a terminal to which a first terminal provides a relay service.

S2802: The first terminal sends, to an MME by using an eNB, a TAU Request message for updating a TA of the second terminal.

S2803: The first terminal receives, from the eNB, a Tracking Area Update Accept message sent by the MME.

S2804: The first terminal obtains an updated TA list of the second terminal from the Tracking Area Update Accept message received by the first terminal.

S2805: The first terminal sends the updated TA list of the second terminal to the second terminal.

S2806: The second terminal updates the tracking area according to the received updated TA list.

Embodiment 28

Different from Embodiment 26 and Embodiment 27, a second terminal actively initiates a tracking area update process. After receiving a TA list of a first terminal sent by the first terminal, when determining that a TA of the first terminal does not overlap a TA of the second terminal, the second terminal initiates the tracking area update process.

Figure 29:
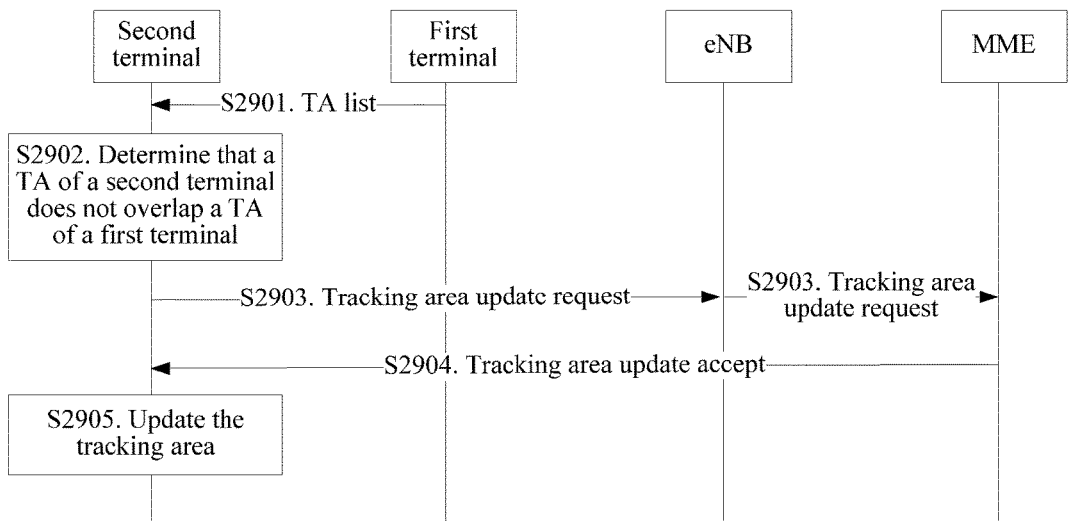
FIG. 29 is a flowchart according to Embodiment 28 of the present invention.

As shown in FIG. 29, Embodiment 28 includes the following steps:

S2901: A first terminal sends a TA list of the first terminal to a second terminal.

S2902: After receiving the TA list of the first terminal, the second terminal determines that a TA of the second terminal does not overlap a TA of the first terminal.

S2903: The second terminal sends, to an MME by using the first terminal and an eNB, a TAU Request message for updating the TA of the second terminal.

S2904: The second terminal receives, by using the first terminal and the eNB, a Tracking Area Update Accept message sent by the MME.

S2905: The second terminal updates the tracking area according to an updated TA list in the received Tracking Area Update Accept message.

Embodiment 29

Different from Embodiment 28, when a second terminal detects that the second terminal becomes a terminal to which a first terminal provides a relay service, the second terminal actively initiates a tracking area update process.

Figure 30:
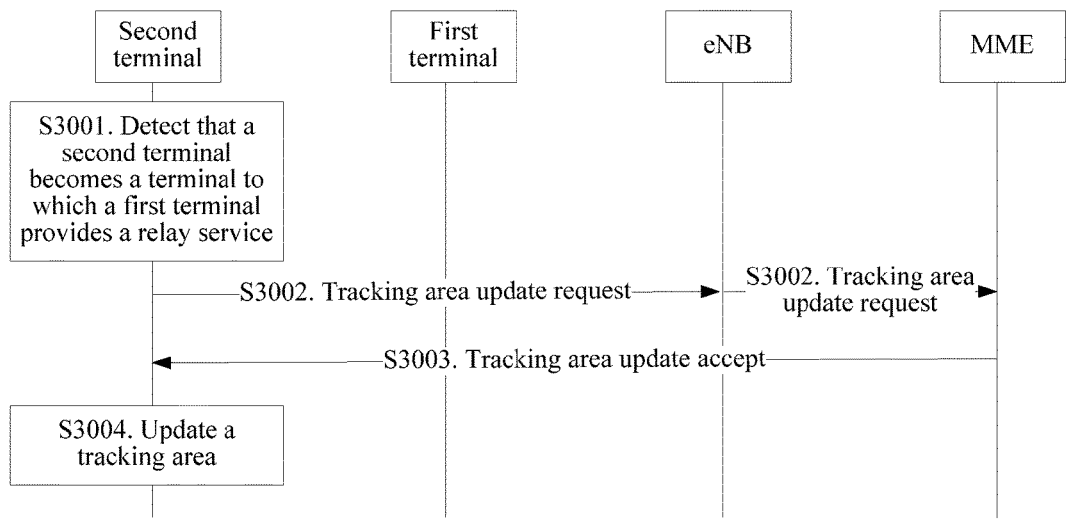
FIG. 30 is a flowchart according to Embodiment 29 of the present invention.

As shown in FIG. 30, Embodiment 29 includes the following steps:

S3001: A second terminal detects that the second terminal becomes a terminal to which a first terminal provides a relay service.

S3002: The second terminal sends, to an MME by using the first terminal and an eNB, a TAU Request message for updating a TA of the second terminal.

S3003: The second terminal receives, by using the first terminal and the eNB, a Tracking Area Update Accept message sent by the MME.

S3004: The second terminal updates the tracking area according to an updated TA list in the received Tracking Area Update Accept message.

Embodiment 30

Different from Embodiments 26 and 27, a first terminal sends TA information of the first terminal to a second terminal when detecting that the second terminal becomes a terminal to which the first terminal provides a relay service, or detecting that a TA of the first terminal does not overlap a TA of the second terminal, or receiving a TAU Request message sent by the second terminal.

Figure 31:
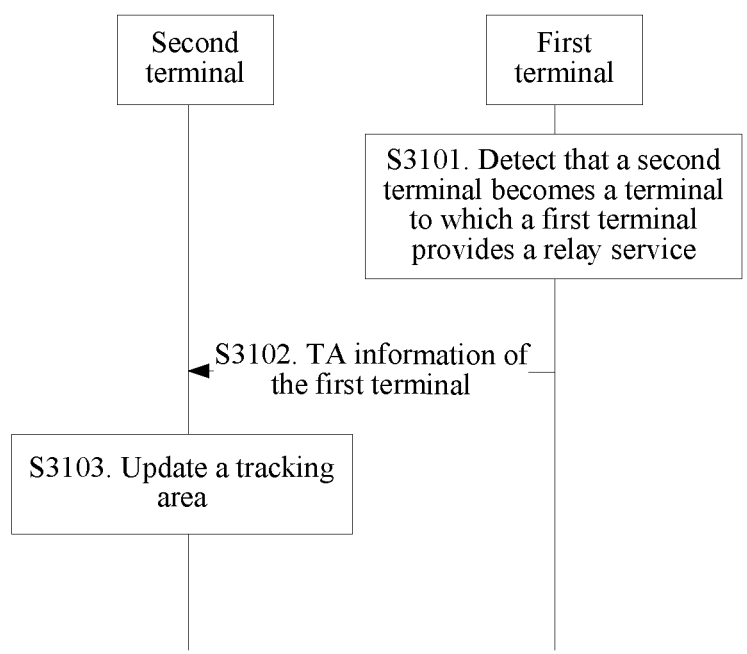
FIG. 31 is a flowchart according to Embodiment 30 of the present invention.

As shown in FIG. 31, using that the first terminal detects that the second terminal becomes a terminal to which the first terminal provides a relay service as an example, Embodiment 30 includes the following steps:

S3101: A first terminal detects that a second terminal becomes a terminal to which the first terminal provides a relay service.

S3102: The first terminal sends TA information of the first terminal to the second terminal.

S3103: The second terminal updates a TA of the second terminal according to the received TA information of the first terminal.

In conclusion, for a terminal relay scenario, by means of the embodiments of the present invention, a second terminal can be paged by using a first terminal; and by means of the embodiments of the present invention, area information of the second terminal can be updated by using the first terminal.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A first terminal comprising:
   a receiver configured to receive a paging message from a network device for paging a second terminal lacking an ability to be paged directly by the network device, wherein the paging message carries a terminal identity of the second terminal;
   a processor; and
   a memory storing a program to be executed in the processor, the program comprising instructions for:

when the paging message comprises a terminal identity of the first terminal that provides relay services to one or more terminals, and when determining that the second terminal is a terminal to which the first terminal provides a relay service, paging the second terminal according to the terminal identity of the second terminal.

2. The first terminal according to claim 1, wherein the program comprises further instructions for:
in response to determining that a terminal identity list, stored in the first terminal, of terminals to which the first terminal provides relay services comprises the terminal identity of the second terminal,
determining that the second terminal is the terminal to which the first terminal provides the relay service.

3. The first terminal according to claim 1, wherein the program comprises further instructions for:
in response to determining that the paging message comprises indication information indicating that the paging message further pages the first terminal, determining that the paging message further pages the first terminal.

4. The first terminal according to claim 1, wherein the program comprises further instructions for determining a paging moment of the second terminal for paging the second terminal in one of following manners:
determining the paging moment of the second terminal according to paging moment information of the second terminal that is received by the receiver from the second terminal;
determining the paging moment of the second terminal according to a paging parameter that is received by the receiver from the second terminal and that is used to determine the paging moment of the second terminal;
determining the paging moment of the second terminal according to paging moment information of the second terminal obtained from the paging message; or
determining the paging moment of the second terminal according to a paging parameter that is obtained from the paging message and that is used to determine the paging moment of the second terminal; and
the program comprises further instructions for:
paging the second terminal according to the determined paging moment of the second terminal.

5. A network device comprises:
a receiver;
a processor; and
a memory storing a program to be executed in the processor; and
wherein the receiver is configured to receive a first paging message for paging a second terminal, wherein the first paging message carries a terminal identity of the second terminal and a terminal identity of a first terminal that provides a relay service to the second terminal; and
wherein the program comprises further instructions for paging the second terminal by using the first terminal according to the terminal identity of the first terminal.

6. The network device according to claim 5, wherein in response to determining that the receiver receives the first paging message, the program comprises further instructions for:
sending a fourth paging message for paging the first terminal, wherein the fourth paging message carries the terminal identity of the first terminal and the terminal identity of the second terminal that needs to be paged by using the first terminal.

7. The network device according to claim 5, wherein in response to determining that the receiver receives the first paging message, the program comprises further instructions for:

sending a fifth paging message for paging the second terminal, wherein the fifth paging message carries the terminal identity of the second terminal and the terminal identity of the first terminal that needs to be used to page the second terminal.

8. The network device according to claim 5,
wherein the receiver is further configured to receive a second paging message for paging a third terminal, wherein the second paging message carries a terminal identity of the third terminal and a terminal identity of a fourth terminal that needs to be paged by using the third terminal and to which the third terminal provides a relay service:
wherein the program comprises further instructions for paging the fourth terminal by using the third terminal according to the terminal identity of the third terminal and the terminal identity of the fourth terminal carried in the second paging message; and
wherein in response to determining that the receiver receives the second paging message, the program comprises further instructions for:
sending a seventh paging message for paging the fourth terminal, wherein the seventh paging message carries the terminal identity of the fourth terminal and the terminal identity of the third terminal that needs to be used to page the fourth terminal.

9. The network device according to claim 5,
wherein the receiver is further configured to receive a third paging message for paging a third terminal, wherein the third paging message carries a terminal identity of the third terminal and first indication information, and the first indication information indicates that the third terminal is a terminal to which another terminal provides a relay service;
wherein the program comprises further instructions for determining a fourth terminal that provides the relay service to the third terminal in response to receipt of the first indication information, and paging the third terminal by using the fourth terminal; and
wherein in response to determining that the receiver receives the third paging message, the program comprises further instructions for:
sending an eighth paging message for paging the third terminal, wherein the eighth paging message carries the terminal identity of the third terminal and the terminal identity of the fourth terminal that needs to be used to page the third terminal.

10. The network device according to claim 5,
wherein the receiver is configured to receive a third paging message for paging a third terminal, wherein the third paging message carries a terminal identity of the third terminal and first indication information, and the first indication information indicates that the third terminal is a terminal to which another terminal provides a relay service;
wherein the program comprises further instructions for determining a fourth terminal that provides the relay service to the third terminal in response to receipt of the first indication information, and paging the third terminal by using the fourth terminal; and
wherein in response to determining that the receiver receives the third paging message, the program comprises further instructions for:
sending a ninth paging message for paging the fourth terminal, wherein the ninth paging message carries the terminal identity of the fourth terminal and the terminal identity of the third terminal that needs to be paged by using the fourth terminal.

11. A paging method comprising:
   receiving, by a first terminal from a network device, a paging message for paging a second terminal lacking an ability to be paged directly by the network device, wherein the paging message carries a terminal identity of the second terminal; and
   when the paging message comprises a terminal identity of the first terminal that provides relay services to one or more terminals, in response to determining that the second terminal is a terminal to which the first terminal provides a relay service, paging, by the first terminal, the second terminal according to the terminal identity of the second terminal.

12. The paging method according to claim 11, wherein the determining, by the first terminal, that the second terminal is a terminal to which the first terminal provides a relay service comprises:
   in response to determining that a stored terminal identity list of terminals to which the first terminal provides the relay service comprises the terminal identity of the second terminal, determining, by the first terminal, that the second terminal is a terminal to which the first terminal provides the relay service.

13. The paging method according to claim 11, wherein after the receiving, by a first terminal, a paging message, the paging method further comprises:
   in response to determining at the first terminal that the paging message comprises indication information indicating that the paging message further pages the first terminal, determining, by the first terminal, that the paging message further pages the first terminal.

14. The paging method according to claim 11, wherein before the paging, by the first terminal, the second terminal, the paging method further comprises:
   determining, by the first terminal, a paging moment of the second terminal for paging the second terminal in one of following manners:
      determining, by the first terminal, the paging moment of the second terminal according to paging moment information of the second terminal received from the second terminal;
      determining, by the first terminal, the paging moment of the second terminal according to a paging parameter that is received from the second terminal and that is used to determine the paging moment of the second terminal;
      determining, by the first terminal, the paging moment of the second terminal according to paging moment information of the second terminal obtained from the paging message; or
      determining, by the first terminal, the paging moment of the second terminal according to a paging parameter that is obtained from the paging message and that is used to determine the paging moment of the second terminal; and
   the paging, by the first terminal, the second terminal comprises:
      paging, by the first terminal, the second terminal according to the determined paging moment of the second terminal.

15. A paging method comprising:
   receiving, by a second network device, a first paging message for paging a second terminal, wherein the first paging message carries a terminal identity of the second terminal and a terminal identity of a first terminal that provides a relay service to the second terminal; and
   paging, by the second network device, the second terminal by using the first terminal according to the terminal identity of the first terminal.

16. The paging method according to claim 15, wherein in response to determining that the second network device receives the first paging message, the paging, by the second network device, the second terminal by using the first terminal comprises:
   sending, by the second network device, a fourth paging message for paging the first terminal, wherein the fourth paging message carries the terminal identity of the first terminal and the terminal identity of the second terminal that needs to be paged by using the first terminal.

17. The paging method according to claim 15, wherein in response to determining that the second network device receives the first paging message, the paging, by the second network device, the second terminal by using the first terminal comprises:
   sending, by the second network device, a fifth paging message for paging the second terminal, wherein the fifth paging message carries the terminal identity of the second terminal and the terminal identity of the first terminal that needs to be used to page the second terminal.

18. The paging method according to claim 15, further comprising:
   receiving, by the second network device, a second paging message for paging a third terminal, wherein the second paging message carries a terminal identity of the third terminal and a terminal identity of a fourth terminal that needs to be paged by using the third terminal and to which the third terminal provides a relay service; and
   paging, by the second network device, the fourth terminal by using the third terminal according to the terminal identity of the third terminal and the terminal identity of the fourth terminal carried in the second paging message; and
   wherein in response to determining that the second network device receives the second paging message, the paging, by the second network device, the fourth terminal by using the third terminal comprises:
      sending, by the second network device, a seventh paging message for paging the fourth terminal, wherein the seventh paging message carries the terminal identity of the fourth terminal and the terminal identity of the third terminal that needs to be used to page the fourth terminal.

19. The paging method according to claim 15, further comprising:
   receiving, by the second network device, a third paging message for paging a third terminal, wherein the third paging message carries a terminal identity of the third terminal and first indication information, and the first indication information indicates that the third terminal is a terminal to which another terminal provides a relay service; and
   determining, by the second network device in response to receipt of the first indication information, a fourth terminal that provides the relay service to the third terminal, and paging the third terminal by using the determined fourth terminal; and
   wherein, in response to determining that the second network device receives the third paging message, paging the third terminal by using the determined fourth terminal comprises:

sending, by the second network device, an eighth paging message for paging the third terminal, wherein the eighth paging message carries the terminal identity of the third terminal and the terminal identity of the fourth terminal that needs to be used to page the third terminal.

20. The paging method according to claim 15, further comprising:

receiving, by the second network device, a third paging message for paging a third terminal, wherein the third paging message carries a terminal identity of the third terminal and first indication information, and the first indication information indicates that the third terminal is a terminal to which another terminal provides a relay service; and determining, by the second network device in response to receipt of the first indication information, a fourth terminal that provides the relay service to the third terminal, and paging the third terminal by using the determined fourth terminal; and wherein in response to determining that the second network device receives the third paging message, paging the third terminal by using the determined fourth terminal comprises:

sending, by the second network device, a ninth paging message for paging the fourth terminal, wherein the ninth paging message carries the terminal identity of the fourth terminal and the terminal identity of the third terminal that needs to be paged by using the fourth terminal.

* * * * *